(12) United States Patent  
Schmidt et al.

(10) Patent No.: US 7,790,793 B2
(45) Date of Patent: Sep. 7, 2010

(54) AMIDE NUCLEATING AGENT COMPOSITIONS

(75) Inventors: Hans-Werner Schmidt, Bayreuth (DE); Markus Blomenhofer, Küps-Johannisthal (DE); Klaus Stoll, Binzen (DE); Hans-Rudolf Meier, Basel (CH)

(73) Assignee: Ciba Specialty Chem. Corp., Tarrytown, NY (US)

( * ) Notice: Subject to any disclaimer, the term of this patent is extended or adjusted under 35 U.S.C. 154(b) by 891 days.

(21) Appl. No.: 10/544,508

(22) PCT Filed: Feb. 9, 2004

(86) PCT No.: PCT/EP2004/050095

§ 371 (c)(1),
(2), (4) Date: Apr. 24, 2006

(87) PCT Pub. No.: WO2004/072168

PCT Pub. Date: Aug. 26, 2004

(65) Prior Publication Data

US 2007/0149663 A1 Jun. 28, 2007

(30) Foreign Application Priority Data

Feb. 14, 2003 (EP) .................. 03405084
Oct. 16, 2003 (EP) .................. 03103835

(51) Int. Cl.
C08K 5/20 (2006.01)
C07C 211/43 (2006.01)

(52) U.S. Cl. .............. 524/228; 524/227; 524/229; 564/305

(58) Field of Classification Search .......... 524/227, 524/228, 229; 564/305
See application file for complete search history.

(56) References Cited

U.S. PATENT DOCUMENTS

| 3,223,764 | A | * | 12/1965 | Henze et al. ............ 264/178 R |
| 5,491,188 | A | * | 2/1996 | Ikeda et al. .................. 524/229 |
| 5,804,623 | A | | 9/1998 | Hoffmann et al. ........... 524/101 |
| 5,973,076 | A | | 10/1999 | Yoshimura et al. ........... 525/184 |
| 6,372,235 | B1 | | 4/2002 | Livoreil et al. .............. 424/401 |
| 7,235,191 | B2 | | 6/2007 | Schmidt et al. .............. 252/401 |
| 7,423,088 | B2 | * | 9/2008 | Mader et al. ................. 525/193 |
| 2002/0028898 | A1 | * | 3/2002 | Kuramoto et al. ........... 526/351 |
| 2005/0176860 | A1 | | 8/2005 | Thibaut ....................... 524/128 |

FOREIGN PATENT DOCUMENTS

| EP | 0 776 933 | 6/1997 |
| EP | 0 940 431 | 9/1999 |
| JP | 6-234890 A | 8/1994 |
| JP | 6-271762 | 9/1994 |
| JP | 8-157640 | 6/1996 |
| WO | 91/12231 A | 8/1991 |
| WO | WO 02/46300 | * 6/2002 |

OTHER PUBLICATIONS

Chemical Abstract 2003:1419911, Apr. 30, 2003.
D. Caulder et al., "Design, Formation and Properties of Tetrahedral $M_4L_4$ and $M_4L_6$ Supramolecular Clusters" J. Am. Chem. Soc. 2001, 123, pp. 8923-8938.
H. Stetter et al., "Cyclisierungstreaktionen ausgehend von 1.3.5-Triamino-cyclohexan" Chem. Ber. 103, pp. 200-204 (1970).
Derwent abstract No. 94-338449/42 of JP6-263969.
Derwent abstract No. 98-267291/24 of JP 10087975.

* cited by examiner

Primary Examiner—Milton I Cano
Assistant Examiner—John Uselding
(74) Attorney, Agent, or Firm—Shiela A. Loggins

(57) ABSTRACT

A composition containing a) a natural or synthetic polymer and b) one or more compounds of the formula (I), (II) or (III) wherein $R_1$, $R_2$ and $R_3$ or $Y_1$, $Y_2$ and $Y_3$ or $Z_1$, $Z_2$ and $Z_3$ are e.g. branched $C_3$-$C_{20}$alkyl.

(I)

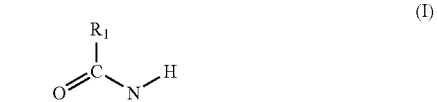

(II)

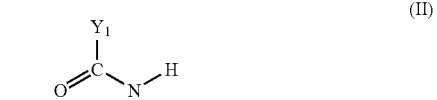

(III)

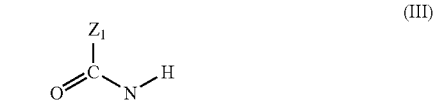

26 Claims, No Drawings

AMIDE NUCLEATING AGENT COMPOSITIONS

The present invention relates to a composition containing a natural or synthetic polymer and an amide, to a shaped article obtainable from said composition, to the use of the amides as nucleating agents, in particular as haze reducing agents, and to novel amides.

Crystalline synthetic resin compositions are e.g. described in EP-A-776,933, JP-A-Hei 8-157,640, JP-A-Hei 6-271,762 and EP-A-940,431.

The compounds 1,3,5-tris[acetylamino]benzene and 1,3,5-tris[propionylamino)benzene are e.g. described in Chem. Ber. 103, 200-204 (1970) by H. Stetter et al.

The compound 1,3,5-tris[2,3-dihydroxybenzoylamino] benzene is e.g. described in J. Am. Chem. Soc., 123, 8923-8938 (2001) by D. L. Caulder et al.

The present invention relates in particular to a composition containing
a) a natural or synthetic polymer, preferably a synthetic polymer, and
b) one or more compounds of the formula (I), (II) or (III)

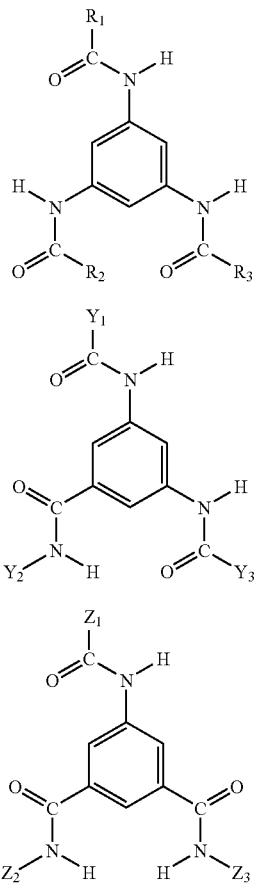

wherein
$R_1$, $R_2$ and $R_3$, or $Y_1$, $Y_2$ and $Y_3$, or $Z_1$, $Z_2$ and $Z_3$ independently of one another are $C_1$-$C_{20}$alkyl unsubstituted or substituted by one or more hydroxy;
$C_2$-$C_{20}$alkenyl unsubstituted or substituted by one or more hydroxy;
$C_2$-$C_{20}$alkyl interrupted by oxygen or sulfur;
$C_3$-$C_{12}$cycloalkyl unsubstituted or substituted by one or more $C_1$-$C_{20}$alkyl;
$(C_3$-$C_{12}$cycloalkyl)-$C_1$-$C_{10}$alkyl unsubstituted or substituted by one or more $C_1$-$C_{20}$alkyl;
bis[$C_3$-$C_{12}$cycloalkyl]-$C_1$-$C_{10}$alkyl unsubstituted or substituted by one or more $C_1$-$C_{20}$alkyl;
a bicyclic or tricyclic hydrocarbon radical with 5 to 20 carbon atoms unsubstituted or substituted by one or more $C_1$-$C_{20}$alkyl;
phenyl unsubstituted or substituted by one or more radicals selected from $C_1$-$C_{20}$alkyl, $C_1$-$C_{20}$alkoxy, $C_1$-$C_{20}$alkylamino, di($C_1$-$C_{20}$alkyl)amino, hydroxy and nitro;
phenyl-$C_1$-$C_{20}$alkyl unsubstituted or substituted by one or more radicals selected from $C_1$-$C_{20}$alkyl, $C_3$-$C_{12}$cycloalkyl, phenyl, $C_1$-$C_{20}$alkoxy and hydroxy;
phenylethenyl unsubstituted or substituted by one or more $C_1$-$C_{20}$alkyl;
biphenyl-($C_1$-$C_{10}$alkyl) unsubstituted or substituted by one or more $C_1$-$C_{20}$alkyl;
naphthyl unsubstituted or substituted by one or more $C_1$-$C_{20}$alkyl;
naphthyl-$C_1$-$C_{20}$alkyl unsubstituted or substituted by one or more $C_1$-$C_{20}$alkyl;
naphthoxymethyl unsubstituted or substituted by one or more $C_1$-$C_2$alkyl; biphenylenyl, flourenyl, anthryl;
a 5- to 6-membered heterocylic radical unsubstituted or substituted by one or more $C_1$-$C_{20}$alkyl;
a $C_1$-$C_{20}$ hydrocarbon radical containing one or more halogen; or
tri($C_1$-$C_{10}$alkyl)silyl($C_1$-$C_{10}$alkyl);
with the proviso that at least one of the radicals $R_1$, $R_2$ and $R_3$, or $Y_1$, $Y_2$ and $Y_3$, or $Z_1$, $Z_2$ and $Z_3$ is
branched $C_3$-$C_{20}$alkyl unsubstituted or substituted by one or more hydroxy;
$C_2$-$C_{20}$alkyl interrupted by oxygen or sulfur;
$C_3$-$C_{12}$cycloalkyl unsubstituted or substituted by one or more $C_1$-$C_{20}$alkyl;
$(C_3$-$C_{12}$cycloalkyl)-$C_1$-$C_{10}$alkyl unsubstituted or substituted by one or more $C_1$-$C_{20}$alkyl;
a bicyclic or tricyclic hydrocarbon radical with 5 to 20 carbon atoms unsubstituted or substituted by one or more $C_1$-$C_{20}$alkyl;
phenyl unsubstituted or substituted by one or more radicals selected from $C_1$-$C_{20}$alkyl, $C_1$-$C_{20}$alkoxy, $C_1$-$C_{20}$alkylamino, di($C_1$-$C_{20}$alkyl)amino, hydroxy and nitro;
phenyl-$C_1$-$C_{20}$alkyl unsubstituted or substituted by one or more radicals selected from $C_1$-$C_{20}$alkyl, $C_3$-$C_{12}$cycloalkyl, phenyl, $C_1$-$C_{20}$alkoxy and hydroxy;
biphenyl-($C_1$-$C_{10}$alkyl) unsubstituted or substituted by one or more $C_1$-$C_{20}$alkyl;
naphthyl-$C_1$-$C_{20}$alkyl unsubstituted or substituted by one or more $C_1$-$C_{20}$alkyl; or
tri($C_1$-$C_{10}$alkyl)silyl($C_1$-$C_{10}$alkyl).

According to a preferred embodiment of the present invention at least one of the radicals $R_1$, $R_2$ and $R_3$, or $Y_1$, $Y_2$ and $Y_3$, or $Z_1$, $Z_2$ and $Z_3$ is branched $C_3$-$C_{20}$alkyl, or
$C_3$-$C_{12}$cycloalkyl unsubstituted or substituted by one or more $C_1$-$C_{20}$alkyl.

According to a particular preferred embodiment of the present invention at least one of the radicals $R_1$, $R_2$ and $R_3$, or $Y_1$, $Y_2$ and $Y_3$, or $Z_1$, $Z_2$ and $Z_3$ is branched $C_3$-$C_{10}$alkyl.

Examples of $C_1$-$C_{20}$alkyl, e.g. branched $C_3$-$C_{20}$alkyl, unsubstituted or substituted by one or more hydroxy, e.g. 1, 2 or 3 hydroxy, are ethyl, n-propyl, 1-methylethyl, n-butyl, 2-methylpropyl, 1-methylpropyl, tert-butyl, pentyl, 1-methylbutyl, 2-methylbutyl, 3-methylbutyl, 1,1-dimethylpropyl, 1-ethylpropyl, tert-butylmethyl, hexyl, 1-methylpentyl, heptyl, isoheptyl, 1-ethylhexyl, 2-ethylpentyl, 1-propylbutyl, octyl, nonyl, isononyl, neononyl, 2,4,4-trimethylpentyl, undecyl, tridecyl, pentadecyl, heptadecyl, hydroxymethyl and 1-hydroxyethyl. Branched $C_3$-$C_{10}$alkyl is particularly preferred. One of the preferred meanings of the radicals $R_1$, $R_2$ and $R_3$, or $Y_1$, $Y_2$ and $Y_3$, or $Z_1$, $Z_2$ and $Z_3$ is branched $C_3$-$C_{10}$alkyl with a quaternary C atom in position 1, in particular —C(CH$_3$)$_2$—H or —(CH$_3$)$_2$—(C$_1$-C$_7$alkyl).

Examples of $C_2$-$C_{20}$alkenyl unsubstituted or substituted by one or more hydroxy, e.g. 1, 2 or 3 hydroxy, are 9-decenyl, 8-heptadecenyl and 11-hydroxy-8-heptadecenyl.

Examples of $C_2$-$C_{20}$alkyl interrupted by oxygen are t-butoxymethyl, t-butoxyethyl, t-butoxypropyl and t-butoxybutyl.

Examples of $C_2$-$C_{20}$alkyl interrupted by sulfur are (H$_3$C)$_3$C—S—CH$_2$—, (H$_3$C)$_3$C—S—C$_2$H$_4$—, (H$_3$C)$_3$C—S—C$_3$H$_6$— and (H$_3$C)$_3$C—S—C$_4$H$_8$—.

Examples of $C_3$-$C_{12}$cycloalkyl unsubstituted or substituted by one or more $C_1$-$C_{20}$alkyl, e.g. 1, 2, 3 or 4 $C_1$-$C_4$alkyl, are cyclopropyl, 3-methylcyclopropyl, 2,2,3,3-tetramethylcyclopropyl, cyclobutyl, cyclopentyl, cyclohexyl, 1-methylcyclohexyl, 2-methylcyclohexyl, 3-methylcyclohexyl, 4-methylcyclohexyl, 4-tert-butylcyclohexyl and cycloheptyl.

Examples of ($C_3$-$C_{12}$cycloalkyl)-$C_1$-$C_{10}$alkyl unsubstituted or substituted by one or more $C_1$-$C_{20}$alkyl, e.g. 1, 2 or 3 $C_1$-$C_4$alkyl, are cyclopentylmethyl, 2-cyclopentylethyl, cyclohexylmethyl, 2-cyclohexylethyl, 3-cyclohexylpropyl, 4-cyclohexylbutyl and (4-methylcyclohexyl)methyl.

An example of bis[$C_3$-$C_{12}$cycloalkyl]-$C_1$-$C_{10}$alkyl unsubstituted or substituted by one or more $C_1$-$C_{20}$alkyl, e.g. 1, 2 or 3 $C_1$-$C_4$alkyl, is dicyclohexylmethyl.

Examples of a bicyclic or tricyclic hydrocarbon radical with 5 to 20 carbon atoms unsubstituted or substituted by one or more $C_1$-$C_{20}$alkyl, e.g. 1, 2 or 3 $C_1$-$C_4$alkyl, are

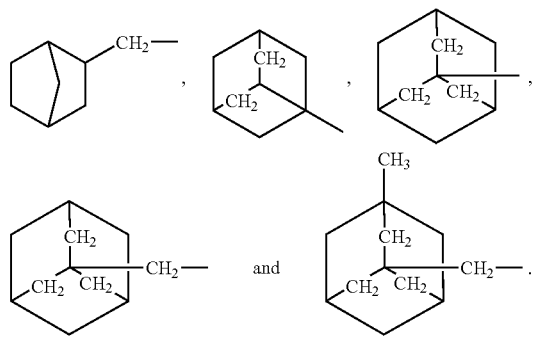

Examples of phenyl unsubstituted or substituted by one or more radicals, e.g. 1, 2 or 3 radicals, selected from $C_1$-$C_{20}$alkyl, $C_1$-$C_{20}$alkoxy, $C_1$-$C_{20}$alkylamino, di($C_1$-$C_{20}$alkyl)amino, hydroxy and nitro, preferably $C_1$-$C_4$alkyl, $C_1$-$C_4$alkoxy, $C_1$-$C_4$alkylamino, di($C_1$-$C_4$alkyl)amino, hydroxy and nitro, are phenyl, 3-methylphenyl, 3-methoxyphenyl, 4-methylphenyl, 4-ethylphenyl, 4-propylphenyl, 4-isopropylphenyl, 4-tert-butylphenyl, 4-isopropoxyphenyl, 2,3-dimethoxyphenyl, 2-nitrophenyl, 3-methyl-6-nitrophenyl, 4-dimethylaminophenyl, 2,3-dimethylphenyl, 2,6-dimethylphenyl, 2,4-dimethylphenyl, 3,4-dimethylphenyl, 3,5-dimethylphenyl, 3,5-di-tert-butylphenyl, 2,4,6-dimethylphenyl and 3,5-di-tert-butyl-4-hydroxyphenyl.

Examples of phenyl-$C_1$-$C_{20}$alkyl unsubstituted or substituted by one or more radicals, e.g. 1, 2 or 3 radicals, selected from $C_1$-$C_{20}$alkyl, $C_3$-$C_{12}$cycloalkyl, phenyl, $C_1$-$C_{20}$alkoxy and hydroxy, preferably $C_1$-$C_4$alkyl, $C_3$-$C_6$cycloalkyl, phenyl, $C_1$-$C_4$alkoxy and hydroxy, are benzyl, α-cyclohexylbenzyl, diphenylmethyl, 1-phenylethyl, α-hydroxybenzyl, 2-phenylethyl, 2-phenylpropyl, 3-phenylpropyl, 3-methylbenzyl, 3,4-dimethoxybenzyl and 2-(3,4-dimethoxyphenyl)ethyl.

An example of phenylethenyl unsubstituted or substituted by one or more $C_1$-$C_{20}$alkyl, e.g. 1, 2 or 3 $C_1$-$C_4$alkyl, is 2-(4-methylphenyl)ethenyl.

An example of biphenyl-($C_1$-$C_{10}$alkyl) unsubstituted or substituted by one or more $C_1$-$C_{20}$alkyl, e.g. 1, 2 or 3 $C_1$-$C_4$alkyl, is 4-biphenylmethyl.

Examples of naphthyl unsubstituted or substituted by one or more $C_1$-$C_{20}$alkyl, e.g. 1, 2 or 3 $C_1$-$C_4$alkyl, are 1-naphthyl and 2-naphthyl.

Examples of naphthyl-$C_1$-$C_{20}$alkyl unsubstituted or substituted by one or more $C_1$-$C_{20}$alkyl, e.g. 1, 2 or 3 $C_1$-$C_4$alkyl, are 1-naphthylmethyl and 2-naphthylmethyl.

An example of naphthoxymethyl unsubstituted or substituted by one or more $C_1$-$C_{20}$alkyl, e.g. 1, 2 or 3 $C_1$-$C_4$alkyl, is 1-naphthoxymethyl.

An examples of biphenylenyl, flourenyl or anthryl is 2-biphenylenyl, 9-flourenyl, 1-flourenyl or 9-anthryl, respectively.

Examples of a 5- to 6-membered heterocyclic radical unsubstituted or substituted by one or more $C_1$-$C_{20}$alkyl, e.g. 1, 2 or 3 $C_1$-$C_4$alkyl, are 3-pyridinyl, 4-pyridinyl, 2-hydroxypyridin-3-yl, 3-quinolinyl, 4-quinolinyl, 2-furyl, 3-furyl and 1-methyl-2-pyrroyl.

Examples of a $C_1$-$C_{20}$hydrocarbon radical containing one or more halogen, e.g. 1, 2, 3, 4, 5, or 6-F, -Cl or -J, are 1-bromo-2-methylpropyl, dichloromethyl, pentafluoroethyl, 3,5-bis[trifluoromethyl]phenyl, 2,3,5,6-tetrafluoro-p-tolyl, 2,3-dichlorophenyl, 3,4-dichlorophenyl and 2,4-bis[fluoromethyl]phenyl.

$R_1$, $R_2$ and $R_3$, or $Y_1$, $Y_2$ and $Y_3$, or $Z_1$, $Z_2$ and $Z_3$ are preferably independently of one another $C_1$-$C_{10}$alkyl unsubstituted or substituted by 1, 2 or 3 hydroxy;
$C_2$-$C_{20}$alkenyl unsubstituted or substituted by 1, 2 or 3 hydroxy;
$C_2$-$C_{10}$alkyl interrupted by oxygen;
$C_3$-$C_6$cycloalkyl unsubstituted or substituted 1, 2, 3 or 4 $C_1$-$C_4$alkyl;
($C_3$-$C_6$-cycloalkyl-$C_1$-$C_{10}$alkyl unsubstituted or substituted by 1, 2 or 3 $C_1$-$C_4$alkyl;
bis[$C_3$-$C_8$cycloalkyl]-$C_1$-$C_{10}$alkyl unsubstituted or substituted by 1, 2 or 3 $C_1$-$C_4$alkyl;

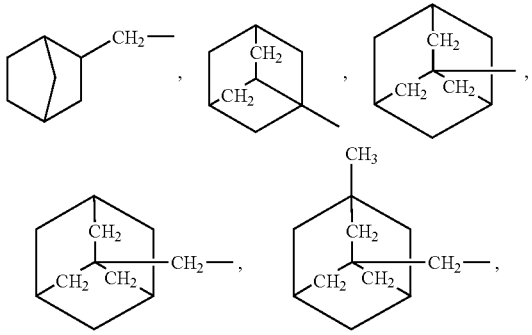

phenyl unsubstituted or substituted by 1, 2 or 3 radicals selected from $C_1$-$C_4$alkyl, $C_1$-$C_4$alkoxy, $C_1$-$C_4$alkylamino, di($C_1$-$C_4$alkyl)amino, hydroxy and nitro;

phenyl-$C_1$-$C_{10}$alkyl unsubstituted or substituted by 1, 2 or 3 radicals selected from $C_1$-$C_4$alkyl, $C_3$-$C_6$cycloalkyl, phenyl, $C_1$-$C_4$alkoxy and hydroxy;

phenylethenyl unsubstituted or substituted by 1, 2 or 3 $C_1$-$C_4$alkyl;

biphenyl-($C_1$-$C_{10}$alkyl) unsubstituted or substituted by 1, 2 or 3 $C_1$-$C_4$alkyl;

naphthyl unsubstituted or substituted by 1, 2 or 3 $C_1$-$C_4$alkyl;

naphthyl-$C_1$-$C_{10}$alkyl unsubstituted or substituted by 1, 2 or 3 $C_1$-$C_4$alkyl;

naphthoxymethyl unsubstituted or substituted by 1, 2 or 3 $C_1$-$C_4$alkyl;

biphenylenyl, flourenyl, anthryl;

3-pyridinyl, 4-pyridinyl, 2-hydroxypyridin-3-yl, 3-quinolinyl, 4-quinolinyl, 2-furyl, 3-furyl, 1-methyl-2-pyrroyl;

1-bromo-2-methylpropyl, dichloromethyl, pentafluoroethyl, 3,5-bis[fluoromethyl]phenyl, 2,3,5,6-tetrafluoro-p-tolyl, 2,3-dichlorophenyl, 3,4-dichlorophenyl or 2,4-bis[trifluoromethyl]phenyl.

$R_1$, $R_2$ and $R_3$, or $Y_1$, $Y_2$ and $Y_3$, or $Z_1$, $Z_2$ and $Z_3$, independently of one another are in particular branched $C_3$-$C_{10}$alkyl;

$C_3$-$C_{10}$alkyl interrupted by oxygen;

$C_3$-$C_6$cycloalkyl unsubstituted or substituted by 1, 2, 3 or 4 $C_1$-$C_4$alkyl;

($C_3$-$C_6$cycloalkyl) $C_1$-$C_{10}$alkyl unsubstituted or substituted by 1, 2 or 3 $C_1$-$C_4$alkyl;

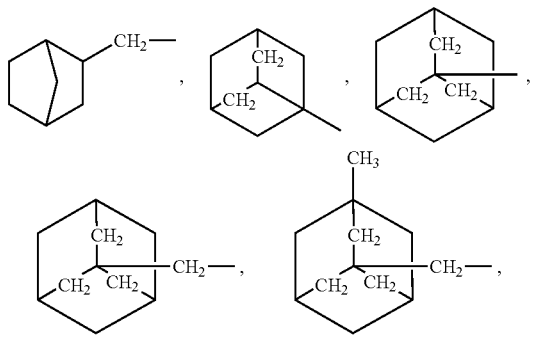

phenyl unsubstituted or substituted by 1, 2 or 3 $C_1$-$C_4$alkyl;

phenyl-$C_1$-$C_{10}$alkyl unsubstituted or substituted by 1, 2 or 3 radicals selected from $C_1$-$C_4$alkyl and $C_1$-$C_4$alkoxy;

biphenyl-$C_1$-$C_4$alkyl);

naphthyl-$C_1$-$C_{10}$alkyl; or tri($C_1$-$C_4$alkyl)silyl($C_1$-$C_5$alkyl).

Examples of compounds of the formula (I) are:
1,3,5-tris[cyclohexylcarbonylamino]benzene,
1,3,5-tris[2,2-dimethylpropionylamino]benzene,
1,3,5-tris[4-methylbenzoylamino]benzene,
1,3,5-tris[3,4-dimethylbenzoylamino]benzene,
1,3,5-tris[3,5-dimethylbenzoylamino]benzene,
1,3,5-tris[cyclopentanecarbonylamino]benzene,
1,3,5-tris[1-adamantanecarbonylamino]benzene,
1,3,5-tris[2-methylpropionylamino]benzene,
1,3,5-tris[3-dimethylbutyrylamino]benzene,
1,3,5-tris[2-ethylbutyrylamino]benzene,
1,3,5-tris[2,2-dimethylbutyrylamino]benzene,
1,3,5-tris[2-cyclohexyl-acetylamino]benzene,
1,3,5-tris[3-cyclohexyl-propionylamino]benzene,
1,3,5-tris[4-cyclohexyl-butyrylamino]benzene,
1,3,5-tris[5-cyclohexyl-valeroylamino]benzene,
1-isobutyrylamino-3,5-bis[pivaloylamino]benzene,
2,2-dimethylbutyrylamino-3,5-bis[pivaloylamino]benzene,
3,3-dimethylbutyrylamino-3,5-bis[pivaloylamino]benzene,
1,3-bis[isobutyrylamino]-5-pivaloylaminobenzene,
1,3-bis[isobutyrylamino]-5-(2-dimethyl-butyryl)aminobenzene,
1,3-bis[isobutyrylamino]-5-(3,3-dimethyl-butyryl)aminobenzene,
1,3-bis[2,2-dimethylbutyrylamino]-5-pivaloylaminobenzene,
1,3-bis[2,2-dimethylbutyrylamino]-5-isobutyrylaminobenzene,
1,3-bis[2,2-dimethylbutyrylamino]-5-(3,3-dimethylbutyryl)-aminobenzene,
1,3-bis[3,3-dimethylbutyrylamino]-5-pivaloylamino-benzene,
1,3-bis[3,3-dimethylbutyrylamino]-5-isobutyryl-aminobenzene,
1,3-bis[3,3-dimethylbutyrylamino]-5-(2,2-dimethyl-butyrylamino)aminobenzene, and
1,3,5-tris[3-trimethylsilyl)propionylamino]benzene.

Further examples of compounds of the formula (I) are:
1,3,5-tris[2,2-dimethylvaleroylamino]benzene,
1,3,5-tris[3,3-dimethylvaleroylamino]benzene,
1,3,5-tris[2,4-dimethylvaleroylamino]benzene,
1,3,5-tris[4,4-dimethylvaleroylamino]benzene,
1,3,5-tris[4-methylvaleroylamino]benzene,
1,3,5-tris[2-methylbutyrylamino]benzene,
1,3,5-tris[2-methylvaleroylamino]benzene,
1,3,5-tris[3-methylvaleroylamino]benzene,
1,3,5-tris[2,2,3,3-tetramethyl-cyclopropanecarbonylamino]benzene,
1,3,5-tris[cyclopentylacetylamino]benzene,
1,3,5-tris[3-cyclopentylpropionylamino]benzene,
1,3,5-tris[2-norbornyl-acetylamino]benzene,
1,3,5-tris[4-t-butylcyclohexane-1-carbonylamino]benzene,
1,3,5-tris[2-(t-butoxy-acetylamino]benzene,
1,3,5-tris[3-(t-butoxy)-propionylamino]benzene,
1,3,5-tris[4-t-butoxy)butyrylamino]benzene,
1,3,5-tris[5-t-butoxy-valeroylamino]benzene,
1,3,5-tris[cyclopropanecarbonylamino]benzene,
1,3,5-tris[2-methylcyclopropane-1-carbonylamino]benzene,
1,3,5-tris[3-noradamantane-1-carbonylamino]benzene,
1,3,5-tris[biphenyl-4-acetylamino]benzene,
1,3,5-tris[2-naphthyl-acetylamino]benzene,
1,3,5-tris[3-methylphenyl-acetylamino]benzene,
1,3,5-tris[(3,4-dimethoxyphenyl)-acetylamino]benzene,
1,3,5-tris[(3-trimethylsilyl-propionylamino]benzene, and
1,3,5-tris[(4-trimethylsilyl-butyrylamino]benzene.

Examples of compounds of the formula (II) are:
N-t-butyl-3,5-bis-(3-methylbutyrylamino)-benzamide,
N-t-butyl-3,5-bis-(pivaloylamino)-benzamide,
N-t-octyl-3,5-bis-(pivaloylamino)-benzamide,
N-(1,1-dimethyl-propyl)-3,5-bis-(pivaloylamino)-benzamide,
N-(t-octyl)-3,5-bis-(isobutyrylamino)-benzamide,
N-(t-butyl)-3,5-bis-(pivaloylamino)benzamide,
N-(2,3-dimethyl-cyclohexyl)-3,5-bis-(pivaloylamino)-benzamide,
N-t-butyl-3,5-bis-(cyclopentanecarbonylamino)-benzamide,
N-(3-methylbutyl)-3,5-bis-(3-methylbutyrylamino)benzamide,
N-(3-methylbutyl)-3,5-bis-(pivaloylamino)-benzamide,
N-(3-methylbutyl)-3,5-bis-(4-methylpentanoylamino)benzamide,
N-(3-methylbutyl)-3,5-bis-(cyclopentanecarbonylamino)-benzamide,
N-(3-methylbutyl)-3,5-bis-(cyclohexanecarbonylamino)-benzamide, N-cyclopentyl-3,5-bis-(3-methylbutyrylamino)benzamide,
N-cyclopentyl-3,5-bis-(pivaloylamino)-benzamide,
N-cyclopentyl-3,5-bis-(4-methylpentanoylamino)-benzamide,
N-cyclopentyl-3,5-bis-(cyclopentanecarbonylamino)benzamide,
N-cyclopentyl-3,5-bis(cyclohexanecarbonylamino)-benzamide,
N-cyclohexyl-3,5-bis-(3-methylbutyrylamino)-benzamide,
N-cyclohexyl-3,5-bis-(pivaloylamino)-benzamide,
N-cyclohexyl-3,5-bis-(4-methylpentanoylamino)-benzamide,
N-cyclohexyl-3,5-bis-(cyclopentanecarbonylamino)benzamide,
N-cyclohexyl-3,5-bis-(cyclohexanecarbonylamino)-benzamide,
N-isopropyl-3,5-bis-(pivaloylamino)-benzamide,
N-isopropyl-3,5-bis-(isobutyrylamino)benzamide,
N-t-butyl-3,5-bis-(2,2-dimethylbutyrylamino)-benzamide, and
N-t-octyl-3,5-bis-(2,2-dimethylbutyrylamino)-benzamide.

Examples of compounds of the formula (III) are:
5-pivaloylamino-isophthalic acid N,N'-di-t-butyldiamide,
5-pivaloylamino-isophthalic acid N,N'-di-t-octyldiamide,
5-(2,2-dimethylbutyrylamino)-isophthalic acid N,N'-di-t-butyldiamide,
5-(2,2-dimethylbutyrylamino)-isophthalic acid N,N-di-t-octyldiamide,
5-(3-methylbutyrylamino)isophthalic acid N,N'-di-cyclohexyldiamide,
5-(pivaloylamino)-isophthalic acid N,N'-di-cycloyhexyldiamide,
5-(cyclopentanecarbonylamino)-isophthalic acid N,N'-dicyclohexyldiamide,
5-(cyclohexylcarbonylamino)-isophthalic acid N,N'-di-cyclohexyldiamide,
5-(cyclopentanecarbonylamino)-isophthalic acid N,N'-bis-(2-methylcyclohexyl)diamide,
5-cyclohexanecarbonylamino)-isophthalic acid N,N'-bis-(2-methylcyclohexyl)diamide,
5-((1-methylcyclohexanecarbonyl)amino)-isophthalic acid N,N'-bis-(2-methylcyclohexyl)diamide, and
5-((2-methylcyclohexanecarbonyl)amino)-isophthalic acid N,N'-bis-(2-methylcyclohexyl)diamide.

According to a further preferred embodiment $R_1$, $R_2$ and $R_3$, or $Y_1$, $Y_2$ and $Y_3$, or $Z_1$, $Z_2$ and $Z_3$ are independently of one another
1-methylethyl, 2-methylpropyl, 1-methylpropyl, tert-butyl, 1-methylbutyl, 2-methylbutyl, 3-methylbutyl, 1,1-methylpropyl, 1-ethylpropyl, tert-butylmethyl, cyclopropyl, 3-methylcyclopropyl, 2,2,3,3-tetramethylcyclopropyl, cyclopentyl, cyclopentylmethyl, 2-cyclopentylethyl, cyclohexyl, cyclohexylmethyl, 2-cyclohexylethyl, 4-tert-butylcyclohexyl, (4-methylcyclohexyl)methyl,

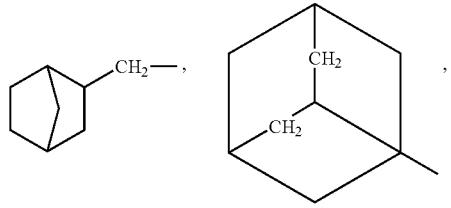

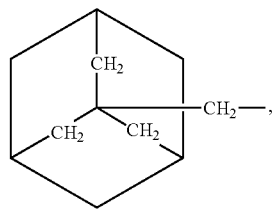

α-cyclohexylbenzyl, 3-methylbenzyl, 3,4-dimethoxybenzyl, 4-biphenylmethyl, 2-naphthylmethyl, m-tolyl, m-methoxyphenyl, p-tolyl, 4-ethylphenyl, 4-isopropylphenyl, 4-tert-butylphenyl, 2,3-dimethylphenyl, 2,6-dimethylphenyl, 2,4-dimethylphenyl, 3,4-dimethylphenyl, 3,5-dimethylphenyl, 3,5-di-tert-butylphenyl, 2,4,6-trimethylphenyl or 3,5-di-tert-butyl-4-hydroxyphenyl.

The radicals $R_1$, $R_2$ and $R_3$, or $Y_1$, $Y_2$ and $Y_3$, or $Z_1$, $Z_2$ and $Z_3$ are preferably identical.

Particularly preferred embodiments of the present invention are listed below.

A composition wherein $R_1$, $R_2$ and $R_3$, or $Y_1$, $Y_2$ and $Y_3$, or $Z_1$, $Z_2$ and $Z_3$ independently of one another are branched $C_3$-$C_{10}$alkyl; or $C_3$-$C_6$cycloalkyl unsubstituted or substituted by 1, 2, 3 or 4 $C_1$-$C_4$alkyl.

A composition wherein $R_1$, $R_2$ and $R_3$, or $Y_1$, $Y_2$ and $Y_3$, or $Z_1$, $Z_2$ and $Z_3$ independently of one another are branched $C_3$-$C_{10}$alkyl.

A composition wherein $R_1$, $R_2$ and $R_3$, or $Y_1$ and $Y_3$, or $Z_1$ independently of one another are isopropyl, sec-butyl, tert-butyl, 1-methylbutyl, 1-methylpentyl, 1-ethylpentyl, 1,1-dimethylpropyl, 2,2-dimethylpropyl, 1,1-dimethylbutyl, 1,1-dimethylhexyl, 1-ethylpropyl, 1-propylbutyl, 1-methylethenyl, 1-methyl-2-propenyl, 1-methyl-2-butenyl, cyclopentyl or cyclohexyl.

A composition wherein $Y_2$, or $Z_2$ and $Z_3$ independently of one another are isopropyl, sec-butyl, tert-butyl, 1,1-dimethylpropyl, 1,2-dimethylpropyl, 2,2-dimethylpropyl, tert-octyl, cyclopentyl, cyclohexyl, 2-methylcyclohexyl, 2,3-dimethylcyclohexyl, 1-cyclohexylethyl or 1-adamantyl.

A composition wherein the radicals $R_1$, $R_2$ and $R_3$, or $Y_1$, $Y_2$ and $Y_3$, or $Z_1$, $Z_2$ and $Z_3$ are tert-butyl.

Preferred examples of compounds of the formula (I) are:

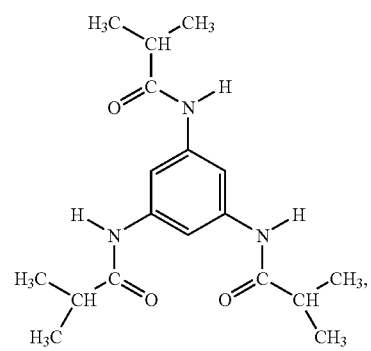

-continued

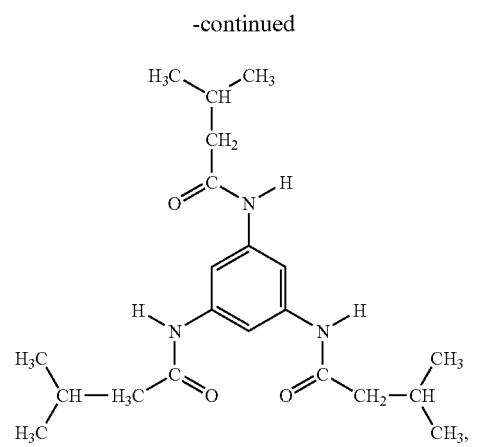

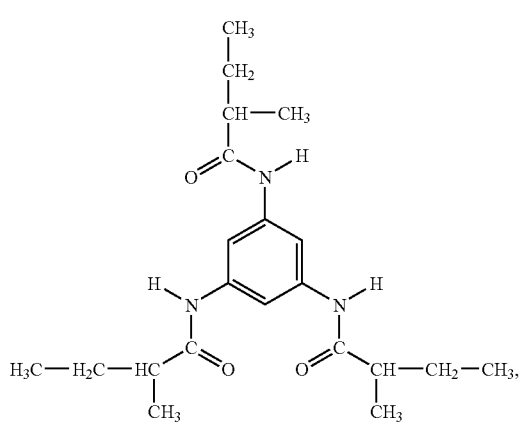

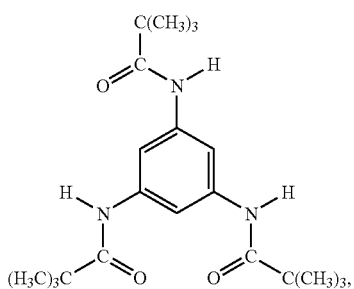

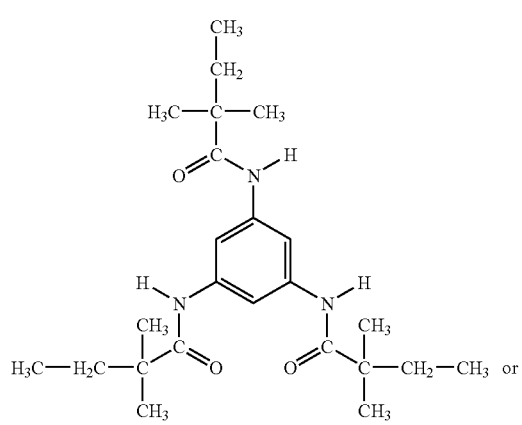

-continued

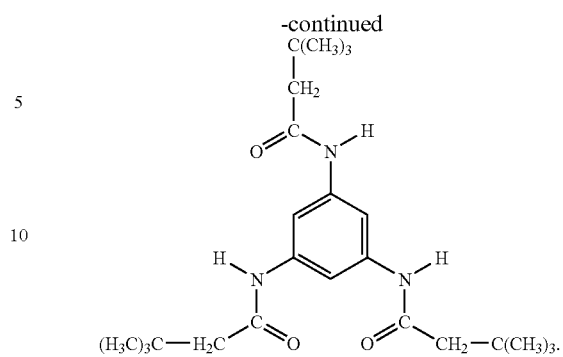

A particular preferred example of a compound of the formula (I) is

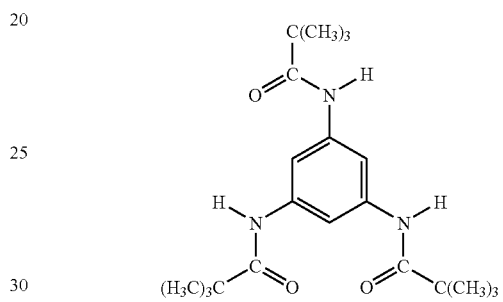

The compositions according to the present invention have for example excellent crystallizability, high transmittance, high clarity, low haze and/or improved thermal stability.

A preferred composition of the present invention is characterized by a haze value which is smaller than 62%; the haze value being measured at a plate of 1.0-1.2 mm thickness, in particular 1.1-1.2 mm thickness.

The haze is determined according to ASTM D 1003. Haze is defined as that percentage transmitted light which in passing through a specimen (plate) deviates from the incident beam by more than 2.5° on the average. Clarity is evaluated in the angle range smaller than 2.5°. The specimen shall have substantially plane-parallel surfaces free of dust, grease, scratches, and blemishes, and it shall be free of distinct internal voids and particles.

A composition which is characterized by a haze of 2 to 62%, in particular 2 to 50%, is preferred.

A composition which is characterized by a haze of 2 to 40%, in particular 5 to 15%, is of further interest.

Examples of haze are 2 to 55%, 2 to 50%, 2 to 45%, 2 to 40%, 2 to 35%, 2 to 30%, 2 to 25%, 2 to 20%, 2 to 15%, 2 to 10%, 5 to 55%, 5 to 50%, 5 to 45%, 5 to 40%, 5 to 35%, 5 to 30%, 5 to 25%, 5 to 20%, 5 to 15%, 5 to 10%, 7 to 55%, 7 to 50%, 7 to 45%, 7 to 40%, 7 to 35%, 7 to 30%, 7 to 25%, 7 to 20%, 7 to 15%, 7 to 10%, 10 to 55%, 10 to 50%, 10 to 45%, 10 to 40%, 10 to 35%, 10 to 30%, 10 to 25%, 10 to 20% and 10 to 15%, in particular 10 to 40% or 13 to 40%.

Examples of the synthetic polymer (component a)) are:
1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene-1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylenevinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic. Stereoblock polymers are also included.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a dione polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfo-chlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.
10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.
11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.
12. Homopolymers and copolymers of cyclic ethers such as polyalkylene glycols, polyethylene oxide, polypropylene oxide or copolymers thereof with bisglycidyl ethers.
13. Polyacetals such as polyoxymethylene and those polyoxymethylenes which contain ethylene oxide as a comonomer; polyacetals modified with thermoplastic polyurethanes, acrylates or MBS.
14. Polyphenylene oxides and sulfides, and mixtures of polyphenylene oxides with styrene polymers or polyamides.
15. Polyurethanes derived from hydroxyl-terminated polyethers, polyesters or polybutadienes on the one hand and aliphatic or aromatic polyisocyanates on the other, as well as precursors thereof.
16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).
17. Polyureas, polyimides, polyamide-imides, polyetherimides, polyesterimides, polyhydantoins and polybenzimidazoles.
18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.
19. Polycarbonates and polyester carbonates.
20. Polyketones.
21. Polysulfones, polyether sulfones and polyether ketones.
22. Crosslinked polymers derived from aldehydes on the one hand and phenols, ureas and melamines on the other hand, such as phenol/formaldehyde resins, urea/formaldehyde resins and melamine/formaldehyde resins.
23. Drying and non-drying alkyd resins.
24. Unsaturated polyester resins derived from copolyesters of saturated and unsaturated dicarboxylic acids with polyhydric alcohols and vinyl compounds as crosslinking agents, and also halogen-containing modifications thereof of low flammability.
25. Crosslinkable acrylic resins derived from substituted acrylates, for example epoxy acrylates, urethane acrylates or polyester acrylates.
26. Alkyd resins, polyester resins and acrylate resins crosslinked with melamine resins, urea resins, isocyanates, isocyanurates, polyisocyanates or epoxy resins.
27. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.
28. Cellulose acetates, cellulose propionates and cellulose butyrates, or the cellulose ethers such as methyl cellulose; as well as rosins and their derivatives.
29. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

Metallocene-polypropylene, metallocene-polyethylene and any metallocene-catalyst-based copolymer of propylene and ethylene, respectively, with other alpha olefins are also suited to apply the present invention and to illustrate the technical benefits.

The compounds of the formula (I), (II) or (III) are further useful as gelling agents in the preparation of gel sticks and improve the gel stability of water and organic solvent based systems.

Preferred synthetic polymers (component (a)) are listed under the above items 1 to 3.

Particular preferred examples of the synthetic polymer are a polypropylene homopolymer, random copolymer, alternating or segmented copolymer, block copolymer or a blend of polypropylene with another synthetic polymer.

A polypropylene homopolymer as component a) is further preferred.

Polypropylene homopolymer also covers long chain branched polypropylene.

Polypropylene, can be prepared by different, for instance by the following, methods:

Catalytic polymerization using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

According to a further preferred embodiment of the present invention, component a) is a polypropylene random copolymer, alternating or segmented copolymer or block copolymer containing one or more comonomers selected from the group consisting of ethylene, $C_4$-$C_{20}$-α-olefin, vinylcyclohexane, vinylcyclohexene, $C_4$-$C_{20}$alkandiene, $C_5$-$C_{12}$cycloalkandiene and norbornene derivatives; the total amount of propylene and the comonomer(s) being 100%.

Polypropylene copolymer also covers long chain branched polypropylene copolymer.

Examples of suitable $C_4$-$C_{20}$α-olefins are 1-butene, 1-pentene, 1-hexene, 1-heptene, 1-octene, 1-nonene, 1-decene, 1-undecene, 1-dodecene, 1-tetradecene, 1-hexadecene, 1-octadecene, 1-eicosene and 4-methyl-1-pentene.

Examples of suitable $C_4$-$C_{20}$αalkandienes are hexadiene and octadiene.

Examples of suitable $C_6$-$C_{12}$cycloalkandienes are cyclopentadiene, cyclohexadiene and cyclooctadiene.

Examples of suitable norbornene derivatives are 5-ethylidene-2-norbornene (ENB), dicyclopentadiene (DCP) and methylene-domethylene-hexahydronaphthaline (MEN).

A propylene/ethylene copolymer contains for example 50 to 99.9%, preferably 80 to 99.9%, in particular 90 to 99.9%, by weight of propylene.

A propylene copolymer wherein the comonomer is a $C_9$-$C_{20}$α-olefin such as e.g. 1-nonene, 1-decene, 1-undecene, 1-dodecene, 1-tetradecene, 1-hexadecene, 1-octadecene or 1-eicosene; $C_9$-$C_{20}$alkandiene, $C_9$-$C_{12}$cycloalkandiene or a norbornene derivative such as e.g. 5-ethylidene-2-norbornene (ENB) or methylene-domethylene-hexahydronaphthaline (MEN) contains preferably more than 90 mol %, in particular 90 to 99.9 mol % or 90 to 99 mol %, of propylene.

A propylene copolymer wherein the comonomer is a $C_4$-$C_8$α-olefin such as e.g. 1 butene, 1-pentene, 1-hexene, 1-heptene, 1-octene or 4-methyl-1-pentene; vinylcyclohexane, vinylcyclohexene, $C_4$-$C_8$alkandiene or $C_5$-$C_8$cycloalkandiene contains preferably more than 80 mol %, in particular 80 to 99.9 mol % or 80 to 99 mol %, of propylene.

Further examples of component a) are propylene/isobutylene copolymer, propylene/butadiene copolymer, propylene/cycloolefin copolymer, terpolymers of propylene with ethylene and a diene such as hexadiene, dicyclopentadiene or ethylidene-norbornene; propylene/1-olefin copolymers where the 1-olefin is generated in situ; and propylene/carbon monoxide copolymers.

Other examples of component a) are blends of polypropylene with propylene/ethylene copolymers, propylene/butylene copolymers, polyethylene, e.g. HDPE or LDPE; polybutene, polyisobutylene, poly-4-methylpentene or alternating or random polyalkylene/carbon monoxide copolymers. These blends contain preferably at least 50% by weight, relative to the weight of the total blend, of polypropylene.

Component b) is preferably 0.0001 to 5%, for example 0.001 to 5%, 0.001 to 2%, 0.005 to 1%, 0.01 to 1% or 0.01 to 0.05%, relative to the weight of component a), of one or more compounds of the formula (I), (II) or (III).

A further preferred embodiment of the present invention relates to a composition containing as additional component c-1) e.g. 0.001 to 5%, preferably 0.01 to 5%, relative to the weight of component a), of one or more conventional nucleating agents.

Examples of conventional nucleating agents are
1) Aromatic sorbitol acetals, for example
   1,3:2,4-bis(benzylidene)sorbitol, commercially available as Irgaclear D®, Millad 3905® and Gel All D®.
   1,3:2,4-bis(4-methylbenzylidene)sorbitol, commercially available as Irgaclear DM®, Millad 3940®, NC-6 (Mitsui®) and Gel All MD®.
   1,3:2,4-bis(3,4-dimethylbenzylidene)sorbitol, commercially available as Millad 3988®.
   1,3:2,4-bis(3,4-dimethylbenzylidene)sorbitol, commercially available as NC-4 (Mitsui®)
2) Nucleating agents based upon salts of phosphoric acid, for example
   2,2'-Methylen-bis-(4,6-di-tert-butylphenyl)phosphate, commercially available as Adeka Stab NA11® and Adeka Stab NA21®.
3) Nucleating agents based upon salts of carboxylic acid, for example sodium benzoate.
4) Nucleating agents based upon carboxy aluminum-hydroxide, for example
   aluminum hydroxy-bis[4-(tert-butyl)benzoate], commercially available as Sandostab 4030®.
5) Nucleating agents based upon salts of rosin, respectively abietic acid, for example
   Pinecrystal KM-1300®.
   Pinecrystal KM-1600®.
6) Other nucleating agents, for example Zinc (II) monoglycerolate commercially available as Prifer 3888® and Prifer 3881®.
7) Di-sodium salt of cis-endo-bicycle(2.2.1)heptane 2,3-dicarboxylic acid (=Chemical Abstracts Registry No. 351870-33-2), commercially available as Hyperform HPN-68®.

Another embodiment of the present invention relates to a composition containing
a) a crystallizable synthetic polymer and
b) a nucleating agent, in particular a haze reducing agent;

characterized in that component b) is able to provide the composition with the lowest possible haze value, which is at least 80% of the original haze value, preferably 10 to 80% or 10 to 50% or 10 to 40% or 20 to 80% or 20 to 50% or 20 to 40%, in the concentration range of 0.001 to 0.3%, preferably 0.0025 to 0.15% or 0.005 to 0.10% or 0.0075 to 0.05% or 0.01 to 0.02%, relative to the weight of component a); the original haze value of the composition is the haze value obtained without using component b) and measured on plaques of 1.0-1.2 mm thickness.

A further embodiment of the present invention is a method for providing a synthetic polymer with a haze value which is smaller than 62%; the haze value being measured at a plate of 1.0-1.2 mm thickness; which comprises incorporating into the synthetic polymer one or more compounds of the formula (I) (II) or (III) as defined above.

Another embodiment of the present invention is the use of a compound of the formula (I), (II) or (III) as haze reducing agent for a synthetic polymer.

Here, a normalized haze value ($Haze_{norm}$) is defined as indicated below.

$$Haze_{norm} = \frac{\text{Haze of a composition according to the present invention} \times 100\%}{\text{Haze of the corresponding composition without component } b)}$$

Examples of Haze$_{norm}$ are 1 to 80%, 2 to 80%, 4 to 80%, 10 to 80%, 1 to 70%, 2 to 70%, 4 to 70%, 10 to 70%, 1 to 60%, 2 to 60%, 4 to 60%, 10 to 60%, 1 to 50%, 2 to 50%, 4 to 50%, 10 to 50%, 1 to 40%, 2 to 40%, 4 to 40%, 10 to 40%, 1 to 30%, 2 to 30%, 4 to 30%, 10 to 30%, Haze$_{norm}$ is preferably 5 to 30%. Of particular interest is a Haze$_{norm}$ of 10 to 20%.

A further embodiment of the present invention relates to a method for increasing the crystallization temperature of a synthetic polymer, which comprises incorporating into the synthetic polymer one or more compounds of the formula (I), (II) or (III) as defined above. The crystallization temperature may be increased for example by more than 3° C., in particular more than 5° C. An increase of the crystallization temperature of 4 to 40° C., e.g. 4 to 25° C. or 4 to 20° C., in particular 10 to 25° C. is especially preferred.

Another embodiment of the present invention is the use of a compound of the formula (I), (II) or (III) as nucleating agent for synthetic polymers.

The compositions of the present invention may be prepared by standard procedures, well known to those skilled in the art, of compounding, such as mixing the prescribed components in a conventional mixer and melting and kneading the mixture with a single- or twin-screw extruder, or the like.

The compounds of the formula (I), (II) or (III) can be added to the synthetic polymer by using any technology known in the art, e.g. in the form of a powder, granules, concentrates, spray coatings or masterbatches, which contain these compounds in a concentration of, for example, 1 to 50%, in particular 1 to 10% by weight, either in pure form or along with other co-additives and optionally suitable carrier materials according to well known and established technologies.

Additional materials can optionally be added to the compositions of the present invention in a concentration range that does not adversely affect the beneficial effects of the invention. These materials may include stabilizers, antioxidants, antibacterial agents, ultraviolet absorbers, thermostabilizers, light stabilizers, neutralizers, antistatic agents, antiblocking agents, heavy metal inactivation agents, flame retardants, lubricants, peroxides, hydrotalcite, foaming agents, elastomers, processing aids, additional nucleating agents, and the like and mixtures thereof.

More detailed examples of these conventional additives are listed below.

1. Antioxidants 1.1. Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,4,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl)phenol, 2,4-dimethyl-6-1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl)adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulfide.

1.6. Alkylidenebisphenols, for example 2,2'-methylenebis(6-tert-butyl-4-methylphenol), 2,2'-methylenebis(6-tert-butyl-4-ethylphenol), 2,2-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butylhydroxy-2-methylphenyl)butane, 1,1-bis(5-tert-butyl-4-hydroxy-2-methylphenyl)-3-n-dodecylmercaptobutane, ethylene glycol bis[3,3-bis(3'-tertbutyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy2-methylphenyl)-4-n-dodecylmercaptobutane, 1,1,5,5-tetra(5-tert-butyl-4-hydroxy-2-methylphenyl)pentane.

1.7. O—, N— and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, dodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3, 5-di-tert-butyl-4-hydroxyphenoxy)-1,2,3-triazine, 1,3,5-tris(3,5-di-tert-butylhydroxybenzyl)isocyanurate, 1,3,5-tris(4-tert-butyl-3-hydroxy-2,6-dimethylbenzyl)isocyanurate, 2,4,6-tris-(3, 5-di-tert-butyl-4-hydroxyphenylethyl)-1,3,5-triazine, 1,3,5-tris(3,5-di-tert-butyl-4-hydroxyphenylpropionyl)-hexahydro-1, 3,5-triazine, 1,3,5-tris(3,5-dicyclohexyl-4-hydroxybenzyl)isocyanurate.

1.11. Benzylphosphonates, for example dimethyl-2,5-ditert-butyl-4-hydroxybenzylphosphonate, diethyl-3,5-di-tert-butyl-4-hydroxybenzylphosphonate, dioctadecyl3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2,2,2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2,2,2]octane; 3,9-bis[2-{3-(3-tertbutyl-4-hydroxy-5-methylphenyl)propionyloxy}-1,1-dimethylethyl]-2,4,8,10-tetraoxaspiro[5,5]-undecane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-3,5-di-tert-butyl-4-hydroxyphenyl)propionic acid e.g. N,N'-bis(3,5-di-tertbutyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N-bis[2-(3-[3,5-di-tert-butyl-4-hydroxyphenyl]propionyloxy)ethyl]oxamide (Naugard®XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-4-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butyl-aminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylamino-methylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyldiphenylamines, a mixture of mono- and dialkylated dodecyldiphenylamines, a mixture of mono- and dialkylated isopropyl/isohexyl-diphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octylphenothiazines, N-allylphenothiazine, N,N,N',N'-tetraphenyl-1,4-diaminobut-2-ene, N,N-bis(2,2,6,6-tetramethylpiperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV absorbers and light stabilisers 2.1. 2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-ditert-butyl-2'-hydroxyphenyl)-5-chlorobenzotriazole, 2-(3'-tert-butyl-2'-hydroxy-5'-methylphenyl)-5-chlorobenzotriazole, 2-3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-3',5'-bis(α,αdimethylbenzyl)-2'-hydroxyphenyl)benzotriazole, 2-3'-tertbutyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl) phenylbenzotriazole, 2,2'-methylenebis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$—], where R=3'-tert-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]-benzotriazole; 2-[2'-hydroxy-3'-(1,1,3,3-tetramethylbutyl)-5'-(α,α-dimethylbenzyl)phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl)n-butyl-3,5-di-tert-butyl-4-hydroxybenzylmalonate, the condensate of 1-(2-hydroxyethyl)-2, 2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1, 3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)-malonate, 3-n-octyl-7,7,9,9-tetramethyl-1,3,8-triazaspiro[4.5]decane-2,4-dione, bis(1-octyloxy-2, 2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)-ethane, the condensate of 2-chloro-4,6-di-(4-n-butylamino-1,2,2,6,6-pentamethylpiperidyl)-1, 3,5-triazine and 1,2-bis(3-aminopropylamino)ethane, 8-acetyl-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino)ethane and 2,4,6-tri-chloro-1, 3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-piperidyl)-n-dodecylsuccinimide, 2-undecyl-7,7,9,9-tetramethyl-1-oxa-3,8-diaza-4-oxo-spiro [4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1, 3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropyloxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicyloyl-N'-salicyloyl hydrazine, N,N'-bis(salicyloyl) hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxaly dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecyl pentaerythritol diphosphite, bis(2,4-di-tert-butylphenyl)pentaerythritol diphosphite, bis(2,4-di-cumylphenyl)pentaerythritol diphosphite, bis(2,6-di-tert-butylmethylphenyl)pentaerythritol diphosphite, diisodecyloxypentaerythritol diphosphite, bis (2,4-di-tert-butyl-methylphenyl)-pentaerythritol diphosphite, bis(2,4,6-tris(tert-butylphenyl)pentaerythritol diphosphite, tristearyl sorbitol triphosphite, tetrakis(2,4-di-tert-butylphenyl)-4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tertbutyl-12-methyl-dibenz[d,g]-1,3,2-dioxaphosphocin, 2,2',2"-nitrilo-[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1, 3,2-dioxaphosphirane.

The following phosphites are especially preferred:

Tris(2,4-di-tert-butylphenyl) phosphate (Irgafos®168, Ciba-Geigy), tris(nonylphenyl) phosphite,

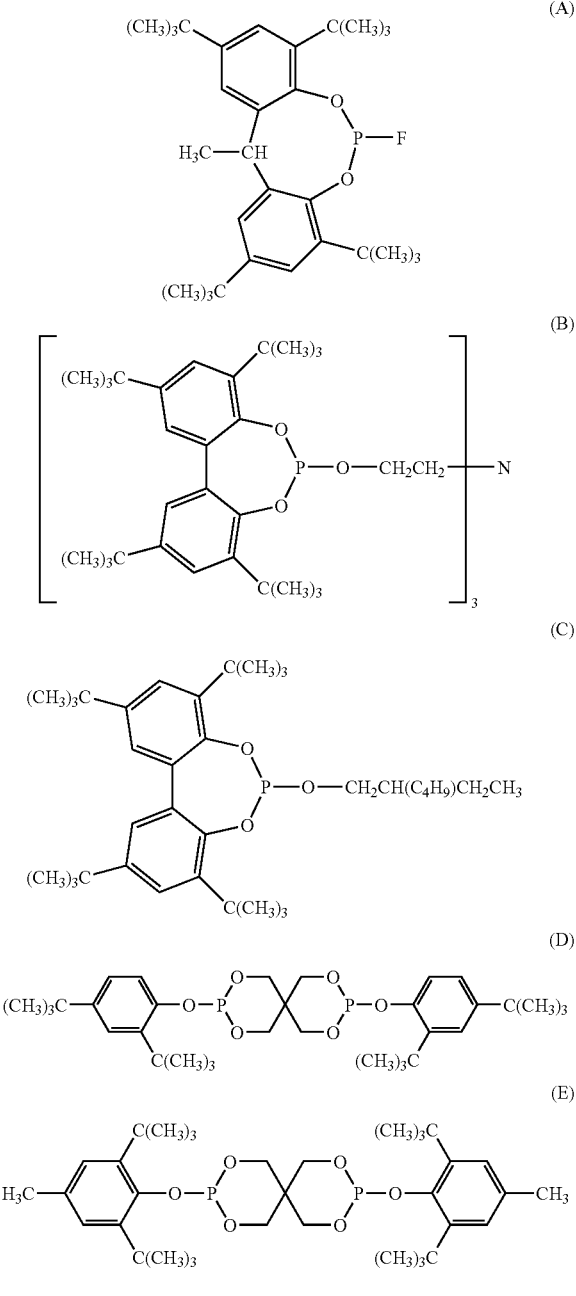

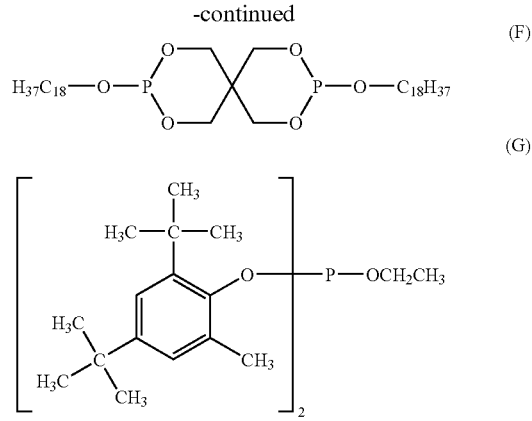

5. Hydroxylamines, for example N,N-dibenzylhydroxylamine, N,N-diethylhydroxylamine, N,N-dioctylhydroxylamine, N,N-diaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-octadecyl-alpha-pentadecylnitrone, N-haptadecyl-alpha-heptadecylnitrone, N-octadecyl-alpha-hexadecylnitrone, nitrone derived from N,N-dialkylhydroxylamine derived from hydrogenated tallow amine.

7. Thiosynergists, for example dilauryl thiodipropionate or distearyl thiodipropionate.

8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(βdodecylmercapto)propionate.

9. Polyamide stabilisers, for example copper salts in combination with iodides and/or phosphorus compounds and salts of divalent manganese.

10. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty adds, for example calcium stearate, zinc stearate, magnesium behenate, magnesium stearate, sodium ricinoleate and potassium palmitate, antimony pyrocatecholate or zinc pyrocatecholate.

11. Conventional nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic adds and the salts thereof, e.g. 4-tert-butylbenzoic acid, adipic acid, diphenylacetic acid, sodium succinate or sodium benzoate; polymeric compounds, such as Ionic copolymers (Ionomers). Especially preferred are 1,3:2,4-bis(3',4'-dimethylbenzylidene) sorbitol, 1,3:2,4-di(paramethyldibenzylidene)sorbitol, and 1,3:2,4-di(benzylidene)sorbitol.

12. Other additives, for example plasticisers, lubricants, rheology additives, catalysts, flow-control agents, optical brighteners, flameproofing agents, antistatic agents and blowing agents.

13. Benzofuranones and indolinones, for example those disclosed in U.S. Pat. Nos. 4,325,863; 4,338,244; 5,175,312; 5,216,052; 5,252,643; DE-A-4316611; DE-A-4316622; DE-A-4316876; EP-A-0589839 or EP-A-0591102 or 3-[4-(2-acetoxyethoxy)-phenyl]-5,7-di-tert-butylbenzofuran-2-one, 5,7-di-tert-butyl-3-[4-(2-stearoyloxyethoxy)phenyl]-benzofuran-2-one, 3,3'-bis[5,7-di-tert-butyl-3-(4-[2-hydroxyethoxy]phenyl)benzofuran-2-one], 5,7-di-tert-butyl-3-(4-oxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one.

The weight ratio of the above described component b) to the conventional additive is preferably 1:100 to 100:1, for example 1:90 to 90:1, 1:80 to 80:1, 1:70 to 70:1, 1:60 to 60:1, 1:50 to 50:1, 1:40 to 40:1, 1:30 to 30:1, 1:20 to 20:1, 1:10 to 10:1, 1:5 to 5:1, 1:4 to 4:1, 1:3 to 3:1, 1:2 to 2:1 or 1:1, A preferred embodiment of the present invention relates to a composition containing as additional component c-2) one or more sterically hindered amine compounds.

Preferred examples of these sterically hindered amine compounds are those listed above under item 2.6. The combined use of components b) and c-2) can even lead to a synergistic effect in further reducing the haze of a crystallizable synthetic polymer. Component c-2) is preferably used in an amount of 5-70%, more preferably 10-30% and most preferably 15-25%, relative to the weight of component b).

Another preferred embodiment of the present invention relates to a composition containing as additional component c-3) one or more lubricants.

Component c-3) is preferably at least one lubricant selected from the group consisting of synthetic or natural waxes and amides of fatty acids. A comprehensive definition and review on waxes is given, for example, in Ullmann's Encyclopedia of Industrial Chemistry, Vol. A-28, VCH Verlagsgesellschaft mbH, D-69451 Weinheim, 1996 (in particular, see pages 104 ff. therein), which is incorporated herewith by reference.

Preferably suited are synthetic waxes, most preferably fully synthetic waxes of low polarity. Examples are Fischer-Tropsch waxes, high-pressure polyethylene waxes, Ziegler-Natta polyethylene waxes, metallocene polyethylene waxes and Ziegler-Natta polypropylene waxes.

A most suitable commercially available Fischer-Tropsch wax is for example AdSperse 868®, available from SASOL®, Republic of South Africa. Examples of most suitable Ziegler-Natta waxes are Licowax PE 520® and Licowax PP 230® commercially available from Clariant GmbH, Germany.

Most suitable polyolefin waxes have preferably a molecular weight $M_w$ of more than 800 g/mol and less than 20'000 g/mol.

Examples of suitable natural waxes are refined esters of montan wax and decolorized paraffin waxes.

Examples of fatty acid amides are stearamide, erucamide and oleamide which are commercially available as Atmer SA 1750®, Atmer SA 1753®, respectively Atmer SA 1756®, Atmer SA 1758® and Atmer SA 1759®.

Component c3) is in particular at least one lubricant selected from the group consisting of Fischer-Tropsch wax, high-pressure polyethylene wax, Ziegler-Natta polyethylene wax, metallocene polyethylene wax, Ziegler-Natta polypropylene wax, natural waxes and amides of fatty acids.

The combination of component b) and component c-3) may also show a synergistic effect in reducing the haze of a crystallizable synthetic polymer. Component c-3) is preferably present in an amount of 0.01-5%, more preferable 0.1-1%, most preferable 0.2-0.7%, relative to the weight of component a).

Examples of processing of the compositions according to the present invention are: Injection blow molding, extrusion, blow molding, rotomolding, in mold decoration (back injection), slush molding, injection molding, co-injection molding, forming, compression molding, pressing, film extrusion (cast film; blown film), fiber spinning (woven, non-woven), drawing (uniaxial, biaxial), annealing, deep drawing, calandering, mechanical transformation, sintering, coextrusion, coating, lamination, crosslinking (radiation, peroxide, silane), vapor deposition, weld together, glue, vulkanization, thermoforming, pipe extrusion, profile extrusion, sheet extrusion; sheet casting, spin coating, strapping, foaming, recycling/rework, extrusion coating, visbreaking (peroxide, thermal), fiber melt blown, spun bonded, surface treatment (corona discharge, flame, plasma), sterilization (by gamma rays, electron beams), gel-coating, tape extrusion, SMC-process or plastisol.

The compositions according to the present invention can be advantageously used for the preparation of various shaped articles. Examples are:

I-1) Floating devices, marine applications, pontoons, buoys, plastic lumber for decks, piers, boats, kayaks, oars, and beach reinforcements.

I-2) Automotive applications, in particular bumpers, dashboards, battery, rear and front linings, moldings parts under the hood, hat shelf, trunk linings, interior linings, air bag covers, electronic moldings for fittings (lights), panes for dashboards, headlamp glass, instrument panel, exterior linings, upholstery, automotive lights, head lights, parking lights, rear lights, stop lights, interior and exterior trims; door panels; gas tank; glazing front side; rear windows; seat backing, exterior panels, wire insulation, profile extrusion for sealing, cladding, pillar covers, chassis parts, exhaust systems, fuel filter/filler, fuel pumps, fuel tank, body side mouldings, convertible tops, exterior mirrors, exterior trim, fasteners/fixings, front end module, glass, hinges, lock systems, luggage/roof racks, pressed/stamped parts, seals, side impact protection, sound deadener/insulator and sunroof.

I-3) Road traffic devices, in particular sign postings, posts for road marking, car accessories, warning triangles, medical cases, helmets, tires.

I-4) Devices for plane, railway, motor car (car, motorbike) including furnishings.

I-5) Devices for space applications, in particular rockets and satellites, e.g. reentry shields.

I-6) Devices for architecture and design, mining applications, acoustic quietized systems, street refuges, and shelters.

II-1) Appliances, cases and coverings in general and electric/electronic devices (personal computer, telephone, portable phone, printer, television-sets, audio and video devices), flower pots, satellite TV bowl, and panel devices.

II-2) Jacketing for other materials such as steel or textiles.

II-3) Devices for the electronic industry, in particular insulation for plugs, especially computer plugs, cases for electric and electronic parts, printed boards, and materials for electronic data storage such as chips, check cards or credit cards.

II-4) Electric appliances, in particular washing machines, tumblers, ovens (microwave oven), dish-washers, mixers, and irons.

II-5) Covers for lights (e.g. street-lights, lamp-shades).

II-6) Applications in wire and cable (semi-conductor, insulation and cable-jacketing).

II-7) Foils for condensers, refrigerators, heating devices, air conditioners, encapsulating of electronics, semi-conductors, coffee machines, and vacuum cleaners.

III-1) Technical articles such as cogwheel (gear), slide fittings, spacers, screws, bolts, handles, and knobs.

III-2) Rotor blades, ventilators and windmill vanes, solar devices, swimming pools, swimming pool covers, pool liners, pond liners, closets, wardrobes, dividing walls, slat walls, folding walls, roofs, shutters (e.g. roller shutters), fittings, connections between pipes, sleeves, and conveyor belts.

III-3) Sanitary articles, in particular shower cubicles, lavatory seats, covers, and sinks.

III-4) Hygienic articles, in particular diapers (babies, adult incontinence), feminine hygiene articles, shower curtains, brushes, mats, tubs, mobile toilets, tooth brushes, and bed pans.

III-5) Pipes (cross-linked or not) for water, waste water and chemicals, pipes for wire and cable protection, pipes for gas, oil and sewage, guttering, down pipes, and drainage systems.

III-6) Profiles of any geometry (window panes) and siding.

III-7) Glass substitutes, in particular extruded plates, glazing for buildings (monolithic, twin or multiwall), aircraft, schools, extruded sheets, window film for architectural glazing, train, transportation, sanitary articles, and greenhouse.

III-8) Plates (walls, cutting board), extrusion-mating (photographic paper, tetrapack and pipe coating), silos, wood substitute, plastic lumber, wood composites, walls, surfaces, furniture, decorative foil, floor coverings (Interior and exterior applications), flooring, duck boards, and tiles.

III-9) Intake and outlet manifolds.

III-10) Cement-, concrete-, composite-applications and covers, siding and cladding, hand rails, banisters, kitchen work tops, roofing, roofing sheets, tiles, and tarpaulins.

IV-1) Plates (walls and cutting board), trays, artificial grass, astroturf, artificial covering for stadium rings (athletics), artificial floor for stadium rings (athletics), and tapes.

IV-2) Woven fabrics continuous and staple, fibers (carpets/hygienic articles/geotextiles/monofilaments; filters; wipes/curtains (shades)/medical applications), bulk fibers (applications such as gown/protection clothes), nets, ropes, cables, strings, cords, threads, safety seat-belts, clothes, underwear, gloves; boots; rubber boots, intimate apparel, garments, swimwear, sportswear, umbrellas (parasol, sunshade), parachutes, paraglides, sails, "balloon-silk", camping articles, tents, airbeds, sun beds, bulk bags, and bags.

IV-3) Membranes, insulation, covers and seals for roofs, tunnels, dumps, ponds, dumps, walls roofing membranes, geomembranes, swimming pools, curtains (shades)/sun-shields, awnings, canopies, wallpaper, food packing and wrapping (flexible and solid), medical packaging (flexible & solid), airbags safety belts, arm- and head rests, carpets, centre console, cockpits, dashboard, door, overhead console module, door trim, headliners, interior lighting, interior mirrors, parcel shelf, rear luggage cover, seats, steering column, steering wheel, textiles, and trunk trim.

V) Films (packaging, dump, laminating, agriculture and horticulture, greenhouse, mulch, tunnel, silage), bale wrap, swimming pools, waste bags, wallpaper, stretch film, raffia, desalination film, batteries, and connectors.

VI-1) Food packing and wrapping (flexible and solid), BOPP, BOPET, bottles.

VI-2) Storage systems such as boxes (crates), luggage, chest, household boxes, pallets, shelves, tracks, screw boxes, packs, and cans.

VI-3) Cartridges, syringes, medical applications, containers for any transportation, waste baskets and waste bins, waste bags, bins, dust bins, bin liners, wheely bins, container in general, tanks for water/used water/chemistry/gas/oil/gasoline/diesel; tank liners, boxes, crates, battery cases, troughs, medical devices such as piston, ophthalmic applications, diagnostic devices, and packing for pharmaceuticals blister.

VII-1) Extrusion coating (photo paper, tetrapack, pipe coating), household articles of any kind (e.g. appliances, thermos bottle/clothes hanger), fastening systems such as plugs, wire and cable clamps, zippers, closures, locks, and snap-closures.

VII-2) Support devices, articles for the leisure time such as sports and fitness devices, gymnastics mats, ski-boots, inline-skates, skis, big foot, athletic surfaces (e.g. tennis grounds); screw tops, tops and stoppers for bottles, and cans.

VII-3) Furniture in general, foamed articles (cushions, impact absorbers), foams, sponges, dish clothes, mats, garden chairs, stadium seats, tables, couches, toys, building kits (boards/figures/balls), playhouses, slides, and play vehicles.

VII-4) Materials for optical and magnetic data storage.

VII-5) Kitchen ware (eating, drinking, cooking, storing).

VII-6) Boxes for CD's, cassettes and video tapes; DVD electronic articles, office supplies of any kind (ball-point pens, stamps and ink-pads, mouse, shelves, tracks), bottles of any volume and content (drinks, detergents, cosmetics including perfumes), and adhesive tapes.

VII-7) Footwear (shoes/shoo-soles), insoles, spats, adhesives, structural adhesives, food boxes (fruit, vegetables, meat, fish), synthetic paper, labels for bottles, couches, artificial joints (human), printing plates (flexographic), printed circuit boards, and display technologies.

VII-8) Devices of filled polymers (talc, chalk, china day (kaolin), wollastonite, pigments, carbon black, $TiO_2$, mica, nanocomposites, dolomite, silicates, glass, asbestos).

Thus, a further embodiment of the present invention relates to a shaped article, in particular a film fiber, profile, pipe, bottle, tank or container, obtainable from a composition as described above.

A molded article is preferred. The molding is in particular effected by in injection, blow, compression, roto-molding or slush-molding or extrusion.

A further embodiment of the present invention relates to a monoaxially-oriented film or a biaxially-oriented film obtainable from a composition as described above.

The present invention further relates to a multilayer system in which one or more layers contain a composition as described above.

Some compounds of the formulae (I), (II) and (III) are novel. Thus, the present invention also relates to a compound of the formula (IA), (IIA) or (IIIA)

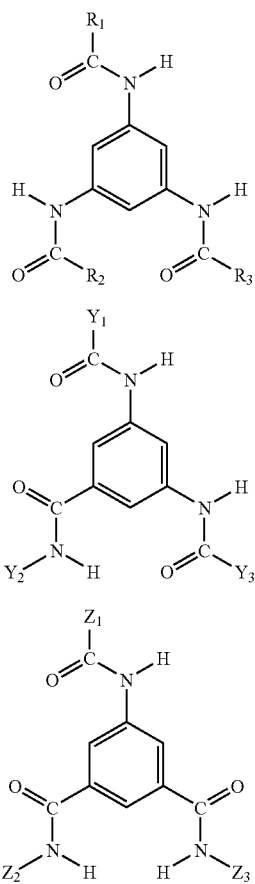

(IA)

(IIA)

(IIIA)

wherein $R_1$, $R_2$ and $R_3$, or $Y_1$, $Y_2$ and $Y_3$, or $Z_1$, $Z_2$ and $Z_3$ independently of one another are $C_3$-$C_{20}$alkyl or $C_1$-$C_{20}$alkyl substituted by one or more hydroxy;

$C_2$-$C_{20}$alkenyl unsubstituted or substituted by one or more hydroxy;

$C_2$-$C_{20}$alkyl interrupted by oxygen or sulfur;

$C_3$-$C_{12}$cycloalkyl unsubstituted or substituted by one or more $C_1$-$C_{20}$alkyl;

($C_3$-$C_{12}$cycloalkyl)-$C_1$-$C_{10}$alkyl unsubstituted or substituted by one or more $C_1$-$C_{20}$alkyl;

bis[$C_3$-$C_{12}$cycloalkyl]-$C_1$-$C_{10}$alkyl unsubstituted or substituted by one or more $C_1$-$C_{20}$alkyl;

a bicyclic or tricyclic hydrocarbon radical with 5 to 20 carbon atoms unsubstituted or substituted by one or more $C_1$-$C_{20}$alkyl;

phenyl substituted by one or more radicals selected from $C_1$-$C_{20}$alkyl, $C_1$-$C_{20}$alkylamino, di($C_1$-$C_{20}$alkyl)amino and hydroxy; with the proviso that 2,3-dihydroxyphenyl is disclaimed;

m-methoxyphenyl;

phenyl-$C_1$-$C_{20}$alkyl unsubstituted or substituted by one or more radicals selected from $C_1$-$C_{20}$alkyl, $C_3$-$C_{12}$cycloalkyl, phenyl, $C_1$-$C_{20}$alkoxy and hydroxy;

phenylethenyl unsubstituted or substituted by one or more $C_1$-$C_{20}$alkyl;

biphenyl-($C_1$-$C_{10}$alkyl) unsubstituted or substituted by one or more $C_1$-$C_{20}$alkyl;

naphthyl unsubstituted or substituted by one or more $C_{1-20}$alkyl;

naphthyl-$C_1$-$C_{20}$alkyl unsubstituted or substituted by one or more $C_1$-$C_{20}$alkyl;

naphthoxymethyl unsubstituted or substituted by one or more $C_1$-$C_{20}$alkyl;

biphenylenyl, flourenyl, anthryl;

a 5- to 6-membered heterocyclic radical unsubstituted or substituted by one or more $C_1$-$C_{20}$alkyl;

a $C_1$-$C_{20}$hydrocarbon radical containing one or more halogen; or tri($C_1$-$C_{10}$alkyl)silyl($C_1$-$C_{10}$alkyl);

with the proviso that (1) $R_2$, $R_3$, $Y_1$, $Y_2$, $Y_3$, $Z_1$, $Z_2$ and $Z_3$ independently of one another are additionally methyl, ethyl or 2,3-dihydroxyphenyl;

(2) at least one of the radicals $R_1$, $R_2$ and $R_3$, or $Y_1$, $Y_2$ and $Y_3$, or $Z_1$, $Z_2$ and $Z_3$ is branched $C_3$-$C_{20}$alkyl unsubstituted or substituted by one or more hydroxy;

$C_2$-$C_{20}$alkyl Interrupted by oxygen or sulfur;

$C_3$-$C_{12}$cycloalkyl unsubstituted or substituted by one or more $C_1$-$C_{20}$alkyl;

($C_3$-$C_{12}$cycloalkyl)-$C_1$-$C_{10}$alkyl unsubstituted or substituted by one or more $C_1$-$C_{20}$alkyl;

a bicyclic or tricyclic hydrocarbon radical with 5 to 20 carbon atoms unsubstituted or substituted by one or more $C_1$-$C_{20}$alkyl;

phenyl unsubstituted or substituted by one or more radicals selected from $C_1$-$C_{20}$alkyl, $C_1$-$C_{20}$alkoxy, $C_1$-$C_{20}$alkylamino, di($C_1$-$C_{20}$alkyl)amino, hydroxy and nitro;

phenyl-$C_1$-$C_{20}$alkyl unsubstituted or substituted by one or more radicals selected from $C_1$-$C_{20}$alkyl, $C_3$-$C_{12}$cycloalkyl, phenyl, $C_1$-$C_{20}$alkoxy and hydroxy;

biphenyl-($C_1$-$C_{10}$alkyl) unsubstituted or substituted by one or more $C_1$-$C_{20}$alkyl;

naphthyl $C_1$-$C_{20}$alkyl unsubstituted or substituted by one or more $C_1$-$C_{20}$alkyl; or tri($C_1$-$C_{10}$alkyl)silyl($C_1$-$C_{10}$alkyl); and (3) the compound N-t-butyl-3,5-bis-(pivaloylamino)-benzamide is disclaimed.

Preferred compounds of the present invention are those wherein at least one of the radicals $R_1$, $R_2$ and $R_3$, or $Y_1$, $Y_2$ and $Y_3$, or $Z_1$, $Z_2$ and $Z_3$ is branched $C_3$-$C_{20}$alkyl, or $C_3$-$C_{12}$cycloalkyl unsubstituted or substituted by one or more $C_1$-$C_{20}$alkyl.

The compounds described in the working examples are of particular interest.

The particular uses and preferences described above for the compounds of the formulae (I), (II) and (III) are also applicable to the compounds of the formulae (IA), (IIA) and (IIIA).

The compounds of the formula (I), (II) or (III) can be prepared in analogy to known processes as shown in the following working examples. The compounds can also be prepared for example without the use of any solvent. Unless indicated otherwise, heretofore and hereinafter, all parts and percentages are by weight and all temperatures are given in degrees Celsius (° C.). "Customary working up" means: addition to water, filtration of precipitate, extracting with organic solvent and/or purifying the product by crystallization and/or chromatography and/or sublimation.

A General Example of the Preparation of the Compounds of the Formula (I):

The compounds of the formula (I) can be synthesized e.g. by hydrogenation of 1,3,5-trinitrobenzene, 3,5-dinitroaniline or 1,3-diamino-5-nitrobenzene with hydrogen and an appropriate metal catalyst in an appropriate organic solvent. The thus obtained 1,3,5-triaminobenzene can be isolated or optionally transferred into the corresponding hydrochloride and can be purified in both forms by recrystallization from an appropriate solvent. It is also possible to use the solution of the crude trisamine or the isolated crude trisamine (with or without removal of the water formed in the hydrogenation) for the subsequent acylation reaction. Possible catalysts are e.g. Pd. $PtO_2$, Raney-Nickel etc., preferably the commercially available versions on carbon support. The hydrogenation can be carried out under normal pressure or under pressure at temperatures between 20 and 120° C. (Safety checks are highly recommended before scale up). Appropriate solvents for the hydrogenation are e.g. tetrahydrofuran (THF), THF/methanol, dimethylformamide (DMF) or N-methylpyrrolidinone (NMP). An alternative procedure is reduction with Raney-Nickel and hydrazine as hydrogen source (see e.g. Organikum, chapter 8.1, Reduktion von Nitroverbindungen und Nitresoverbindung, Berlin, 1970) or other known standard reductions. Recrystallization can be carried out e.g. with methanol, ethanol or other alcohols. The free amine (or the amine obtained from the hydrochloride and an appropriate base) can be acylated with a stoichiometric amount or an excess of the corresponding acid chloride, preferably in the presence of an organic or inorganic non-interacting base e.g. triethylamine, tributylamine, pyridine; another method uses a stoichiometric amount or an excess of the anhydride of the carboxylic acid as acylating agent; in this case no base is required. The reaction is carried out in the absence or preferably in the presence of a solvent. The ideal reaction temperature depends on the nature of the acylating agents (e.g. 0°-100° C.). Isolation/purification of the final product is carried out by precipitation/recrystallization/washing with an appropriate mixture of water/organic solvent or organic solvent/organic solvent or with a pure solvent, e.g. DMF/water, NMP/water, ethanol, methanol etc.

EXAMPLE A

Preparation of 1,3,5-tris[cyclohexylcarbonylamino]benzene

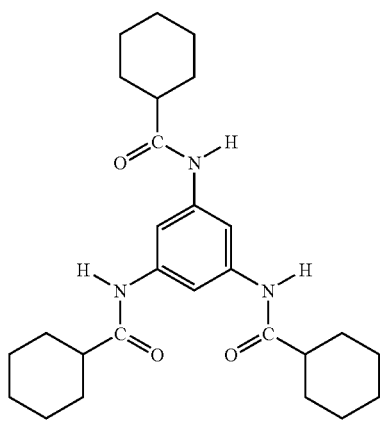

(= Compound I-1)

1) Preparation of 1,3,5-triaminobenzene trishydrochloride 16.85 g (0.092 mol) of 3,5-dinitroaniline is dissolved in a mixture of 60 ml of methanol and 300 ml of tetrahydrofuran. The mixture is placed in a Buechl glass reactor and 1.2 g of palladium 10 wt.-% on activated carbon is added. The reactor is dosed and under stirring 3 times purged with nitrogen and 3 times with hydrogen. The hydration is carried out at 40° C. and a hydrogen pressure of 4 bar for 24 h. The reaction mixture is transferred under inert atmosphere into a flask and filtered over 40 g of aluminum oxide (Alox N) to remove the activated carbon, the catalyst and water. The slightly colored solution is immediately converted into the trishydrochloride by the addition of a mixture of concentrated hydrochloride acid (100 ml) and methanol (200 ml). The precipitated product is filtered and washed with methanol and dried to yield a while to light-greyish solid.

Yield: 13.61 g (0.059 mol)=64% of theory.

$^1$H-NMR ($D_2O$): a singulett (3H) at 6.86 ppm.

2) Preparation of 1,3,5-tris[cyclohexylcarbonylamino]benzene 1.00 g (4.3 mmol) of 1,3,5-triaminobenzene trishydrochloride and 0.1 g of dry LiCl are added under Inert atmosphere to 50 ml of dry N-methylpyrrolidinone (NMP) and 10 ml of dry pyridine and cooled to 5° C. 2.10 g (14.3 mmol) of cyclohexanecarbonyl chloride is added. The reaction mixture is heated to 60° C. and stirred. After 24 hours the reaction mixture is added to 1000 ml of Ice water. The precipitate is filtered off. Customary work-up (recrystallization from toluene/n-hexane (1:1 mixture)) gives the desired product.

Yield: 1.33 g (2.93 mmol)=68.2% of theory.

Melting point: 286° C.

MS (EI): 453 ($M^+$).

EXAMPLE B

Preparation of 1,3,5-Tris[2,2-dimethylpropionylamino]benzene

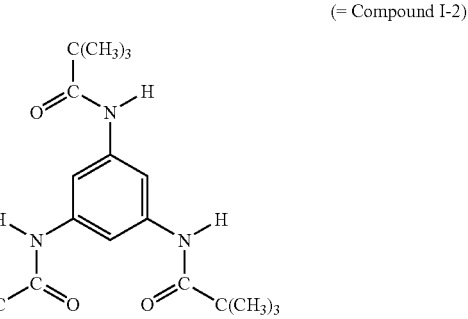

(= Compound I-2)

I) 1.00 g (4.3 mmol) of 1,3,5-triaminobenzene trishydrochloride (See Example A) and 0.1 g of LiCl are added under inert atmosphere to 50 ml of dry NMP and 10 ml of dry pyridine and cooled to 5° C. 1.73 g (14.3 mmol) of pivaloyl chloride is added. The reaction mixture is heated to 60° C. and stirred. After 24 hours the reaction mixture is added to 1000 ml of ice water. The precipitate is filtered off. Customary work-up (recrystallization from tetrahydrofuran) gives the desired product Yield: 0.64 g (1.70 mmol)=39.6% of theory.

Melting point: No melting point detected, sublimation.

MS (EI) 375 (M$^+$).

II) A preparation method of 1,3,5-triaminobenzene:

18 g (0.0983 mol) of 3,5-dinitroaniline in 180 ml of tetrahydrofuran are hydrogenated in the presence of 1.8 g Pd/C (10%) for 6 h at 20-40° under normal pressure. After separation of the catalyst by filtration, the filtrate is concentrated and a part of the product precipitated from the solution. The remaining product is isolated by distilling off the solvent.

Total yield: 10.77 g (=89% of theory).

Melting point: 117° (decomposition).

MS(CI): 124 (MH$^+$).

III) Direct synthesis of the compound I-2 from 1,3-diamino-5-nitrobenzene without isolation of the trisamine intermediate:

20 g (0.12 mol) of 1,3-diamino-5-nitrobenzene and 500 ml of N-methylpyrrolidone (NMP) are hydrogenated at 25° C. in the presence of 2 g Pd/C (10%) for 5 h at 1-2 bar in an autoclave. After addition of 35 ml of pivalic anhydride and stirring for 10 h at 100° C., the residue is filtered and extracted (Soxhlet) with 300 ml of methanol for 20 h. The extract is cooled to 25° C. and the precipitate is filtered and dried. The desired product is obtained as a colorless powder.

Yield: 4.9 g (=50% of theory).

$^1$H-NMR and MS are identical with the product described in I).

IV) Direct synthesis of the compound I-2 from 1,3-diamino-5-nitrobenzene without isolation of the trisamine intermediate:

20 g (0.12 mol) of 1,3-diamino-5-nitrobenzene and 500 ml of N-methylpyrrolidinone (NMP) are hydrogenated at 25° C. in the presence of 2 g Pd/C (10%) for 5 h/1-2 bar in an autoclave. Now, 120 g of pivalic anhydride are added and the solution is stirred for 10 h at 90° C. The catalyst is filtered off at 90° C. Then, the solution is cooled to 10° C. and the precipitate is filtered off. The precipitate is then washed with 200 ml of methanol and dried to give 35 g (71.7%) of off-white crystals. After recrystallization from DMF and DMF/water a white powder is obtained.

Yield 31.5 g (=66.4% of theory).

$^1$H-NMR and MS are identical with the product described in I).

V) In a similar way, compound I-2 can also be obtained by acylation of 1,3,5-triaminobenzene obtained by catalytic hydrogenation of 100.1 g (0.546 mol) of 3,5-dinitroaniline in 1 L of NMP with 5 g Pd/C (10%) for 6 h at 50° C., separation of the catalyst (filtration) and subsequent acylation with 615 ml (3.03 mol) of pivalic anhydride as described in IV).

Yield: 91.5% of theory.

$^1$H-NMR and MS are identical with the product described in I)

EXAMPLE C

Preparation of 1,3,5-tris[4-methylbenzoylamino]benzene (= Compound I-3)

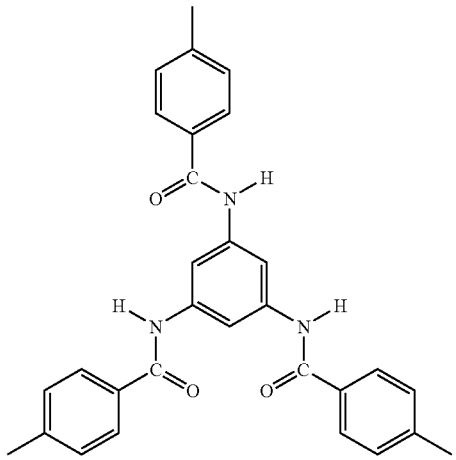

Compound I-3 is obtained as an off-white powder in analogy to Example A from 3.48 g (15.0 mmol) of 1,3,5-triaminobenzene hydrochloride, 8.34 g (54.0 mmol) of 4-methylbenzoyl chloride, 200 ml of NMP, 40 ml of triethylamine and 0.4 g of LiCl.

Yield: 1.92 g (=26.8% of theory).

Melting point: 278° C.

MS (EI): 477 (M$^{+\cdot}$).

EXAMPLE D

Preparation of 1,3,5-tris[3,4-dimethylbenzoylamino]benzene (= Compound I-4)

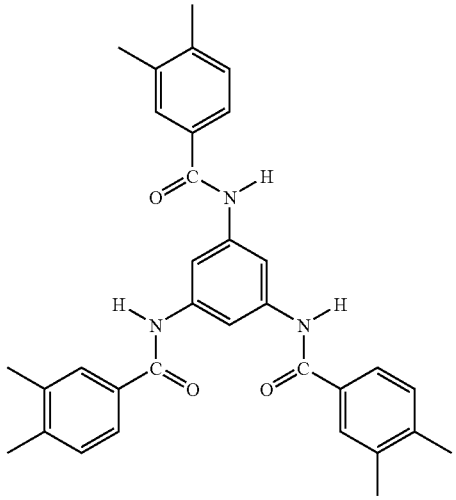

Compound I-4 is obtained as a colorless powder in analogy to Example A from 123 g (10.0 mmol) of 1,3,5-triaminobenzene hydrochloride, 6.07 g (36.0 mmol) of 3,4-dimethylbenzoyl chloride, 100 ml of NMP, 20 ml of triethylamine and 0.3 g of LiCl.

Yield: 2.55 g (=49.1% of theory).
Melting point: 304° C.
MS (EI) 519 (M$^{+\cdot}$).

EXAMPLE E

Preparation of 1,3,5-tris[3,5-dimethylbenzoylamino]benzene (= Compound I-5)

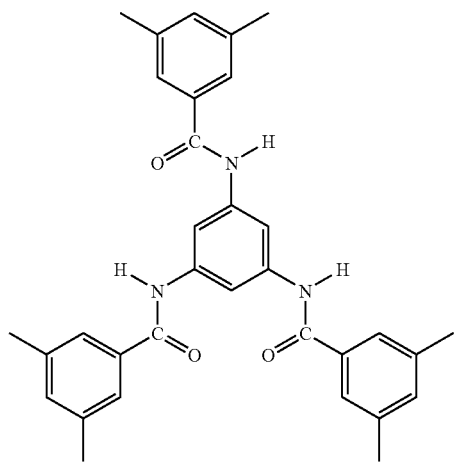

Compound I-5 is obtained as a colorless powder in analogy to example A from 1.23 g (10.0 mmol) of 1,3,5-triaminobenzene hydrochloride, 6.00 g (35.6 mmol) of 3,5-dimethylbenzoyl chloride, 100 ml of NMP, 20 ml of triethylamine and 0.3 g of LiCl.

Yield: 2.00 g (=38.5% of theory).
Melting point: 282° C. (polymorphous, highest endotherm peak).
MS (EI): 519 (M$^{+\cdot}$).

EXAMPLE F

Preparation of 1,3,5-tris[cyclopentanecarbonylamino]benzene (= Compound I-6)

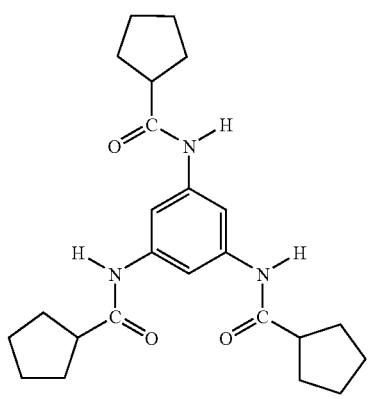

Compound I-6 is obtained as a colorless powder in analogy to Example A from 2.50 g (10.75 mmol) of 1,3,5-triaminobenzene hydrochloride, 4.75 g (35.83 mmol) of cyclopentanecarbonyl chloride, 70 ml of NMP, 15 ml of pyridine and 0.3 g of LiCl.

Yield: 1.00 g (=22.6% of theory).
Melting point: 285° C.
MS (EI): 411 (M$^{+\cdot}$).

EXAMPLE G

Preparation of 1,3,5-tris[1-adamantanecarbonylamino]benzene (= Compound I-7)

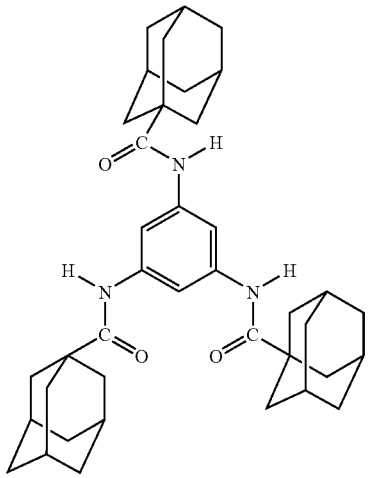

Compound I-7 is obtained as a colorless powder in analogy to Example A from 1.68 g (13.6 mmol) of 1,3,5-triaminobenzene hydrochloride, 9.03 g (45.0 mmol) of 1-adamantanecarbonyl chloride, 150 ml of NMP, 30 ml of pyridine and 0.3 g of LiCl.

Yield: 6.75 g (=81.4% of theory).
Melting point: Sublimation (no melting point observed).
MS (EI): 609 (M$^{+\cdot}$).

EXAMPLE H

Preparation of 1,3,5-tris[2-methylpropionylamino]benzene (= Compound I-8)

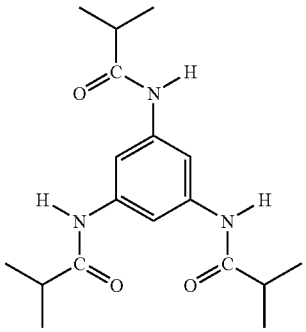

Compound I-8 is obtained as an off-white powder in analogy to Example A from 1.67 g (13.6 mmol) of 1,3,5-triaminobenzene hydrochloride, 5.22 g (49.0 mmol) of isobutyric acid chloride, 150 ml of NMP, 30 ml of triethylamine and 0.3 g of LiCl.

Yield: 0.95 g (=20.9% of theory).
Melting point: 290° C.
MS(EI): 333 (M$^{+\cdot}$).

EXAMPLE I

Preparation of
1,3,5-tris[3,3-dimethylbutyrylamino]benzene

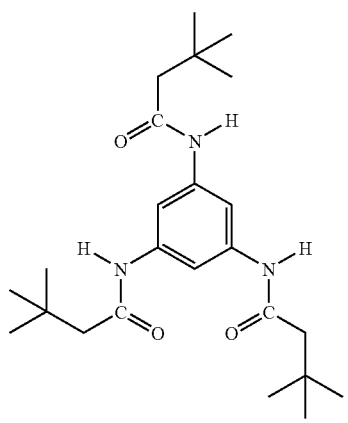

(= Compound I-9)

Compound I-9 is obtained as an off-white powder in analogy to Example A from 4.65 g (20.0 mmol) of 1,3,5-triaminobenzene hydrochloride, 9.42 g (70.0 mmol) of 3,3-dimethylbutyric acid chloride, 250 ml of NMP, 50 ml of triethylamine and 0.5 g of LiCl.

Yield: 3.82 g (=45.7% of theory).
Melting point: 316° C.
MS (EI): 417 (M$^{+\cdot}$).

EXAMPLE J

Preparation of
1,3,5-tris[2-ethylbutyrylamino]benzene

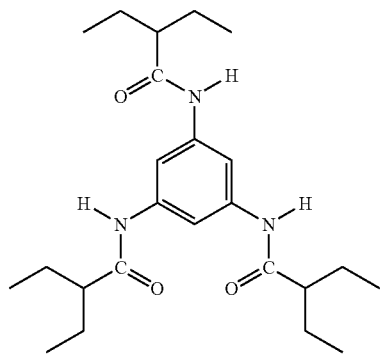

(= Compound I-10)

Compound I-10 is obtained as off-white powder in analogy to Example A from 4.65 g (20.0 mmol) of 1,3,5-triaminobenzene hydrochloride, 9.42 g (70.0 mmol) of 2-ethylbutyric acid chloride, 250 ml of NMP, 50 ml of triethylamine and 0.5 g of LiCl.

Yield: 4.04 g (=48.4% of theory).
Melting point: 363° C. (under sublimation).
MS (EI): 417 (M$^{+\cdot}$).

EXAMPLE K

Preparation of
1,3,5-tris[2,2-dimethylbutyrylamino]benzene

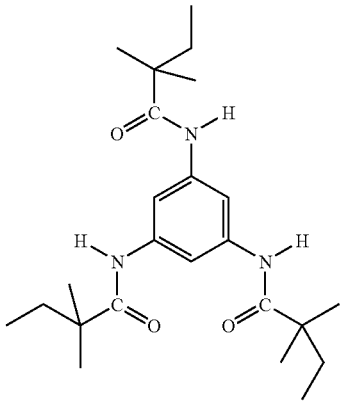

(= Compound I-11)

Compound I-11 is obtained as a colorless, fluffy solid product in analogy to Example A from 1.23 g (10.0 mmol) of 1,3,5-triaminobenzene, 4.84 g (36.0 mmol) of 2,2-dimethylbutyric acid chloride, 150 ml of NMP, 20 ml of triethylamine and 0.3 g of LiCl.

Yield: 2.93 g (=70.3% of theory).
Melting point: 368° C. (under sublimation).
MS(EI): 417 (M$^{+\cdot}$).

EXAMPLE L

Preparation of
1,3,5-tris[2-cyclohexyl-acetylamino]benzene

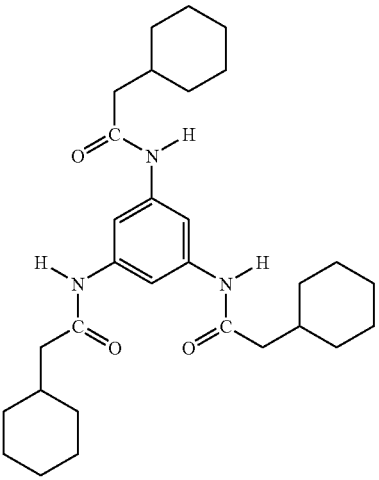

(= Compound I-12)

Compound I-12 is obtained as a colorless powder in analogy to Example A from 1.23 g (10.0 mmol) of 1,3,5-triaminobenzene, 5.78 g (36.0 mmol) of 2-cyclohexyl-acetyl chloride, 100 ml of NMP, 20 ml of triethylamine and 0.3 g of LiCl.

Yield: 3.42 g (=69.1% of theory).
Melting point: 204° C.
MS (EI): 495(M$^{+\cdot}$).

EXAMPLE M

Preparation of
1,3,5-tris[3-cyclohexyl-propionylamino]benzene (= Compound I-13)

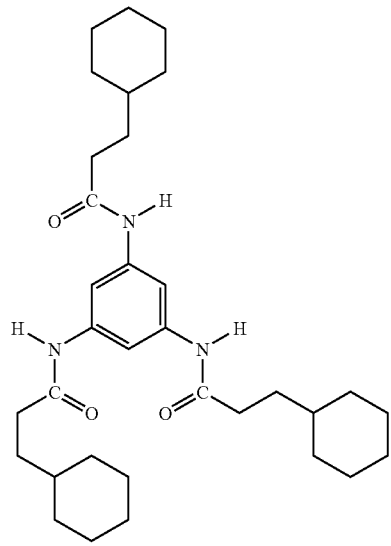

Compound I-13 is obtained as a colorless powder in analogy to Example A from 1.17 g (9.5 mmol) of 1,3,5-triaminobenzene, 5.0 g (28.0 mmol) of 3-cyclohexyl-propionyl chloride, 100 ml of NMP, 20 ml of triethylamine and 0.3 g of LiCl.

Yield: 1.87 g (=69.1% of theory).
Melting point: 215° C.
MS (EI): 537(M$^{+\cdot}$).

EXAMPLE N

Preparation of
1,3,5-tris[4-cyclohexyl-butyrylamino]benzene (= Compound I-14)

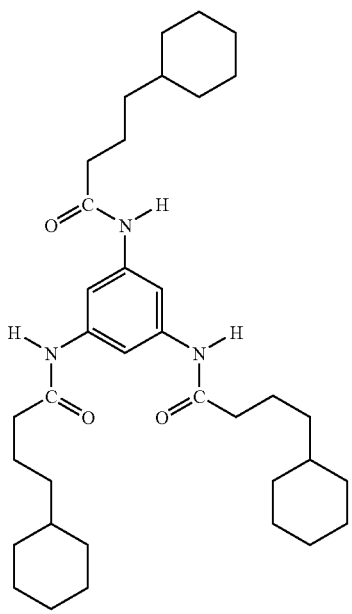

Compound I-14 is obtained as a colorless powder in analogy to Example A from 1.23 g (10 mmol) of 1,3,5-triaminobenzene, 6.79 g (36.0 mmol) of 4-cyclohexyl-butyryl chloride, 100 ml of NMP, 20 ml of triethylamine and 0.3 g of LiCl.

Yield: 2.30 g (=40% of theory).
Melting point: 191° C.
MS (EI): 579(M$^{+\cdot}$).

EXAMPLE O

Preparation of
1,3,5-tris[5-cyclohexyl-valeroylamino]benzene (= Compound I-15)

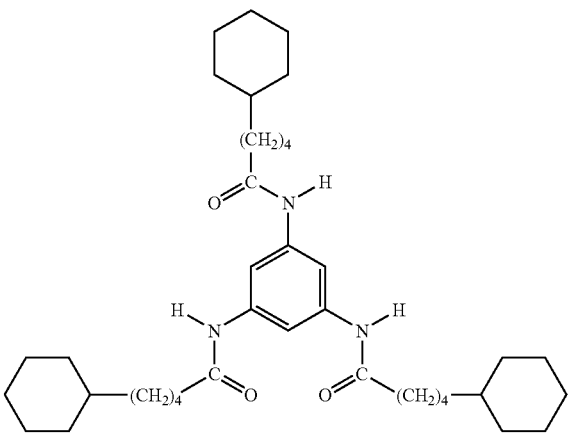

Compound I-15 is obtained as a colorless powder in analogy to Example A from 1.23 g (10 mmol) of 1,3,5-triaminobenzene, 7.3 g (36.0 mmol) of 5-cyclohexyl-valeroyl chloride, 100 ml of NMP, 20 ml of triethylamine and 0.3 g of LiCl.

Yield: 1.40 g (=23% of theory).
Melting point: 141° C.
MS (EI): 621 (M$^{+\cdot}$).

EXAMPLE P

Preparation of
1-isobutyrylamino-3,5-bis[pivaloylamino]benzene (= Compound I-16)

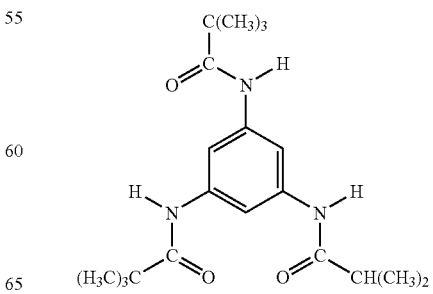

a) N-isobutyryl-3,5-dinitroaniline is obtained from 45.8 g (0.25 mol) of 3,5-dinitroaniline, 29.3 g (0.275 mol) of isobutyryl chloride, 98.9 g (1.25 mol) of pyridine, 250 ml of NMP and 0.2 g of LiCl. The acylation is carried out as described in Example A.

Yield: 62.0 g (=98% of theory).
Melting point: 168-170° C.
MS(CI): 254 (MH$^+$).

b) 24.2 g (0.096 mol) of the product obtained under a) is hydrogenated in 100 ml of NMP with 1 g Pd/C (10%) at 50° C. in analogy to Example B-V. The solution is used after separation of the catalyst by filtration for the next step without isolation of the Intermediate N-isobutyryl-1,3,5-triaminobenzene (100% conversion according to TLC (Thin Layer Chromatography); $R_F$(N-isobutyryl-1,3,5-triaminobenzene)= 0.05; $R_F$(N-isobutyryl-3,5-dinitroaniline)=0.65; silicagel, eluent: hexane/ethyl acetate 1:1).

To this solution 68.6 g (0.368 mol) of pivalic anhydride are added at 60° C. and the reaction mixture is stirred for 1 h at 60° C. Dilution with water precipitated the product which is separated off by filtration and washed with toluene and hexane. The product obtained is an off-white powder.

Yield: 30.9 g (=86% of theory).
Melting point: 370° C. under sublimation.
MS(CI): 362(MH$^+$).

EXAMPLE Q

Preparation of 2,2-dimethylbutyrylamino-3,5-bis [pivaloylamino]benzene

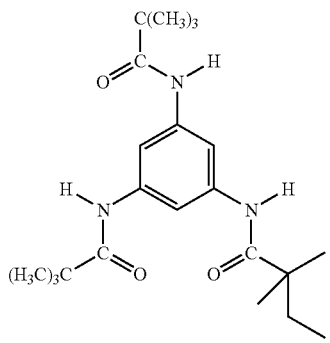

(= Compound I-17)

a) N-2,2-dimethylbutyryl-3,5-dinitroaniline is obtained from 45.8 g (0.25 mol) of 3,5-dinitroaniline, 37.0 g (0.275 mol) of 2,2-dimethylbutyryl chloride, 98.9 g (1.25 mol) of pyridine, 250 ml of NMP and 025 g of LiCl. The acylation is carried out as described in Example A.

Yield: 67.0 g (=95% of theory).
Melting point: 171-173° C.
MS(CI): 282 (MH$^+$).

b) 16.7 g (0.06 mol) of the product obtained under a) is hydrogenated in 75 ml of NMP with 1 g Pd/C (10%) at 90° C. in analogy to Example B-V. The solution is used after separation of the catalyst by filtration for the next step without isolation of the intermediate N-(2,2-dimethylbutyryl)-1,3,5-triamino-benzene (100% conversion according to TLC:

$R_F$(N-2,2-dimethylbutyryl-1,3,5-triaminobenzene)=0.13; $R_F$(N-2,2-dimethylbutyryl-3,5-dinitroaniline)=0.83; silicagel, eluent: hexane/ethyl acetate 1:1).

To this solution 40.65 g (0.218 mol) of pivalic anhydride are added and the reaction mixture is stirred for 1 h at 60° C. After work-up in analogy to Example P and recrystallization from DMF the desired product is obtained as a colorless fluffy product.

Yield: 14.7 g (=63.8% of theory).
Melting point: No melting point detected (sublimation).
MS(CI): 390 (MH$^+$).

EXAMPLE R

Preparation of 3,3-dimethylbutyrylamino-3,5-bis [pivaloylamino]benzene

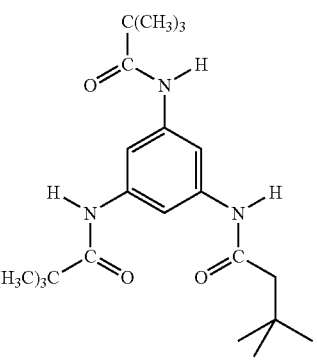

(= Compound I-18)

a) N-3,3-dimethylbutyl-3,5-dinitroaniline is obtained from 45.8 g (0.25 mol) of 3,5-dinitroaniline, 37.0 g (0.275 mol) of 3,3-dimethylbutyryl chloride, 98.9 g (1.25 mol) of pyridine, 250 ml of NMP and 025 g of LiCl. The acylation is carried out as described in Example A.

Yield: 70 g (=100% of theory).
Melting point: 145° C.
MS(CI): 282 (MH$^+$)

b) 16.7 g (0.059 mol) of the compound obtained under a) is hydrogenated in 75 ml of NMP with 1 g Pd/C (10%) at 85° C. in analogy to Example B-V. The solution is used after separation of the catalyst by filtration for the next step without Isolation of the intermediate N-3,3-dimethylbutyryl-1,3,5-triaminobenzene (100% conversion according to TLC: $R_F$(N-3,3-dimethylbutyryl-1,3,5-triaminobenzene)=0.07; $R_F$(N-3,3-dimethylbutyryl-3,5-dinitroaniline)=0.73; silicagel, eluent: hexane/ethyl acetate 1:1).

To this solution 40.65 g of pivalic anhydride (0.218 mol) are added and the reaction mixture is stirred for 3 h at 60° C. After work-up in analogy to Example P, the desired product is obtained as a white powder.

Yield: 16.0 g (=69.5% of theory).
Melting point: 368° C. under sublimation.
MS(CI): 390 (MH$^+$).

EXAMPLE S

Preparation of 1,3-bis[isobutyrylamino]-5-pivaloylaminobenzene

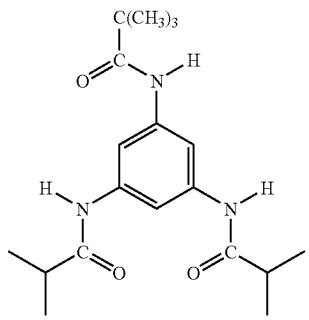

(= Compound I-19)

a) N-pivaloyl-3,5-dinitroaniline is obtained from 45.8 g (0.25 mol) of 3,5-dinitroaniline, 33.2 g (0.275 mol) of pivaloyl chloride, 98.9 g (1.25 mol) of pyridine, 250 ml of NMP and 0.2 g of LiCl. The acylation is carried out as described in Example A.

Yield: 67.0 g (=100% of theory).
Melting point: 206-208° C.
MS(CI): 268(MH$^+$).

b) 26.2 g (0.1 mol) of the product obtained under a) is hydrogenated in 100 ml of NMP with 1 g Pd/C at 90° C. In analogy to Example B-V. The solution is used after separation of the catalyst by filtration for the next step without isolation of the intermediate N-pivaloyl-1,3,5-triaminobenzene (100% conversion according to TLC: $R_F$(N-pivaloyl-1,3,5-triaminobenzene)=0.08; $R_F$(N-pivaloyl-3,5-dinitroaniline)=0.65; silicagel, eluent: hexane/ethyl acetate 1:1). To this solution 58.5 g (0.37 mol) of isobutyryl anhydride are added at 60° C. and the reaction mixture is stirred for 1 h at 60° C. Dilution with water precipitates the product as an off-white powder.

Yield: 20.4 g (=59% of theory).
Melting point: 288° C.
MS(CI): 348(MH$^+$).

EXAMPLE T

Preparation of 1,3-bis[isobutyrylamino]-5-(2,2-dimethyl-butyryl)aminobenzene

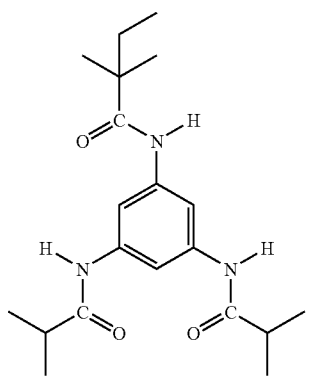

(= Compound I-20)

To a solution of 13.1 g (0.059 mol) of N-2,2-dimethylbutyryl)-1,3,5-triaminobenzene (obtained as described in Example Q) in 75 ml of NMP, 34.5 g (0.22 mol) of isobutyric anhydride are added at 60° C. and the reaction mixture is stirred for 2 h at 60° C. Dilution with water precipitates the desired product as an off-white powder.

Yield: 19.2 (=91% of theory).
Melting point: 302-303° C.
MS(CI): 362(MH$^+$).

EXAMPLE U

Preparation of 1,3-bis[isobutyrylamino]-5-(3,3-dimethyl-butyryl)aminobenzene

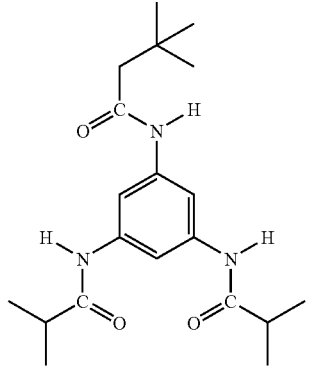

(= Compound I-21)

To a solution of 13.1 g (0.059 mol) of N-(3,3-dimethylbutyryl)-1,3,5-triaminobenzene (obtained as described in Example R) in 75 ml of NMP, 34.5 g (0.22 mol) of isobutyric anhydride are added at 60° C. and the reaction mixture is stirred for 1 h at 60° C. Dilution with water precipitates the desired product as a colorless powder.

Yield: 15.2 g (=71% of theory).
Melting point: 227-228° C.
MS(CI): 362(MH$^+$).

EXAMPLE V

Preparation of 1,3-bis[2,2-dimethylbutyrylamino]-pivaloylaminobenzene

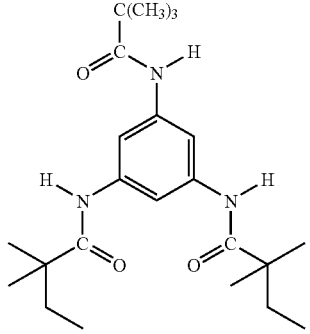

(= Compound I-22)

To a solution of 18.3 g (0.088 mol) of N-pivaloyl-1,3,5-triaminobenzene (obtained as described in Example S) in 180 ml of NMP, 34.8 g (0.44 mol) of pyridine and 35.5 g (0.264 mol) of 2,2-dimethylbutyryl chloride are added at 5° C. and the reaction mixture is stirred for 5 h at 100° C. Work-up as described in Example P and washing with hexane gives an off-white powder.

Yield: 28.0 g (=79% of theory).
Melting point: No melting point observed (sublimation).
MS(CI): 404(MH$^+$).

EXAMPLE W

Preparation of 1,3-bis[2,2-dimethylbutyrylamino]-5-isobutyrylaminobenzene

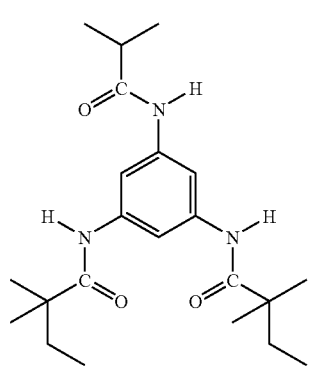

(= Compound I-23)

To a solution of 18.45 g (0.096 mol) of N-isobutyryl-1,3,5-triaminobenzene (obtained as described in Example P) in 100 ml of NMP, 37.8 g (0.478 mol) of pyridine and 38.6 g (0.287 mol) of 2,2-dimethylbutyryl chloride are added at 5° C. and the reaction mixture is stirred for 5 h at 100° C. Work-up as described in Example P and washing with methanol and hexane gives a colorless powder.

Yield: 31.9 g (=83% of theory).
Melting point: 363° C. under sublimation.
MS(CI): 390(MH$^+$).

EXAMPLE X

Preparation of 1,3-bis[2,2-dimethylbutyrylamino]-5-(3,3-dimethylbutyryl)-aminobenzene

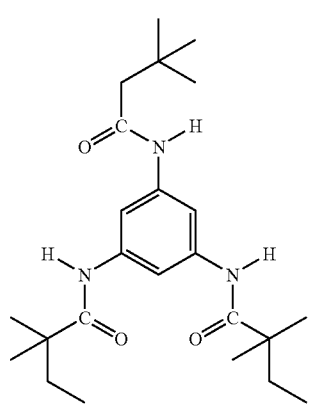

(= Compound I-24)

To a solution of 13.1 g (0.059 mol) of N-(3,3-dimethylbutyryl)-1,3,5-triaminobenzene (obtained as described in Example R) in 75 ml of NMP, 23.3 g (0.295 mol) of pyridine and 23.8 g (0.177 mol) of 2,2-dimethylbutyryl chloride are added at 5° C. and the reaction mixture is stirred for 5 h at 100° C. Work-up as described in Example R and washing with methanol and hexane gives the desired product as an off-white powder.

Yield: 20.2 g (=82% of theory).
Melting point: 364-367° C.
MS(CI): 418(MH$^+$).

EXAMPLE Y

Preparation of 1,3-bis[3,3-dimethylbutyrylamino]-5-pivaloylamino-benzene

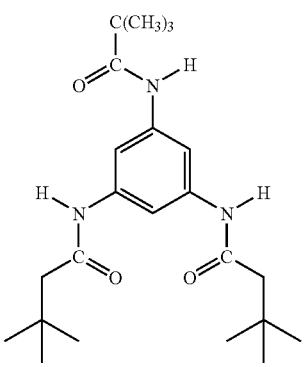

(= Compound I-25)

To a solution of 18.3 g (0.088 mol) of N-pivaloyl-1,3,5-triaminobenzene (obtained as described in Example S) in 100 ml of NMP, 34.8 g (0.44 mol) of pyridine and 35.5 g (0.264 mol) of 3,3-dimethylbutyl chloride are added at 5° C. and the reaction mixture is stirred for 5 h at 100° C. Work-up as described in Example P and washing with hexane gives an off-white powder.

Yield: 30.3 g (=85% of theory).
Melting point: 315-318° C.
MS(CI): 404(MH$^+$).

EXAMPLE Z

Preparation of 1,3-bis[3,3-dimethylbutyrylamino]-5-isobutyryl-aminobenzene

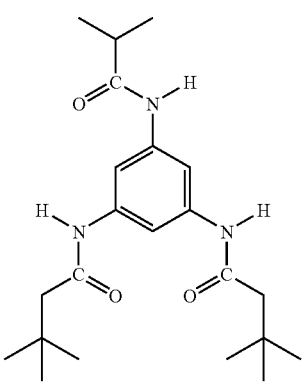

(= Compound I-26)

To a solution of 18.45 g (0.096 mol) of N-isobutyryl-1,3,5-triaminobenzene (obtained as described in Example P) in 100 ml of NMP, 37.8 g (0.478 mol) of pyridine and 38.6 g (0.287 mol) of 3,3-dimethylbutyryl chloride are added at 5° C. and the reaction mixture is stirred for 5 h at 100° C. Work-up as described in Example P and washing with methanol and hexane gives an off-white powder.

Yield: 33.9 g (=88% of theory).
Melting point: 266-268° C.
MS(CI): 390(MH⁺)

EXAMPLE A1

Preparation of 1,3-bis[3,3-dimethylbutyrylamino]-5-(2,2-dimethylbutyrylamino)aminobenzene (= Compound I-27)

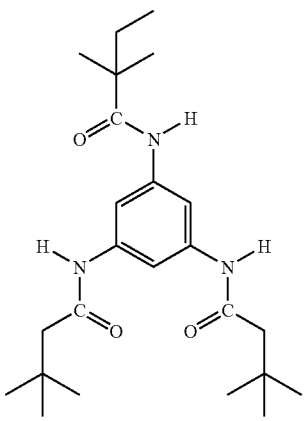

To a solution of 13.1 g (0.059 mol) of N-(2,2-dimethylbutyryl)-1,3,5-triaminobenzene (obtained as described in Example Q) in 75 ml of NMP, 23.3 g (0.295 mol) of pyridine and 23.8 g (0.177 mol) of 3,3-dimethylbutyryl chloride are added at 5° C. and the reaction mixture is stirred for 5 h at 100° C. Dilution with water precipitates the product. Recrystallisation from DMF/water gives the desired product as an off-white powder.

Yield: 20.9 g (=85% of theory).
Melting point: 332-334° C.
MS(CI): 418(MH⁺).

EXAMPLE B1

Preparation of 1,3,5-tris[3-(trimethylsilyl)propionylamino]benzene (= Compound I-28)

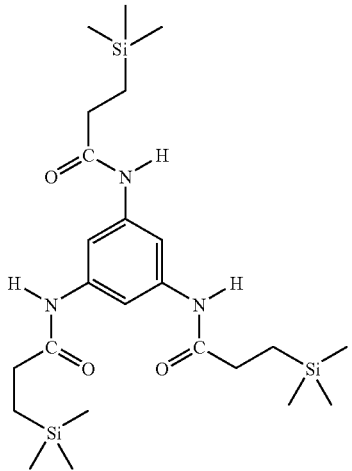

Compound I-28 is obtained as a colorless powder in analogy to Example A from 0.96 g (7.8 mmol) of 1,3,5-triaminobenzene, 4.61 g (28.0 mmol) of 3-(trimethylsilyl)propionyl chloride, 80 ml of NMP, 17 ml of triethylamine and 0.3 g of LiCl.

Yield: 2.37 g (=60% of theory).
Melting point: 237° C.
MS (EI): 507(M⁺·).

In the following, examples of the preparation of the compounds of the formula (II) are described in detail.

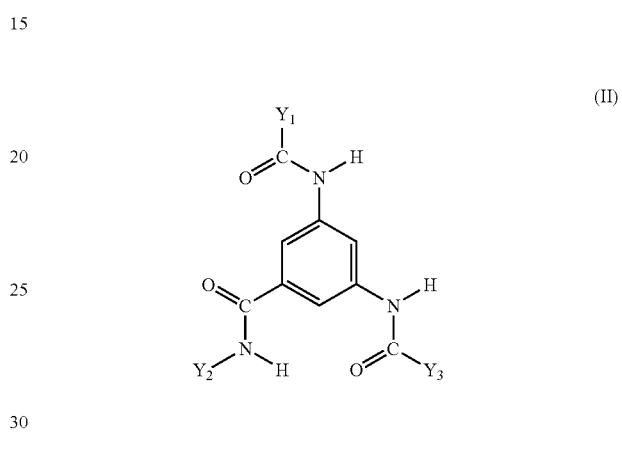

(II)

The compounds of the formula (II) can be synthesized e.g. by hydrogenation of 3,5-dinitro-benzamides (WWW) (prepared by standard procedure from 3,5-dinitro-benzoyl chloride (VVV) and the corresponding amine) with hydrogen and an appropriate metal catalyst in an appropriate organic solvent and subsequent acylation of the thus obtained 3,5-diamino-benzamides (YYY). The compounds (YYY) can be isolated or transferred into the corresponding dihydrochloride; both can be purified by recrystallization from an appropriate solvent. It is also possible to use a solution of the crude (YYY) or the isolated crude (YYY) for the following acylation with the carboxylic acid chloride or anhydride. Possible catalysts are e.g. Pd, PtO₂, Raney-Nickel etc., preferably the commercially available version on carbon support. The hydrogenation can be carried out under normal pressure or under pressure at temperatures between 20 and 120° C. (Safety checks are recommended before scale up). Another approach is reduction with Raney-Nickel/hydrazine or the use of other common reducing agents e.g. Béchamps reduction or use of boron/hydrogen compounds. Appropriate solvents for the hydrogenation are e.g. tetrahydrofuran (THF), THF/methanol, dimethylformamide (DMF) or N-methylpyrrolidone (NMP). Recrystallization can be carried out e.g. with methanol, ethanol or other alcohols.

The free amine (YYY) (or the amine obtained from the hydrochloride and an appropriate base) can be acylated with a stoichiometric amount or an excess of the corresponding acid chloride, preferably in the presence of an organic or inorganic non-interacting base, e.g. triethylamine, tributylamine, pyridine; another method uses a stoichiometric amount or excess of the anhydride of the carboxylic acid as acylating agent; in this case no base is required. The reaction is carried out in the absence or preferably in the presence of a solvent. The ideal reaction temperature depends on the nature of the acylating agents (0°-100° C.). Isolation/purification of the final product of the formula (II) is carried out by precipitation/recrystallization/washing with an appropriate mixture of water/organic solvent or organic solvent/organic solvent or with a pure solvent, e.g. DMF/water, NMP/water, ethanol, methanol etc.

Synthesis of the 3,5-Dinitrobenzoic Acid Amide Intermediates of the Formula

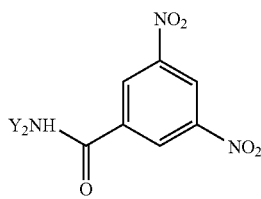

(WWW)

General Procedure:

In an inert atmosphere the 3,5-dinitrobenzoyl chloride (VVV) is added to a mixture of N-methylpyrrolidone (NMP), pyridine, LiCl and the required amine at 0° C. The reaction mixture is subsequently heated to 75° C. and maintained at this temperature for 2 h. After cooling the reaction mixture is poured into the fivefold amount of ice water. The precipitated product is allowed to stand over night and subsequently filtered off and dried in vacuo (0.1 mbar) at room temperature for 24 h.

EXAMPLE WWWa

Preparation of 3,5-dinitro-(N-t-butyl)-benzamide (WWWa) from 8.00 g (34.7 mmol) of 3,5-dinitrobenzoylchloride, 3.39 g (46.3 mmol) of t-butylamine, 150 ml of NMP, 20 ml of pyridine and 0.1 g of LiCl according to the general procedure described above.

Purification: Recrystallization from xylene.
Yield: 5.70 g (61.5% of theory; white solid).
MS (EI): 267 (M$^{+\cdot}$).

EXAMPLE WWWb

Preparation of 3,5-dinitro-(N-1,1-dimethylpropyl)benzamide (WWWb) from 16.1 g (0.07 mol) of 3,5-dinitrobenzoylchloride, 7.3 g (0.084 mol) of tert-amylamine, 50 ml of NMP and 12 ml of triethylamine according to the general procedure described above.

Purification: Recrystallization from methanol.
Yield: 11 g (56% of theory; yellow solid).
Melting point: 163-164° C.

EXAMPLE WWWc

Preparation of 3,5-dinitro-[N-(3-methylbutyl)-benzamide WWWc) from 8.00 g (34.7 mmol) of 3,5-dinitrobenzoylchloride, 4.04 g (46.3 mmol) of 3-methylbutylamine, 150 ml of NMP, 20 ml of pyridine and 0.1 g of LiCl according to the general procedure described above.

Purification: Recrystallization from toluene.
Yield: 5.10 g (52.3% of theory; colorless solid).

$^{13}$C-NMR (DMSO-d$_6$): δ=22.3; 25.2; 37.7; 37.9; 120.6; 127.4; 137.1; 148.1; 161.7.

EXAMPLE WWWd

Preparation of 3,5-dinitro-(N-t-octyl)-benzamide (WWWd) from 106 g (0.45 mol) of 3,5-dinitrobenzoylchloride, 73.5 g (0.54 mol) of tert-octylamine, 200 ml of NMP and 75 ml of triethylamine according to the general procedure described above.

Purification: Recrystallization from methanol.
Yield: 92 g (63% of theory; yellow solid).
Melting point: 129-130° C.

EXAMPLE WWWe

Preparation of 3,5-dinitro-(N-cyclopentyl)-benzamide (WWWe) from 8.00 g (34.7 mmol) of 3,5-dinitrobenzoylchloride, 3.94 g (46.3 mmol) of cyclopentylamine, 150 ml of NMP, 20 ml of pyridine and 0.1 g of LiCl according to the general procedure described above.

Purification: Recrystallization from xylene.
Yield: 5.60 g (57.8% of theory; colorless solid).
MS (EI): 279 (M$^{+\cdot}$).

EXAMPLE WWWf

Preparation of 3,5-dinitro-(N-cyclohexyl)-benzamide (WWWf) from 8.00 g (34.7 mmol) of 3,5-dinitrobenzoylchloride, 4.59 g (46.3 mmol) of cyclohexylamine, 150 ml of NMP, 20 ml of pyridine and 0.1 g of LiCl according to the general procedure described above.

Purification: Recrystallization from xylene.
Yield: 5.34 g (52.5% of theory; colorless solid).
MS (EI): 293 (M$^+$).

EXAMPLE WWWg

Preparation of 3,5-dinitro-(N-2,3-dimethylcyclohexyl)-benzamide (WWWg) from 11.5 g (0.05 mol) of 3,5-dinitrobenzoylchloride, 7.6 g (0.06 mol) of 2,3-dimethylcyclohexylamine, 50 ml of NMP and 10 ml of triethylamine according to the general procedure described above.

Purification: Recrystallization from methanol.
Yield: 6.5 g (40% of theory; amber solid).
Melting point: 173-175° C.

EXAMPLE WWWh

Preparation of 3,5-dinitro-(N-isopropyl)-benzamide (WWWh) from 46.11 g (0.2 mol) of 3,5-dinitrobenzoylchloride, 14.18 g (0.24 mol) of isopropylamine, 150 ml of NMP and 25 ml of triethylamine according to the general procedure described above.

Purification: Recrystallization from isopropanol.
Yield: 37 g (73% of theory; amber solid).
Melting point: 179-181° C.

Synthesis of the 3,5-Diaminobenzoic Acid Amide Intermediates of the Formula

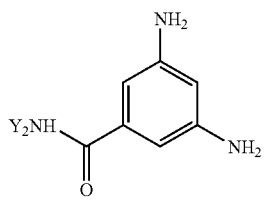

(YYY)

General Procedure:

A mixture of the corresponding 3,5-dinitrobenzoic acid amide derivative (WWW), tetrahydrofuran (THF), methanol and palladium on activated carbon (10% Pd) is treated with $H_2$ gas for 24 h. The catalyst is subsequently filtered off and the solvent is evaporated under reduced pressure.

EXAMPLE YYYa

Preparation of 3,5-diamino-N-t-butylbenzamide (YYYa) from 1.75 g (6.55 mmol) of 3,5-dinitro-N-t-butylbenzamide, 0.2 g of palladium on activated carbon (10% Pd), 200 ml of THF and 50 ml of methanol at a reaction temperature of 35° C. and a hydrogen pressure of 3 bar according to the general procedure described above.

Yield: 1.31 g (96.5% of theory; yellow solid).
MS (EI): 207 ($M^{+\cdot}$).

EXAMPLE YYYb

Preparation of 3,5-diamino-N-t-octyl-benzamide (YYYb).

The product which is prepared according to the general procedure described above is not isolated. A solution of (YYYb) is directly acylated as described in Example II-3.

EXAMPLE YYYc

Preparation of 3,5-diamino-N-(3-methylbutyl)benzamide (YYYc) from 4.98 g (17.7 mmol) of 3,5-dinitro-N-(3-methylbutyl)-benzamide, 0.2 g of palladium on activated carbon (10% Pd), 200 ml of THF and 50 ml of methanol at a reaction temperature of 35° C. and a hydrogen pressure of 3 bar according to the general procedure described above.

Yield: 3.16 g (80.7% of theory; yellow solid).
$^{13}$C-NMR (DMSO-$d_6$): δ=22.5; 25.3; 37.2; 38.2; 101.9; 102.1; 136.7; 148.9; 167.7.

EXAMPLE YYYd

Preparation of 3,5-diamino-N-cyclopentyl-benzamide (YYYd) from 4.41 g (15.8 mmol) of 3,5-dinitro-N-cyclopentyl-benzamide, 0.2 g of palladium on activated carbon (10% Pd), 200 ml of THF and 50 ml of methanol at a reaction temperature of 35° C. and a hydrogen pressure of 3 bar according to the general procedure described above.

Yield: 3.10 g (89.5% of theory; brownish solid).
MS (EI): 219 ($M^{+\cdot}$).

EXAMPLE YYYe

Preparation of 3,5-diamino-N-cyclohexyl-benzamide (YYYe) from 4.78 g (16.3 mmol) of 3,5-dinitro-N-cyclohexyl-benzamide, 0.2 g of palladium on activated carbon (10% Pd), 200 ml of THF and 50 ml of methanol at a reaction temperature of 35° C. and a hydrogen pressure of 3 bar according to the general procedure described above.

Yield: 3.09 g (81.2% of theory; yellow solid).
MS (EI): 233 ($M^{+\cdot}$).

Synthesis of the Compounds of the Formula (II)

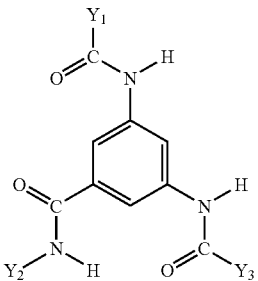

(II)

General Procedure:

Method A:

In an inert atmosphere the 3,5-diaminobenzoic acid derivative is added to a mixture of N-methylpyrrolidone (NMP), pyridine, LiCl and the required acid chloride or anhydride (in this case no tertiary amine is required) at 0° C. The reaction mixture is subsequently heated to 75° C. and maintained at this temperature for 2 h. After cooling the reaction mixture is poured into the fivefold amount of ice water. The precipitated product is allowed to stand over night and subsequently filtered off and dried in vacuo (0.1 mbar) at room temperature for 24 h. A colorless powder is obtained.

Method B:

Another synthesis starts from the 1,3-dinitrobenzene derivative (WWW), which is hydrogenated in NMP to the diamine (YYY). This intermediate is not isolated and directly acylated. The isolation of the product can be in analogy to method A.

EXAMPLE II-1

Preparation of N-t-butyl-3,5-bis-(3-methylbutyrylamino)-benzamide

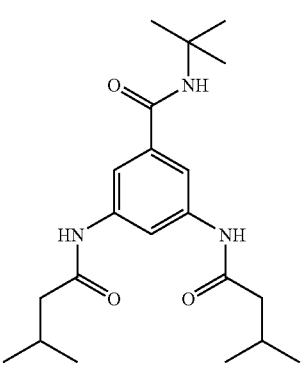

(ZZZa)

from 0.50 g (2.41 mmol) of 3,5-diamino-N-t-butyl-benzamide, 0.68 g (5.64 mmol) of 3-methylbutyric acid chloride, 30 ml of NMP, 5 ml of pyridine and 0.1 g of LiCl according to Method A.

EXAMPLE II-2

Preparation of
N-t-butyl-3,5-bis-(pivaloylamino)-benzamide

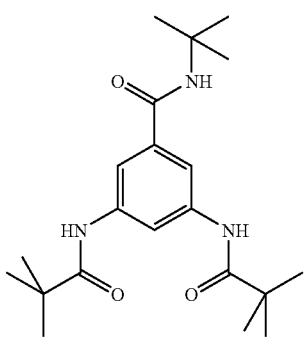
(ZZZb)

from 1.24 g (6.0 mmol) of 3,5-diamino-N-t-butyl-benzamide, 1.69 g (14.0 mmol) of pivaloyl chloride, 50 ml of NMP, 10 ml of pyridine and 0.1 g of LiCl according to Method A.
Purification: Recrystallization from ethanol.
Yield: 1.54 g (68.4% of theory).
MS (EI): 375 (M$^{+\cdot}$).
Melting point: Sublimation begins at 294° C.

EXAMPLE II-3

Preparation of
N-t-octyl-3,5-bis-(pivaloylamino)-benzamide
according to Method B

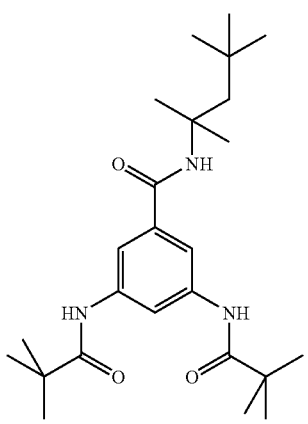
(ZZZc)

A mixture of 10 g (31 mmol) of 3,5-dinitro-(N-t-octyl)-benzamide, 75 ml of NMP and 0.5 g of palladium on activated carbon (10% Pd) is treated with H$_2$ gas for 30 h at 100° C. The catalyst is subsequently filtered off and 17.3 g (93 mmol) of pivaloyl anhydride are added to the filtrate. This reaction mixture is then heated for 12 h to 100° C. After cooling the reaction mixture is poured into the fivefold amount of ice water. The precipitated product is filtered and the residue is recrystallized from ethanol.
Yield: 4.7 g (35% of theory; slightly grey powder).
Melting point: 327° C. (Decomposition).

EXAMPLE II-4

Preparation of N-(1,1-dimethyl-propyl)-3,5-bis-(pivaloylamino)-benzamide according to Method B

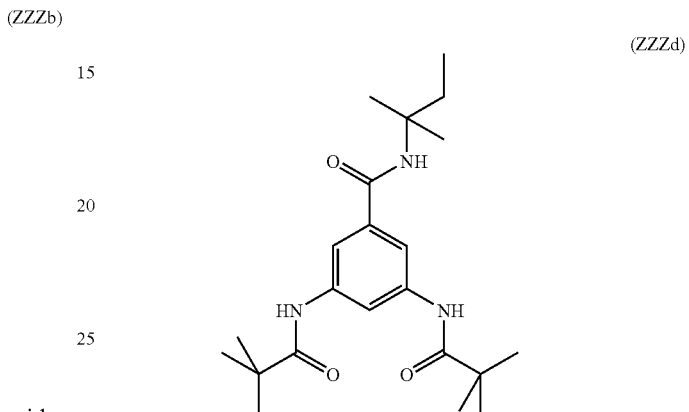
(ZZZd)

In analogy to Example II-3, 9.9 g (71%) of compound (ZZZd) are obtained as a white solid from 7.88 g (0.036 mol) of 3,5-dinitro-(N-1,1-dimethyl-propyl)-benzamide, 75 ml of NMP, 0.5 g of Pd/C (10% Pd) and 19.9 g (0.11 mol) of pivalic anhydride.
Melting point: 378° C. (Decomposition).

EXAMPLE II-5

Preparation of
N-(t-octyl)-3,5-bis-(isobutyrylamino)-benzamide
according to Method B

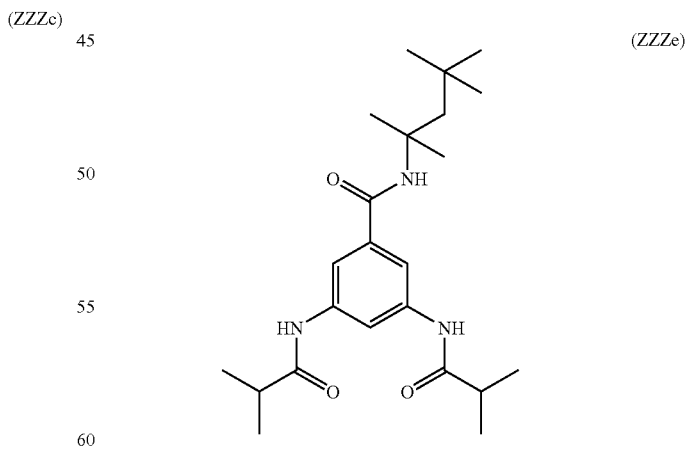
(ZZZe)

In analogy to Example II-3, 6.7 g (51%) of compound (ZZZe) are obtained as a slightly grey solid from 8.2 g (0.031 mol) of 3,5-dinitro-(N-t-octyl)-benzamide (compound WWWb), 75 ml of NMP, 0.5 g of Pd/C (10% Pd) and 14.7 g (0.093 mol) of isobutyric anhydride.
Melting point: 256° C. (Decomposition).

EXAMPLE II-6

Preparation of N-(t-butyl)-3,5-(pivaloylamino)-benzamide according to Method B

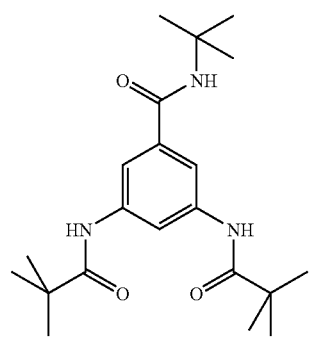
(ZZZb)

In analogy to Example II-3, 129 g (92%) of compound (ZZZb) are obtained in the form of a white solid from 77.5 g (0.37 mol) of 3,5-dinitro-(N-t-butyl)-benzamide (compound WWWa), 1200 ml of NMP, 5 g of Pd/C (10% Pd) and 209 g (1.12 mol) of pivaloyl anhydride.

Melting point: The product sublimes at 294° C.

EXAMPLE II-7

Preparation of N-(2,3-dimethyl-cyclohexyl)-3,5-bis-pivaloylamino)-benzamide according to Method B

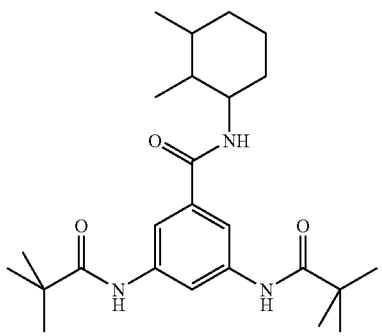
(ZZZf)

In analogy to Example II-3, 7.6 g (56%) of compound (ZZZf) are obtained as a slightly grey solid from 8.2 g (0.031 mol) of 3,5-dinitro-(N-2,3-dimethyl-cyclohexyl)-benzamide, 75 ml of NMP, 0.5 g of Pd/C (10% Pd) and 17.5 g (0.094 mol) of pivalic anhydride.

Melting point: 337° C. (Decomposition).

EXAMPLE II-8

Preparation of N-t-butyl-3,5-bis-(cyclopentanecarbonylamino)-benzamide

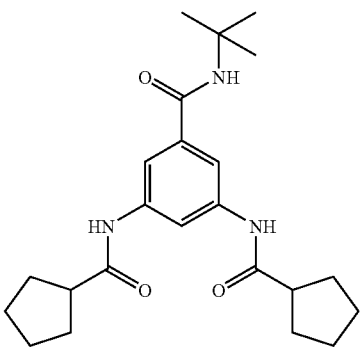
(ZZZg)

from 0.50 g (2.41 mmol) of 3,5-diamino-N-t-butyl-benzamide, 0.75 g (5.66 mmol) of cyclopentanecarbonylchloride, 30 ml of NMP, 5 ml of pyridine and 0.05 g of LiCl according to method A.

Purification: Recrystallization from dichloromethane.
Yield: 0.45 g (46.7% of theory).
Melting point: 281° C. (Decomposition).
MS (EI): 399 (M$^+$).

EXAMPLE II-9

Preparation of N-(3-methylbutyl)-3,5-bis-(3-methylbutyrylamino)benzamide

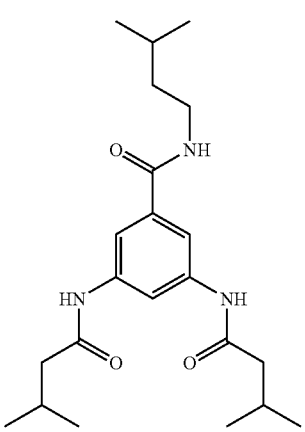
(ZZZh)

from 0.50 g (2.26 mmol) of 3,5-diamino-N-(3-methylbutyl)-benzamide, 0.64 g (5.31 mmol) of 3-methylbutyric acid chloride, 30 ml of NMP, 5 ml of pyridine and 0.05 g of LiCl according to Method A.

Purification: Column chromatography (hexane/ethyl acetate 2:1).
Yield: 0.58 g (65.9% of theory).
MS (EI): 389 (M$^+$).
Melting point: Decomposition begins at 300° C.

EXAMPLE II-10

Preparation of N-(3-methylbutyl)-3,5-bis-(pivaloylamino)-benzamide

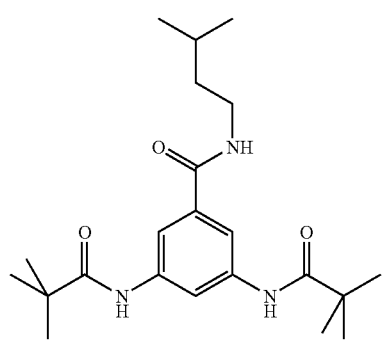

(ZZZi)

from 0.50 g (2.26 mmol) of 3,5-diamino-N-(3-methylbutyl)-benzamide, 0.64 g (5.31 mmol) of pivaloyl chloride, 30 ml of NMP, 5 ml of pyridine and 0.05 g of LiCl according to Method A.

Purification: Recrystallization from chloroform.
Yield: 0.42 g (47.7% of theory).
Melting point: 312° C. (Decomposition).
MS (EI): 389 (M⁺).

EXAMPLE II-11

Preparation of N-(3-methylbutyl)-3,5-bis-(4-methylpentanoylamino)-benzamide

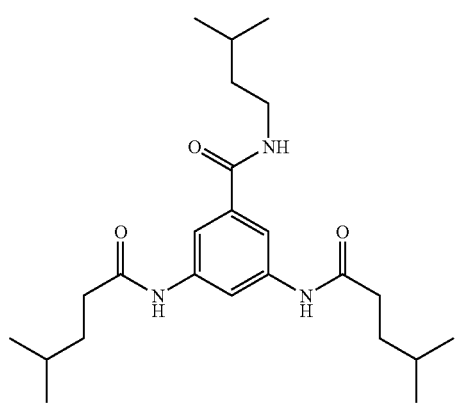

(ZZZj)

from 0.50 g (2.26 mmol) of 3,5-diamino-N-(3-methylbutyl)-benzamide, 0.71 g (5.27 mmol) of 4-methylvaleric acid chloride, 30 ml of NMP, 5 ml of pyridine and 0.05 g of LiCl according to Method A.

Purification: Column chromatography (cyclohexane/ethyl acetate 2:1).
Yield: 0.52 g (55.1% of theory).
MS (EI): 417 (M⁺).
Melting point: Decomposition begins at 290° C.

EXAMPLE II-12

Preparation of N-(3-methylbutyl)-3,5-bis-(cyclopentanecarbonylamino)-benzamide

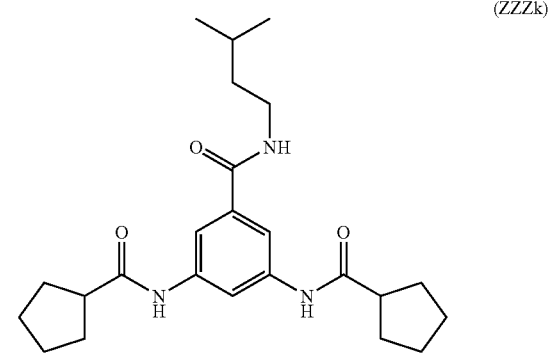

(ZZZk)

from 0.50 g (2.26 mmol) of 3,5-diamino-N-(3-methylbutyl)-benzamide, 0.70 g (5.28 mmol) of cyclopentanecarbonylchloride, 30 ml of NMP, 5 ml of pyridine and 0.05 g of LiCl according to Method A.

Purification: Column chromatography (cyclohexane/ethyl acetate 2:1).
Yield: 0.67 g (71.7% of theory).
Melting point: 225° C.
MS (EI): 413 (M⁺·).

EXAMPLE II-13

Preparation of N-(3-methylbutyl)-3,5-bis-(cyclohexanecarbonylamino)-benzamide

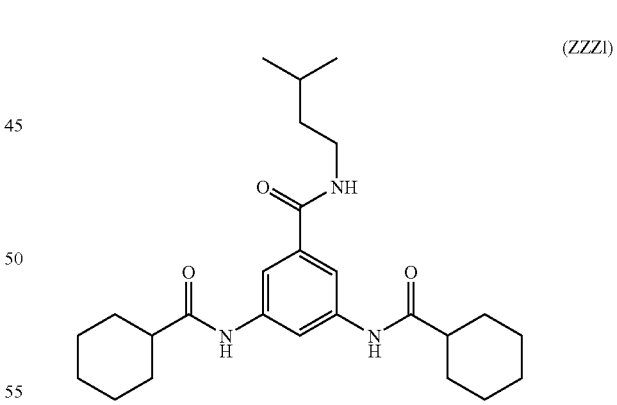

(ZZZl)

from 0.63 g (2.85 mmol) of 3,5-diamino-N-(3-methylbutyl)-benzamide, 0.97 g (6.62 mmol) of cyclohexanecarbonylchloride, 30 ml of NMP, 5 ml of pyridine and 0.05 g of LiCl according to Method A.

Purification: Column chromatography (cyclohexane/ethyl acetate 2:1).
Yield: 0.75 g (59.6% of theory).
Melting point: 234° C.
MS (EI): 441 (M⁺).

EXAMPLE II-14

Preparation of N-cyclopentyl-3,5-bis-(3-methylbutyrylamino)-benzamide

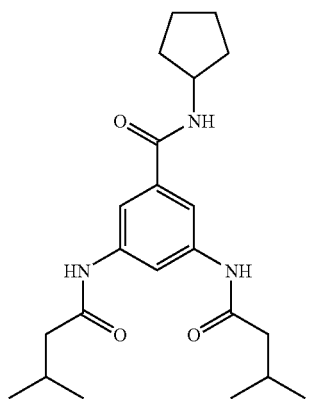
(ZZZm)

from 0.50 g (2.28 mmol) of 3,5-diamino-N-cyclopentyl-benzamide, 0.64 g (5.31 mmol) of 3-methylbutyric acid chloride, 30 ml of NMP, 5 ml of pyridine and 0,05 g of LiCl according to Method A.

Purification: Recrystallization from toluene.
Yield: 0.55 g (622% of theory).
Melting point: 241° C.
MS (EI): 387 (M$^{+\cdot}$).

EXAMPLE II-15

Preparation of N-cyclopentyl-3,5-bis(pivaloylamino)benzamide

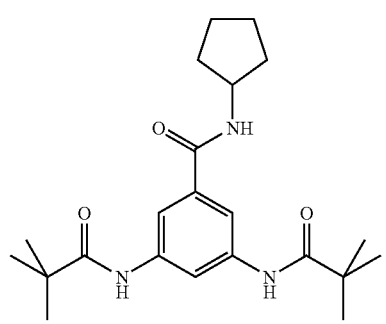
(ZZZn)

from 0.50 g (228 mmol) of 3,5-diamino-N-cyclopentyl-benzamide, 0.64 g (5.31 mmol) of pivaloyl chloride, 30 ml of NMP, 5 ml of pyridine and 0.05 g of LiCl according to Method A.

Purification: Recrystallization from chloroform.
Yield: 0.35 g (39.6% of theory).
Melting point: 361° C.
MS (70 eV), m/z (%): 387 (M$^{+\cdot}$).

EXAMPLE II-16

Preparation of N-cyclopentyl-3,5-bis(4-methylpentanoylamino)-benzamide

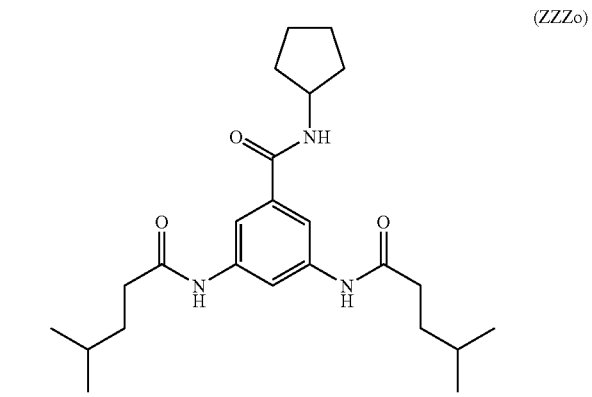
(ZZZo)

from 0.50 g (2.28 mmol) of 3,5-diamino-N-cyclopentyl-benzamide, 0.72 g (5.35 mmol) of 4-methylvaleric acid chloride, 30 ml of NMP, 5 ml of pyridine and 0.05 g of LiCl according to Method A.

Purification: Recrystallization from toluene.
Yield: 0.82 g (86.5% of theory).
Melting point: 207° C.
MS (EI): 415 (M$^{+\cdot}$).

EXAMPLE II-17

Preparation of N-cyclopentyl-3,5-bis(cyclopentanecarbonylamino)benzamide

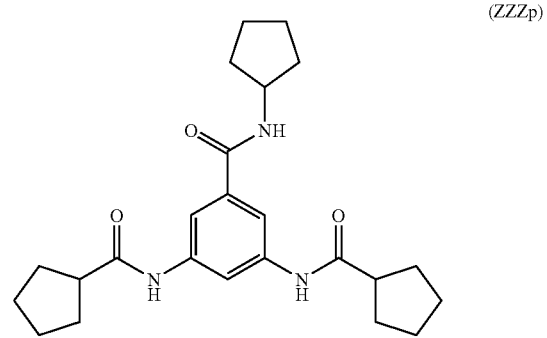
(ZZZp)

from 0.50 g (228 mmol) of 3,5-diamino-N-cyclopentyl-benzamide, 0.71 g (5.35 mmol) of cyclopentanecarbonylchloride, 30 ml of NMP, 5 ml of pyridine and 0.05 g of LiCl according to Method A.

Purification: Recrystallization from 1,2-dichlorobenzene.
Yield: 0.72 g (76.7% of theory).
Melting point: 301° C.
MS (EI): 411 (M$^{+\cdot}$).

EXAMPLE II-18

Preparation of N-cyclopentyl-3,5-bis(cyclohexanecarbonylamino)benzamide

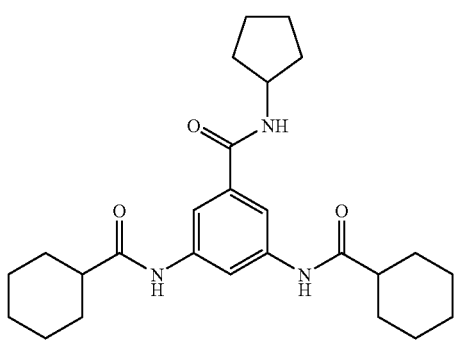
(ZZZq)

from 0.62 g (2.83 mmol) of 3,5-diamino-N-cyclopentylbenzamide, 0.97 g (6.62 mmol) of cyclohexanecarbonylchloride, 30 ml of NMP, 5 ml of pyridine and 0.05 g of LiCl according to Method A Purification: Recrystallization from 1,2-dichlorobenzene.
Yield: 1.03 g (82.8% of theory).
Melting point: 305° C.
MS (EI): 439 (M$^{+\cdot}$).

EXAMPLE II-19

Preparation of N-cyclohexyl-3,5-bis(3-methylbutyrylamino)benzamide

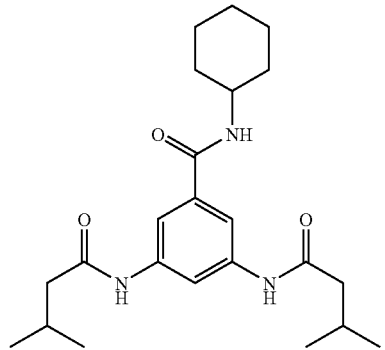
(ZZZr)

from 0.50 g (2.14 mmol) of 3,5-diamino-cyclohexyl-benzamide, 0.60 g (4.98 mmol) of 3-methylbutyric acid chloride, 30 ml of NMP, 5 ml of pyridine and 0.05 g of LiCl according to Method A.

Purification: Column chromatography (cyclohexane/ethyl acetate 1:1).
Yield: 0.60 g (69.8% of theory).
Melting point: 212° C.
MS (EI): 401 (M$^+$).

EXAMPLE II-20

Preparation of N-cyclohexyl-3,5-bis(pivaloylamino)benzamide

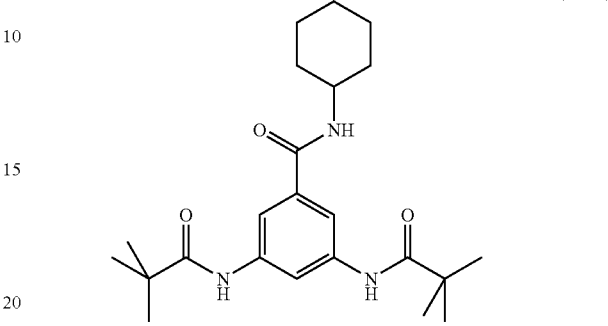
(ZZZs)

from 0.50 g (2.14 mmol) of 3,5-diamino-N-cyclohexyl-benzamide, 0.60 g (4.98 mmol) of pivaloyl chloride, 30 ml of NMP, 5 ml of pyridine and 0.05 g of LiCl according to Method A.

Purification: Recrystallization from chloroform.
Yield: 0.39 g (45.4% of theory).
Melting point: 347° C.
MS (EI): (M$^{+\cdot}$).

EXAMPLE II-21

Preparation of N-cyclohexyl-3,5-bis(4-methylpentanoylamino)benzamide

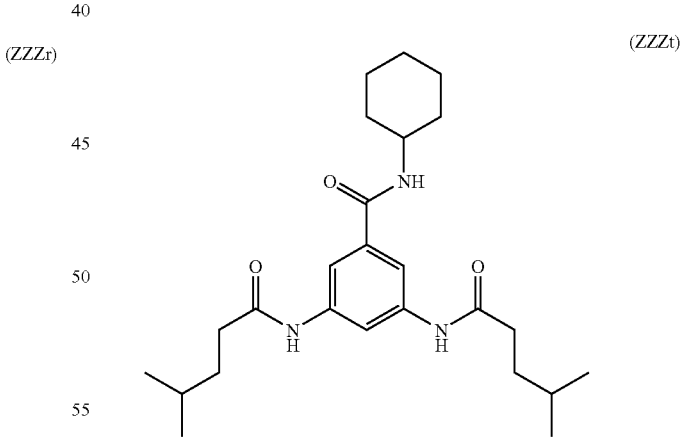
(ZZZt)

from 0.50 g (2.14 mmol) of 3,5-diamino-N-cyclohexyl-benzamide, 0.67 g (4.98 mmol) of 4-methylvaleric acid chloride, 30 ml of NMP, 5 ml of pyridine and 0.05 g of LiCl according to Method A.

Purification: Recrystallization from toluene.
Yield: 0.77 g (83.8% of theory).
Melting point: 200° C.
MS(EI): 429 (M$^{+\cdot}$).

EXAMPLE II-22

Preparation of N-cyclohexyl-3,5-bis-(cyclopentanecarbonylamino)-benzamide

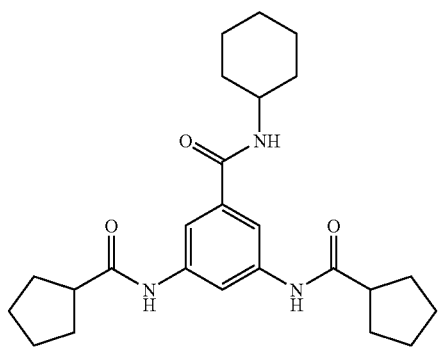

(ZZZu)

from 0.50 g (2.14 mmol) of 3,5-diamino-N-cyclohexyl-benzamide, 0.66 g (4.98 mmol) of cyclopentanecarbonylchloride, 30 ml of NMP, 5 ml of pyridine and 0.05 g of dried LiCl according to Method A.

Purification: Recrystallization from xylene.
Yield: 0.66 g (72.5% of theory).
Melting point: 279° C.
MS (EI): 425 (M$^{+\cdot}$).

EXAMPLE II-23

Preparation of N-cyclohexyl-3,5-bis-(cyclohexanecarbonylamino)-benzamide

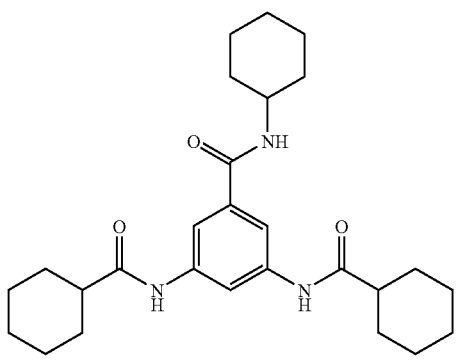

(ZZZv)

from 0.50 g (2.14 mmol) of 3,5-diamino-N-cyclohexyl-benzamide, 0.73 g (4.98 mmol) of cyclohexanecarbonylchloride, 30 ml of NMP, 5 ml of pyridine and 0.05 g of LiCl according to Method A.

Purification: Column chromatography (cyclohexane/ethyl acetate 2:1).
Yield: 0.83 g (85.5% of theory).
Melting point: 290° C.
MS (EI): 453 (M$^+$).

EXAMPLE II-24

Preparation of N-isopropyl-3,5-bis(pivaloylamino)benzamide according to Method B

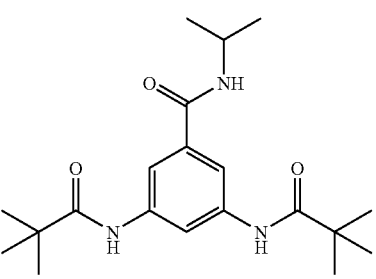

(ZZZw)

In analogy to Example II-3, the compound (ZZZw) is obtained as a slightly grey solid from 18.7 g (0.074 mol) of 3,5-dinitro-(N-isopropyl)-benzamide, 150 ml of NMP, 1.25 g of Pd/C (10% Pd) and 41.2 g (0.22 mol) of pivalic anhydride.

Yield: 17.35 g.
Melting point: 360° C. (Decomposition).

EXAMPLE II-25

Preparation of N-isopropyl-3,5-bis-(isobutyrylamino)-benzamide according to Method B

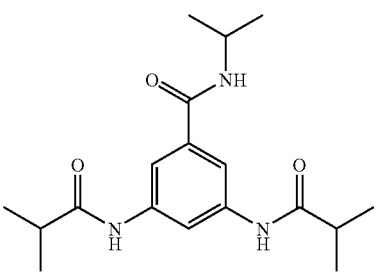

(ZZZx)

In analogy to Example II-3, the compound (ZZZx) is obtained as a slightly grey solid from 18.7 g (0.074 mol) of 3,5-dinitro-(N-isopropyl)-benzamide, 150 ml of NMP, 1.25 g of Pd/C (10% Pd) and 35.0 g (0.22 mol) of isobutyric anhydride.

Yield: 6.3 g
Melting point: 239° C. (Decomposition).

EXAMPLE II-26

Preparation of N-t-butyl-3,5-bis-(2,2-dimethyl-butyrylamino)-benzamide according to Method B

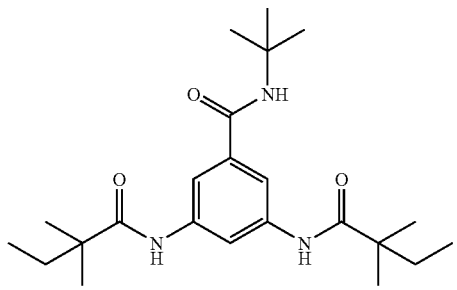
(ZZZy)

In analogy to Example II-3, the compound (ZZZy) is obtained as a slightly grey solid from 20.0 g (0.075 mol) of 3,5-dinitro-(N-t-butyl)-benzamide, 100 ml of NMP, 23 ml triethylamine and 30.3 g (0.225 mol) of 2,2-dimethylbutyrylchloride.

Yield: 25.7 g.

Melting point: 390° C. (Decomposition).

In the following, examples of the preparation of the compounds of the formula (III) are described in detail.

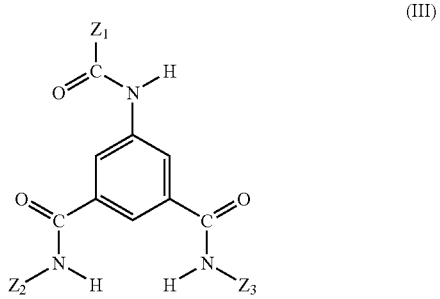
(III)

The compounds of the formula (III) are synthesized e.g. by reduction of 5-nitro-isophthalic acid diamides (YYY) (prepared by standard procedure from 5-nitro-isophthalic acid dichloride (QQQ) and the corresponding amine) and subsequent acylation. The intermediate 5-aminoisophthalic acid diamide (TTT) can be isolated or transferred to the corresponding hydrochloride and can be purified by recrystallization from an appropriate solvent. It is also possible to use the solution of the crude (TTT) or the isolated crude TTT for the following reaction with the carboxylic acid chloride or anhydride.

Possible catalysts for the reduction are e.g. Pd. PtO$_2$, Raney-Nickel etc., preferably the commercially available version on carbon support. The hydrogenation can be carried out under normal pressure or under pressure at temperatures between 20 and 120° C. (Safety checks are recommended before scale up). Another approach is reduction with Raney-Nickel/hydrazine or the use of other common reducing agents e.g. Béchamps reduction or use of boron/hydrogen compounds. Appropriate solvents for the hydrogenation are e.g. tetrahydrofuran (THF), THF/methanol, dimethylformamide (DMF) or N-methylpyrrolidone (NMP). Recrystallization can be carried out e.g. with methanol, ethanol or other alcohols.

The free amine (TTT) (or the amine obtained from the hydrochloride and an appropriate base) can be acylated with a stoichiometric amount or an excess of the corresponding acid chloride, preferably in the presence of an organic or inorganic non-interacting base, e.g. triethylamine, tributylamine, pyridine; another method uses a stoichiometric amount or excess of the anhydride of the carboxylic acid as acylating agent; in this case no base is required. The reaction is carried out in the absence or preferably in the presence of a solvent. The ideal reaction temperature depends on the nature of the acylating agents (0°-100° C.). Isolation/purification of the final product is carried out e.g. by precipitation/recrystallization/washing with an appropriate mixture of water/organic solvent or organic solvent/organic solvent or with a pure solvent, e.g. DMF/water, NMP/water, ethanol, methanol etc.

Synthesis of the 5-Nitro-Isophthalic Acid Diamide Intermediates of the Formula

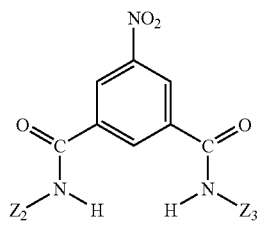

General Procedure:

In an inert atmosphere the 5-nitro-isophthalic acid dichloride (obtained by standard procedure from isophthalic acid and SOCl$_2$) is added to a mixture of N-methylpyrrolidone, pyridine or triethylamine, LiCl and the required amine at 0° C. The reaction mixture is subsequently heated to 75° C. and maintained at this temperature for 2 h. After cooling the reaction mixture is poured into the fivefold amount of ice water. The precipitated product is allowed to stand over night and subsequently filtered off and dried in vacuo (0.1 mbar) at room temperature for 24 h.

EXAMPLE RRRa-1

Preparation of 6-nitro-isophthalic acid N,N'-di-t-butyldiamide

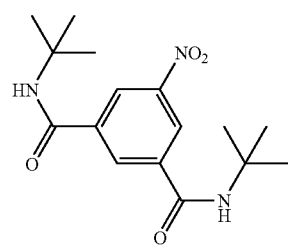
(RRRa)

500 g of 5-nitro-isophthalic acid dichloride (2.0 mol; obtained by standard procedure from isophthalic acid and SOCl$_2$), in 1 L of NMP are added at 0° C. within 2 h to a solution of 345 g (4.7 mol) of t-butylamine, 1.3 L of pyridine and 25 g of LiCl in 1 L of NMP. After 2 h stirring at 75° C., the solution is quenched with ice/water. The precipitate is filtered off, washed with water and ethanol and dried in vacuo.

Yield: 462.4 g (72% of theory; colorless powder).
Melting point: 307-308° C.
MS(EI): 321 (M$^{+\cdot}$).

EXAMPLE RRRa-2

Preparation of 5-nitro-Isophthalic acid N,N'-di-t-butyldiamide (RRRa)

The same compound as described in Example RRRa-1 is obtained, starting from 1.98 g (8.0 mmol) of 5-nitro isophthalic acid dichloride, 1.38 g (18.8 mmol) of t-butylamine, 50 ml of NMP, 7 ml of pyridine and 0.1 g of LiCl.

Purification: Recrystallization from ethyl acetate.
Yield: 1.30 g (50.6% of theory; white solid).
MS (EI): 321 (M$^{+\cdot}$).

EXAMPLE RRRb: Preparation of 5-nitro-isophthalic acid N,N'-di-t octyldiamide

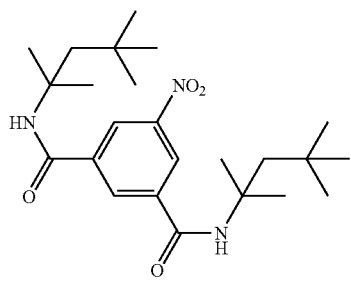
(RRRb)

50 g of 5-nitro-isophthalic acid dichloride (0.20 mol; obtained by standard procedure from isophthalic acid and SOCl$_2$) in 100 ml of NMP are added at 0° C. within 30 min to a solution 60.8 g (0.47 mol) of t-octylamine, 130 ml of pyridine and 2.5 g of LiCl in 100 ml of NMP. After 2 h stirring at 75° C., the solution is quenched with ice/water. The precipitate is filtered off, washed with water and ethanol and dried.

Yield: 55 g (63% of theory; off-white powder).
Melting point: after recrystallization: 169-172° C. MS(Cl): 434 (MH$^+$).

EXAMPLE RRRc

Preparation of 5-nitro-isophthalic acid N,N'-dicylohexyldiamide

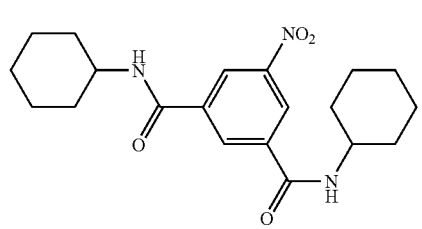
(RRRc)

from 49.60 g (0.20 mol) of 5-nitro-isophthalic acid dichloride, 51.57 g (0.52 mol) of cyclohexylamine, 900 ml of NMP, 250 ml of triethylamine and 1.0 g of LiCl.

Purification: Recrystallization from DMF.
Yield: 48.50 g (64.9% of theory; white solid).
MS (EI): 373 (M$^+$).

EXAMPLE RRRd

Preparation of 5-nitro-isophthalic acid N,N'-bis-(2-methylcyclohexyl)diamide

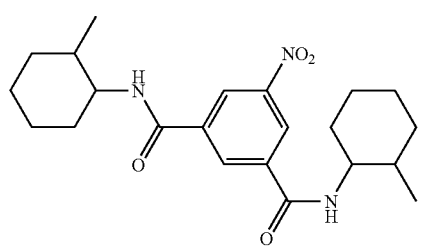
(RRRd)

from 24.80 g (0.10 mol) of 5-nitro-isophthalic acid dichloride, 28.30 g (0.25 mol) of 2-methylcyclohexylamine (isomeric mixture), 778 ml of NMP, 167 ml of pyridine and 1.0 g of LiCl.

Purification: Recrystallization from 1,2-dichlorobenzene.
Yield: 30.06 g (74.9% of theory; white solid).
MS (EI): 401 (M$^+$).

Synthesis of the 5-Amino-Isophthalic Acid Diamide Intermediates of the Formula

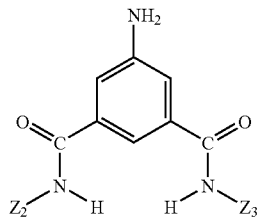

EXAMPLE TTTa-1

Preparation of 5-amino-isophthalic acid N,N'-di-t-butyldiamide

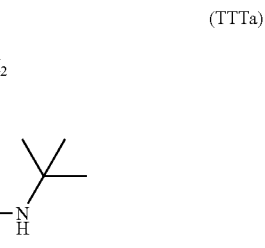
(TTTa)

A mixture of 1.22 g (3.80 mmol) of 5-nitro-isophthalic acid N,N'-di-t-butyldiamide, 200 ml of THF, 50 ml of methanol and 0.2 g of palladium on activated carbon (10% Pd) is treated with $H_2$ gas (3 bar) at 35° C. for 24 h. The catalyst is subsequently filtered off and the solvent is evaporated under reduced pressure.

Yield: 1.10 g (99.3% of theory).
MS(EI): 291 ($M^+$).

EXAMPLE TTTa-2

Preparation of 5-amino-isophthalic acid N,N'-di-t-butyldiamide (TTTa)

100.4 g (0.312 mol) of 5-nitro-isophthalic acid N,N'-di-t-butyldiamide, 5 g of palladium on activated carbon (10% Pd) and 1000 ml of NMP are treated with $H_2$ gas (5 bar) at 50° C. for 6 h. It is checked by TLC that no staring nitro compound (RRRa) remains (silicagel, hexane/ethyl acetate 1:1; $R_F$(TTTa)=0.32; $R_F$(RRRa)=0.76); yield 100%. The catalyst is subsequently filtered off and the solution is directly used for the acylation.

EXAMPLE TTTb

Preparation of 5-amino-isophthalic acid N,N'-di-t-octyldiamide

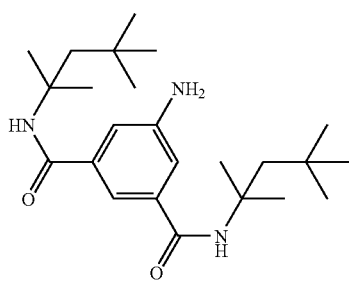

(TTTb)

30.0 g (0.069 mol) of 5-nitro-isophthalic acid N,N'-d-t-octyldiamide, 19 of palladium on activated carbon (10% Pd) and 125 ml of NMP are treated with $H_2$ gas (5 bar) at 70-75° C. for 8 h. It is checked by TLC that no starting nitro compound (RRRb) remains (silicagel, hexane/ethyl acetate 1:2; $R_F$(TTTb)=0.43, $R_F$(RRRb)=0.83); yield 100%. The catalyst is subsequently filtered off and the solution is directly used for the acylation.

EXAMPLE TTTc

Preparation of 5-amino-isophthalic acid N,N'-dicyclohexyldiamide

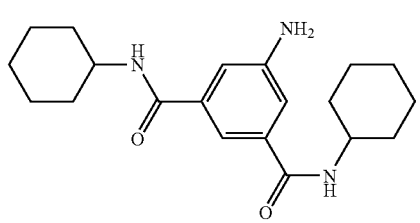

(TTTc)

A mixture of 47.47 g (127.1 mmol) of 5-nitro-isophthalic acid N,N'-dicyclo-hexyldiamide, 800 ml of DMF, 20 ml of water and 1.0 g of palladium on activated carbon (10% Pd) is treated with $H_2$ gas (3 bar) at 60° C. for 24 h. The catalyst is subsequently filtered off. The reaction mixture is poured into 4 l of ice water. The precipitate is filtered, dried and recrystallized from DMF.

Yield: 31.0 g (71.0% of theory; pale yellow solid).
MS (EI): 343 ($Me^{+\cdot}$).

EXAMPLE TTTd

Preparation of 5-amino-isophthalic acid N,N'-bis-(2-methylcylclohexyl)-diamide

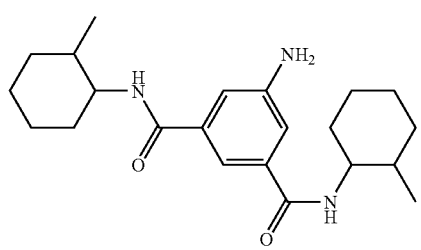

(TTTd)

A mixture of 14.86 g (37.0 mmol) of 5-nitro-isophthalic acid N,N'-bis-(2-methylcyclohexyl)diamide, 500 ml of THF, 10 ml of methanol and 5.0 g of Raney-nickel is treated with $H_2$ gas (3 bar) at 40° C. for 24 h. The catalyst is subsequently filtered off and the solvent is evaporated under reduced pressure.

Yield: 8.08 g (58.8% of theory; yellow solid)
MS (EI): 371 ($M^+$).

Synthesis of the Compounds of the Formula (III)

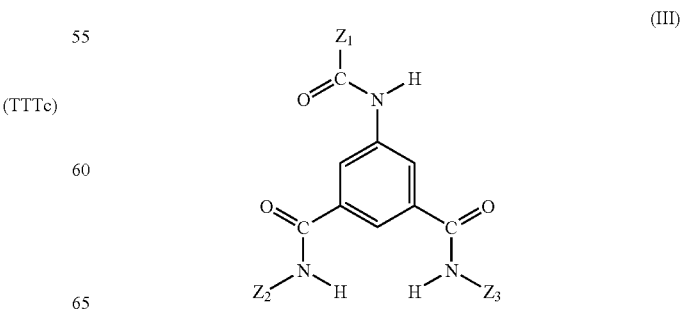

(III)

General Procedure:

In an inert atmosphere the 5-aminoisophthalic acid diamide intermediate is added to a mixture of N-methylpyrrolidone, pyridine or triethylamine, LiCl and the required acid chloride at 0° C. The reaction mixture is subsequently heated to 75° C. and maintained at this temperature for 2 h. After cooling the reaction mixture is poured into the fivefold amount of Ice water. The precipitated product is allowed to stand over night and subsequently filtered off and dried in vacuo (0.1 mbar) at room temperature for 24 h. A colorless powder is obtained.

EXAMPLE III-1

Preparation of 5-pivaloylamino-isophthalic acid N,N'-di-t-butyldiamide

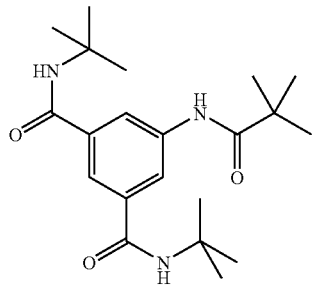

(UUUa)

In an inert atmosphere, 1.10 g (3.77 mmol) of 5-aminoisophthalic acid N,N'-di-t-butyldiamide is added to a mixture of 50 ml of N-methylpyrrolidone, 10 ml of pyridine, 0.05 g of LiCl and 0.61 g (5 mmol) of pivaloyl chloride at 0° C. The reaction mixture is subsequently heated to 75° C. and maintained at this temperature for 2 h. After cooling the reaction mixture is poured into the fivefold amount of ice water. The precipitate is filtered off and dried in vacuo.

Yield: 0.83 g (58.6% of theory).

Further purification by recrystallization from methanol.

Melting point: Sublimation starts at 294° C.; no melting point.

MS(CI): 376 (MH$^+$).

EXAMPLE III-2

Preparation of 5-pivaloylamino-isophthalic acid N,N'-di-t-butyldiamide

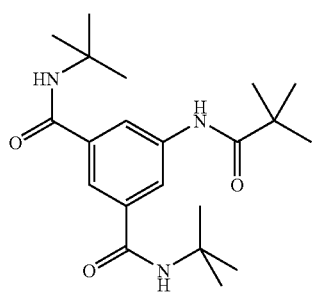

(UUUa)

90.6 g (0.311 mol) of crude 5-amino-isophthalic acid N,N'-di-t-butyldiamide (TTTa), 126 ml (0.62 mmol) of pivalic anhydride and 1.2 L of NMP are stirred for 18 h at 90° C. The precipitate is filtered off at 25° C., washed with methanol and dried.

Yield: 81.7 g (70% of theory; colorless powder).

According to spectroscopic data, the product is identical with the product obtained in Example III-1.

EXAMPLE III-3

Preparation of 5-pivaloylamino-isophthalic acid N,N'-di-t-octyldiamide

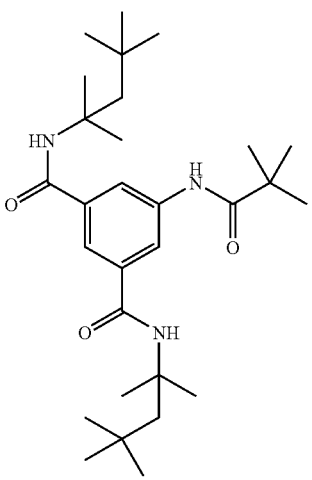

(UUUb)

28.25 g (0.07 mol) of 5-amino-isophthalic acid N,N'-di-t-octyldiamide (TTTb), 28.4 ml (0.14 mmol) of pivalic anhydride and 150 ml of NMP are stirred for 20 h at 90° C. The precipitate is filtered off at 25° C., washed with methanol and dried.

Yield: 27.3 g (80.8% of theory; colorless powder).

Melting point: 298-299° C.

MS (CI): 488 (MH$^+$).

EXAMPLE III-4

Preparation of 5-(3-methylbutyrylamino)-isophthalic acid N,N'-di cyclohexyldiamide

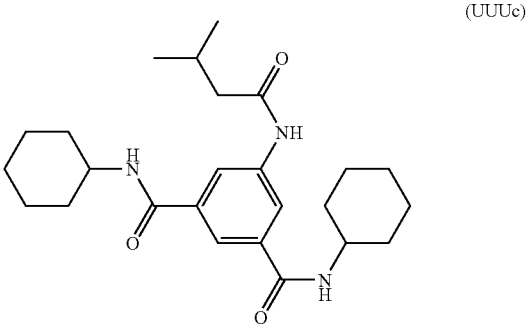

(UUUc)

from 6.87 g (20.0 mmol) of 5-amino isophthalic acid N,N'-di-cyclohexyldiamide, 3.14 g (26.0 mmol) of 3-methylbutyric acid chloride, 100 ml of NMP, 15 ml of triethylamine and 0.1 g of LiCl.
Purification: Recrystallization from methanol.
Yield: 7.23 g (84.5% of theory).
Melting point: 260° C.
MS (EI): 427 (M+·).

EXAMPLE III-5

Preparation of 5-(pivaloylamino)-isophthalic acid N,N'-dicyclohexyldiamide

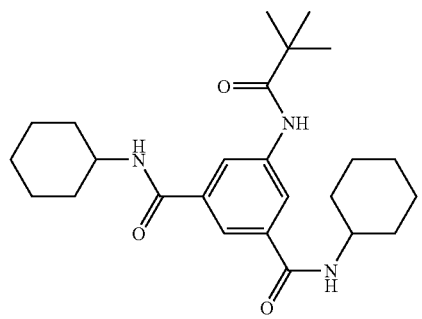

(UUUd)

from 6.87 g (20.0 mmol) of 5-amino-isophthalic acid N,N'-di-cyclohexyldiamide, 3.14 g (26.0 mmol) of pivaloyl chloride, 100 ml of NMP, 15 ml of triethylamine and 0.1 g of LiCl.
Purification: Recrystallization from methanol.
Yield: 4.90 g (57.3% of theory).
Melting point: 327° C. (decomposition).
MS (EI): 427 (M+·).

EXAMPLE III-6

Preparation of 5-(cyclopentanecarbonylamino)-isophthalic acid N,N'-di-cyclohexyldiamide

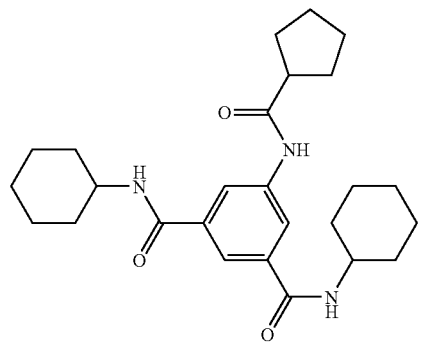

(UUUe)

from 6.87 g (20.0 mmol) of 5-amino-isophthalic acid N,N'-di-cyclohexyldiamide, 3.45 g (26.0 mmol) of cyclopentanecarbonylchloride, 100 ml of NMP, 15 ml of triethylamine and 0.1 g of LiCl.
Purification: Recrystallization from methanol.
Yield: 4.60 g (52.3% of theory).
Melting point: 306° C.
MS (EI): 439 (M+·).

EXAMPLE III-7

Preparation of 5-(cyclohexylcarbonylamino)-isophthalic acid N,N'-dicyclohexyldiamide

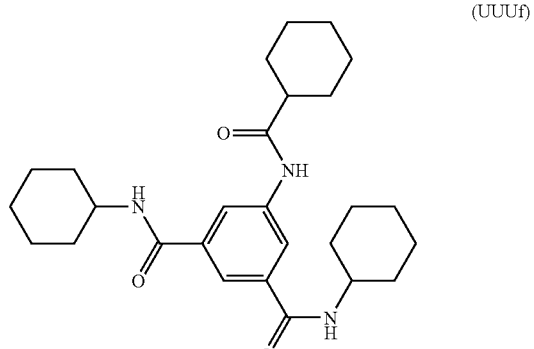

(UUUf)

from 6.87 g (20.0 mmol) of 5-amino-isophthalic acid N,N'-di-cyclohexyldiamide, 3.81 g (26.0 mmol) of cyclohexanecarbonylchloride, 100 ml of NMP, 15 ml of triethylamine and 0.1 g of LiCl.
Purification: Recrystallization from methanol.
Yield: 5.11 g (56.3% of theory).
Melting point: 291° C.
MS (EI): 453 (M+).

EXAMPLE III-8

Preparation of 5-(cyclopentanecarbonylamino)-isophthalic acid N,N'-bis-(2-methylcyclohexyl)diamide

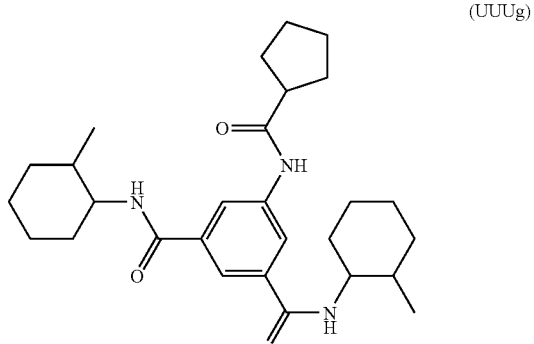

(UUUg)

from 2.02 g (5.44 mmol) of 5-amino-isophthalic acid N,N'-bis-(2-methylcyclohexyl)diamide, 0.96 g (7.24 mmol) of cyclopentane-carbonylchloride, 70 ml of NMP, 15 ml of pyridine and 0.1 g of LiCl.
Purification: Extraction with toluene (72 h).
Yield: 1.66 g (65.2% of theory).
Melting point: 312° C.
MS (EI): 467 (M+).

EXAMPLE III-9

Preparation of 5-(cyclohexanecarbonylamino)-isophthalic acid N,N'-bis-(2-methylcyclohexyl)diamide

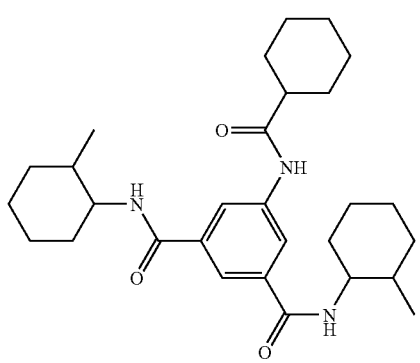
(UUUh)

from 2.02 g (5.44 mmol) of 5-amino-isophthalic acid N,N'-bis-(2-methylcyclohexyl)diamide, 1.06 g (7.23 mmol) of cyclohexane-carbonylchloride, 70 ml of NMP, 15 ml of pyridine and 0.1 g of LiCl.

Purification: Extraction with ethyl acetate (12 h).
Yield: 1.64 g (62.6% of theory).
Melting point: 327° C. (decomposition).
MS (EI) 481 (M$^{+}$).

EXAMPLE III-10

Preparation of 5-((1-methylcyclohexanecarbonyl)amino)-isophthalic acid N,N'-bis-(2-methylcyclohexyl)diamide

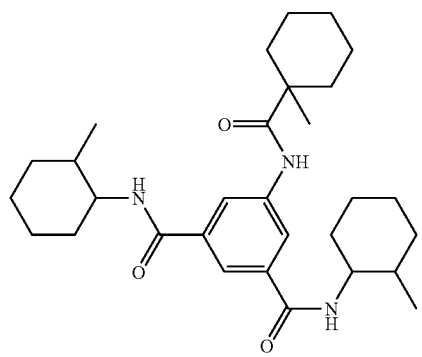
(UUUi)

from 2.02 g (5.44 mmol) of 5-amino-isophthalic acid N,N'-bis-(2-methylcyclohexyl)amide, 1.16 g (7.22 mmol) of 1-methylcyclohexane-carbonylchloride, 70 ml of NMP, 15 ml of pyridine and 0.1 g of LiCl.

Purification: Recrystallization from methanol.
Yield: 1.16 g (43.0% of theory).
Melting point: 354° C.
MS (EI): 495 (M$^{+}$).

EXAMPLE III-11

Preparation of 5-((2-methylcyclohexanecarbonyl)amino)-isophthalic acid N,N'-bis-(2-methylcyclohexyl)diamide

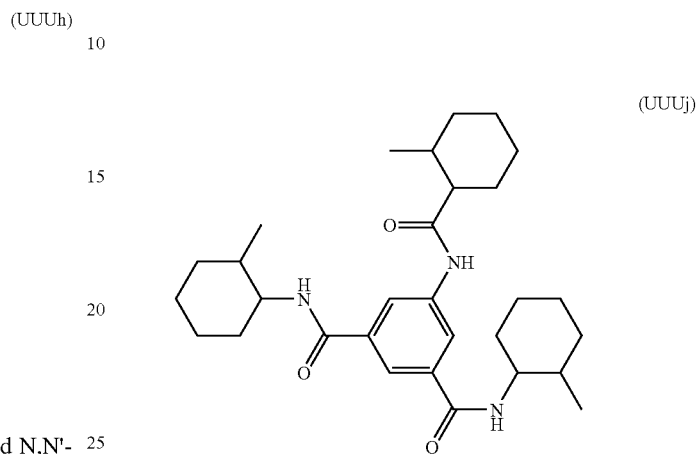
(UUUj)

from 2.02 g (5.44 mmol) of 5-amino-isophthalic acid N,N'-bis-(2-methylcyclohexyl)diamide, 1.16 g (7.22 mmol) of 2-methylcyclohexane-carbonylchloride, 70 ml of NMP, 15 ml of pyridine and 0.1 g of LiCl.

Purification: Recrystallization from methanol.
Yield: 1.57 g (58.2% of theory).
Melting point: 334° C.
MS (EI): 495 (M$^{+}$).

The following general procedures are used in the working examples unless otherwise indicated.

Mixing Procedure:

To 59.91 g of the polymer the powdered additives as indicated below are added, and tumble-mixed for 24 h in a glass container. In general, 4.5 g of this mixture are compounded at 230-240° C. in a small-scale, laboratory twin-screw, recirculating and corotating extruder, for example the MicroCompounder of DACA Instruments®, for a period of about 4 min at a screw speed of 40 rpm, and subsequently collected at room temperature. The neat polypropylene is similarly treated to produce a blank control sample.

Differential Scanning Calorimetry (DSC):

A Perkin-Elmer DSC Instrument® (Model DSC 7), operated in a dry nitrogen atmosphere, is used for the analysis of the crystallization behavior of the various mixtures and control samples, according to standard procedures. About 5 to 10 mg of sample is sealed into an aluminum cup, heated from 130° C. to 230° C. at a rate of 10° C./min, held at 230° C. for 5 min, and then subsequently cooled at a rate of 10° C./min to 50° C. The data represented as crystallization temperatures are the peak temperatures of the exotherms in the thermograms that are recorded upon cooling.

Thermo-Gravimetric Analysis (TGA), Differential Thermal Analysis (DTA):

An automated Netzsch TGA/DTA instrument (STA 409)® operated in nitrogen is used for the analysis of the thermal stability and the melting temperature. As melting temperatures the peak maximum of the endothermic transition are presented. About 10 mg of sample is placed into an aluminum oxide crucible and heated from 50° C. to 640° C. at a rate of 10° C./min Injection Molding:

The injection molding is performed with a Microinjector (DACA Instruments®). About 3.0 g of the pelletized thread is placed under a nitrogen blanket in the barrel at 260° C. After the granulate is completely molten, the melt is injected into a polished mold with a pressure of about 8 bar. The mold temperature is 20° C. The collected test specimen has a diameter of 2.5 cm and a thickness of about 1.1-1.2 mm.

Optical Characterization (Haze):

The haze is measured with a haze-gard plus instrument (BYK, Gardner®, illumination CIE-C) at room temperature. The haze-gard plus instrument conforms to ASTM D-1003. The haze values are measured between 12-24 hours after obtaining the samples by injection molding.

Flexural Moduli:

The Flexural Moduli of polymer specimens are measured according to standard conditions as described in ISO 178.

EXAMPLE 1

Powdery propylene homopolymer (PP homo) of melt flow index 3.8 dg/min (measured at 230° C. and 2.16 kg) is intensely mixed with adequate amounts of the respective nucleating agent as indicated in the tables below and, furthermore in any case, with 0.05% of calcium-stearate (acid scavenger) and 0.10% of tris[2,4-di-tert-butylphenyl)phosphite] and 0.05% of pentaerythrityl tetrakis[3-(3,5-di-tert-butyl-4-hydroxyphenyl)propionate] as co-additives.

Compounding of the formulations is performed at 240° C. on a co-rotating laboratory twin-screw extruder, such as the MicroCompounder of DACA Instruments®, for a period of about 4 min at a screw speed of 40 rpm, then cooled to room temperature and pelletized.

Injection molding is subsequently carried out on a Micro-Injector (DACA instruments®). The pelletized compound is completely molten under nitrogen atmosphere at 260° C. barrel temperature and then melt injected into a polished mold at a pressure of about 8 bar at 20° C. mold temperature. The resulting specimens with a diameter of 2.5 cm and a thickness of about 1.1-12 mm are used for further properties' characterization of the nucleated polymer.

The crystallization temperature ($T_{cryst.}$) and haze of the polypropylene composition as well as the thickness of the test specimen (plate) and the concentration of the additive according to the present invention are listed in the following tables.

TABLE 1a

| Additive according to the present invention | Compound | $T_{cryst.}$ [° C.] | Haze [%] | Concentration [% by weight] | Thickness [mm] |
|---|---|---|---|---|---|
| None | — | 110.3 | 67.2 | — | 1.0 |
| 1,3,5-Tris[2,2-dimethylpropionylamino]benzene | I-2 (Example B) | 124.8 | 17.0 | 0.15 | 1.1 |
| 1,3,5-Tris[2-ethylbutyrylamino]benzene | I-10 (Example J) | 119.3 | 24.2 | 0.15 | 1.1 |
| 1,3,5-Tris[2,2-dimethylbutyrylamino]benzene | I-11 (Example K) | 124.9 | 19.5 | 0.15 | 1.1 |
| 1-Isobutyrylamino-3,5-bis[pivaloylamino]benzene | I-16 (Example P) | 122.3 | 27.6 | 0.15 | 1.1 |
| 2,2-Dimethylbutyrylamino-3,5-bis[pivaloylamino]benzene | I-17 (Example Q) | 125.4 | 20.0 | 0.15 | 1.1 |
| 3,3-Dimethylbutyrylamino-3,5-bis[pivaloylamino]benzene | I-18 (Example R) | 120.2 | 24.0 | 0.15 | 1.1 |
| 1,3-Bis[isobutyrylamino]-5-pivaloylaminobenzene | I-19 (Example S) | 116.8 | 28.9 | 0.15 | 1.1 |
| 1,3-Bis[isobutyrylamino]-5-(2,2-dimethyl-butyryl)aminobenzene | I-20 (Example T) | 120.3 | 24.8 | 0.15 | 1.1 |
| 1,3-Bis[2,2-dimethylbutyrylamino]-5-pivaloylaminobenzene | I-22 (Example V) | 126.0 | 23.1 | 0.15 | 1.1 |
| 1,3-Bis[2,2-dimethylbutyrylamino]-5-isobutyrylaminobenzene | I-23 (Example W) | 122.5 | 20.2 | 0.15 | 1.1 |
| 1,3-Bis[2,2-dimethylbutyrylamino]-5-(3,3-dimethylbutyryl)amino-benzene | I-24 (Example X) | 119.6 | 25.2 | 0.15 | 1.1 |

TABLE 1b

| Additive according to the present invention | Compound | $T_{cryst.}$ [° C.] | Haze [%] | Concentration [% by weight] | Thickness [mm] |
|---|---|---|---|---|---|
| None | — | 110.3 | 67.2 | — | 1.0 |
| 5-Pivaloylamino-isophthalic acid N,N'-di-t-butyldiamide | UUUa (Example III-2) | 124.7 | 26.0 | 0.15 | 1.1 |
| 5-Pivaloylamino-isophthalic acid N,N'-di-cyclohexyldiamide | UUUd (Example III-5) | 117.2 | 32.1 | 0.15 | 1.2 |
| N-t-Butyl-3,5-bis[pivaloylamino]benzamide | ZZZb (Example II-2) | 123.1 | 23.7 | 0.15 | 1.1 |

TABLE 1b-continued

| Additive according to the present invention | Compound | $T_{cryst.}$ [° C.] | Haze [%] | Concentration [% by weight] | Thickness [mm] |
|---|---|---|---|---|---|
| N-Cyclopentyl-3,5-bis[pivaloylamino]benzamide | ZZZn (Example II-15) | 119.0 | 32.3 | 0.15 | 1.2 |
| N-Cyclohexyl-3,5-bis[pivaloylamino]benzamide | ZZZs (Example II-20) | 116.4 | 33.2 | 0.15 | 1.1 |
| N-Isopropyl-3,5-bis[pivaloylamino]benzamide | ZZZw (Example II-24) | 120.5 | 26.8 | 0.15 | 1.1 |
| N-t-Butyl-3,5-bis[2,2-dimethyl-butyrylamino]benzamide | ZZZy (Example II-26) | 124.1 | 20.5 | 0.15 | 1.1 |

EXAMPLE 2

The powdery polymer (propylene random copolymer (PP raco); one type with a melt flow index of 7.5 dg/min; another type with a melt flow index of 12 dg/min; measured at 230° C. and 2.16 kg, respectively; or polyethylene metallocene grade of medium density with a melt flow index of 2.8 dg/min; measured at 190° C. and 5.0 kg) is intensely homogenized in a Henschel mixer with adequate amounts of the respective nucleating agent and optionally with further co-additives, such as an antioxidants' blend of tris[2,4-di-t-butylphenyl] phosphite and pentaerythrityl tetrakis[3-(3,5-di-tert-butyl-4-hydroxyphenyl)propionate] at a 2:1 weight ratio; acid scavengers, e.g. calcium- or zinc-stearate; and/or optionally other processing aids or further additives, as those indicated in the tables below.

Then, each formulation is compounded on a Berstorff ZE 25×46D® at 220-250° C. The obtained strand is water quenched and pelletized. The obtained pellets are used for injection molding on an Arburg 320 S® at 200-240° C. to prepare about 1 mm plaques of 85 mm×90 mm size. The haze of the plaques is measured on a Haze-Gard plus (BYK Gardner®) according to ASTM D-1003.

The crystallization temperature ($T_{cryst.}$) and haze of the polymer composition as well as the thickness of the test specimen (plaque) and the concentration of the additive according to the present invention are listed in the following tables.

TABLE 2a

Propylene random copolymer with a melt flow index of 7.5 dg/min (measured at 230° C. and 2.16 kg); compounded at 240° C. and injection molded at 235° C.

| Base stabilization: | 0.067% of tris[2,4-di-tert-butylphenyl]phosphite |
| | 0.033% of pentaerythrityl tetrakis[3-(3,5-di-tert-butyl-4-hydroxyphenyl)propionate] |
| | 0.020% of calcium stearate |

The additive according to the present invention is first dry-blended with the propylene random copolymer and compounded into a 1% concentrate. Then, the concentrate is bag-blended with the propylene random copolymer and again compounded before subsequent injection molding.

| Additive according to the present invention | Compound | $T_{cryst.}$ [° C.] | Haze [%] | Concentration [% by weight] | Thickness [mm] |
|---|---|---|---|---|---|
| None | — | 97.2 | 35.1 | — | 1.0 |
| 1,3,5-Tris[2,2-dimethylpropionylamino]benzene | I-2 (Example B) | 105.7 | 14.2 | 0.010 | 1.0 |
| 1,3,5-Tris[2,2-dimethylpropionylamino]benzene | I-2 (Example B) | 108.2 | 13.4 | 0.015 | 1.0 |
| 1,3,5-Tris[2,2-dimethylpropionylamino]benzene | I-2 (Example B) | 105.5 | 15.4 | 0.020 | 1.0 |

TABLE 2b

Propylene random copolymer with a melt flow index of 7.5 dg/min (measured at 230° C. and 2.16 kg); compounded at 250° C. and injection molded at 235° C.

Base stabilization: 0.087% of tris[2,4-di-tert-butylphenyl]phosphite
0.033% of pentaerythrityl tetrakis[3-(3,5-di-tert-butyl-4-hydroxyphenyl)propionate]
0.020% of calcium stearate 1% of the additive according to the present invention and 0.2% of the individual co-additives, respectively, as indicated in the table below are each dry blended with powdery propylene random copolymer and compounded into concentrates. Then, propylene random copolymer pellets are bag-blended with these concentrates at appropriate let-down ratios according to the final concentrations given in the table.

| Additive according to the present invention (Concentration in % by weight) | Compound | Co-additive (Concentration by weight) | $T_{cryst.}$ [° C.] | Haze [%] | Thickness [mm] |
|---|---|---|---|---|---|
| 1,3,5-Tris[2,2-dimethylpropionylamino]benzene (0.02) | I-2 (Example B) | None | 105.4 | 14.2 | 1.0 |
| 1,3,5-Tris[2,2-dimethylpropionylamino]benzene (0.02) | I-2 (Example B) | HALS-1 (50 ppm) | 103.6 | 12.7 | 1.0 |
| 1,3,5-Tris[2,2-dimethylpropionylamino]benzene (0.02) | I-2 (Example B) | HALS-2 (20 ppm) | 105.3 | 12.3 | 1.0 |
| 1,3,5-Tris[2,2-dimethylpropionylamino]benzene (0.02) | I-2 (Example B) | Erucamide (50 ppm) | 104.0 | 12.5 | 1.0 |

HALS-1 is bis(2,2,6,6-tetramethyl-4-piperidyl)sebacate, commercially available e.g. as TINUVIN 770 (RTM).
HALS-2 is the condensate of 1-(2-hydroxyethyl)-2,2,6,6-tetramethyl-4-hydroxypiperidine and succinic acid, commercially available e.g. as TINUVIN 622 (RTM).
Erucamide is e.g. commercially available as ATMER 1753 (RTM).

TABLE 2c

Propylene random copolymer with a melt flow index of 7.5 dg/min (measured at 230° C. and 2.16 kg); compounded and injection molded at 240° C.

Base stabilization: 0.067% of tris[2,4-di-tert-butylphenyl]phosphite
0.033% or pentaerythrityl tetrakis[3-(3,5-di-tert-butyl-4-hydroxyphenyl)propionate]
0.075% of zinc stearate The additive according to the present invention and the co-additive indicated in the table below are dry blended with powdery propylene random copolymer, subsequently compounded and injection molded into plaques.

| Additive according to the present invention (Concentration in % by weight) | Compound | Co-additive (Concentration in % by weight) | $T_{cryst.}$ [° C.] | Haze [%] | Thickness [mm] |
|---|---|---|---|---|---|
| None | — | None | 96.9 | 36.4 | 1.0 |
| None | — | AdSperse 868 (RTM) (0.50) | 95.3 | 36.3 | 1.0 |
| None | — | Licowax PE 520 (RTM) (0.50) | 97.3 | 35.2 | 1.0 |
| 1,3,5-Tris[2,2-dimethylpropionylamino]benzene (0.02) | I-2 (Example B) | None | 104.3 | 14.2 | 1.0 |
| 1,3,5-Tris[2,2-dimethylpropionylamino]benzene (0.02) | I-2 (Example B) | AdSperse 868 (RTM) (0.50) | 106.1 | 13.8 | 1.0 |
| 1,3,5-Tris[2,2-dimethylpropionylamino]benzene (0.02) | I-2 (Example B) | Licowax PE 520 (RTM) (0.50) | 105.6 | 13.5 | 1.0 |

AdSperse 868 (RTM) is a commercially available Fischer-Tropsch wax.
Licowax PE 520 (RTM) is a commercially available Ziegler-Natta polyethylene wax.

TABLE 2d

Propylene random copolymer with a melt flow index of 12 dg/min (measured at 230° C. and 2.16 kg); twice compounded at 250° C. and injection molded at 235° C.

Base stabilization: 0.067% of tris[2,4-di-tert-butylphenyl]phosphite
0.033% of pentaerythrityl tetrakis[3-(3,5-di-tert-butyl-4-hydroxyphenyl)propionate]
0.075% of zinc stearate All components are powder blended prior to compounding, then, injection molded into plaques.

| Additive according to the present invention | Compound | $T_{cryst.}$ [° C.] | Haze [%] | Concentration [% by weight] | Thickness [mm] |
|---|---|---|---|---|---|
| None | — | 96.7 | 50.7 | — | 1.0 |
| 5-Pivaloylamino-isophthalic acid N,N'-di-t-butyldiamide | UUUa (Example III-2) | 108.8 | 30.2 | 0.05 | 1.0 |
| 5-Pivaloylamino-isophthalic acid N,N'-di-t-octyldiamide | UUUb (Example III-3) | 98.3 | 39.3 | 0.05 | 1.0 |

TABLE 2d-continued

Propylene random copolymer with a melt flow index of 12 dg/min (measured at 230° C. and 2.16 kg); twice compounded at 250° C. and injection molded at 235° C.

| | | | | | |
|---|---|---|---|---|---|
| N-t-Butyl-3,5-bis-(pivaloylamino)-benzamide | ZZZb (Example II-2) | 109.2 | 24.4 | 0.15 | 1.0 |

TABLE 2e

Propylene random copolymer with a melt flow index of 7.5 dg/min (measured at 230° C. and 2.16 kg); compounded at 240° C. and injection molded at 235° C.

Base stabilization: 0.067% of tris[2,4-di-tert-butylphenyl]phosphite
0.033% of pentaerythrityl tetrakis[3-(3,5-di-tert-butyl-4-hydroxyphenyl)propionate]

The additives according to the present invention and all co-additives indicated are first dry-blended, then compounded and subsequently injection molded into plaques.

| Additive according to the present invention | Compound | $T_{cryst.}$ [° C.] | Haze [%] | Concentration [% by weight] | Thickness [mm] |
|---|---|---|---|---|---|
| None | — | 96.9 | 38.4 | — | 1.0 |
| N-(t-Octyl)-3,5-bis-(pivaloylamino)-benzamide | ZZZc (Example II-3) | 97.4 | 34.9 | 0.020 | 1.0 |
| N-(1,1-Dimethyl-propyl)-3,5-bis-(pivaloylamino)-benzamide | ZZZd (Example II-4) | 107.6 | 22.7 | 0.015 | 1.0 |
| N-(t-Octyl)-3,5-bis-(isobutyrylamino)-benzamide | ZZZe (Example II-5) | 98.5 | 32.0 | 0.020 | 1.0 |

TABLE 2f

Propylene random copolymer with a melt flow index of 7.5 dg/min (measured at 230° C. and 2.16 kg); compounded at 250° C. and injection molded at 235° C.

Base stabilization: 0.067% of tris[2,4-di-tert-butylphenyl]phosphite
0.033% of pentaerythrityl tetrakis[3-(3,5-di-tert-butyl-4-hydroxyphenyl)propionate]
0.020% of calcium stearate The additive according to the present invention is first dry-blended with the propylene random copolymer and compounded into a 1% concentrate. Then, the concentrate is bag-blended with the propylene random copolymer pellets and again compounded before injection molding.

| Additive according to the present invention | Compound | $T_{cryst.}$ [° C.] | Haze [%] | Concentration [% by weight] | Thickness [mm] |
|---|---|---|---|---|---|
| None | — | 93.6 | 36.7 | — | 1.0 |
| N-t-Butyl-3,5-bis-(pivaloylamino)-benzamide | ZZZb (Example II-2) | 105.4 | 16.2 | 0.010 | 1.0 |
| N-t-Butyl-3,5-bis-(pivaloylamino)-benzamide | ZZZb (Example II-2) | 107.3 | 15.4 | 0.015 | 1.0 |
| N-t-Butyl-3,5-bis-(pivaloylamino)-benzamide | ZZZb (Example II-2) | 107.2 | 17.3 | 0.020 | 1.0 |

TABLE 2g

Propylene random copolymer with a melt flow index of 7.5 dg/min (measured at 230° C. and 2.16 kg); twice compounded at 240° C. and injection molded at 235° C.

Base stabilization: 0.067% of tris[2,4-di-tert-butylphenyl]phosphite
0.033% of pentaerythrityl tetrakis[3-(3,5-di-tert-4-hydroxyphenyl)propionate]

The additive according to the present invention and all co-additives indicated are dry-blended, then compounded and injection molded into plaques.

| Additive according to the present invention (Concentration in % by weight) | Compound | Co-additive (Concentration in % by weight) | $T_{cryst.}$ [° C.] | Haze [%] | Thickness [mm] |
|---|---|---|---|---|---|
| None | — | None | 99.9 | 34.7 | 1.0 |
| N-t-Butyl-3,5-bis-(pivaloylamino)-benzamide (0.015) | ZZZb (Example II-2) | AdSperse 868 (RTM) (0.50) | 108.9 | 18.3 | 1.0 |
| N-(1,1-Dimethyl-propyl)-3,5-bis-(pivaloylamino)-benzamide (0.015) | ZZZd (Example II-4) | AdSperse 868 (RTM) (0.50) | 106.6 | 20.4 | 1.0 |

AdSperse 868 (RTM) is a commercially available Fischer-Tropsch wax

TABLE 2h

Polyethylene metallocene grade of medium density with a melt flow index of 2.8 dg/min (measured at 190° C. and 5.0 Kg); compounded at 220° C. and injection molded at 230° C.

Base stabilization:  0.067% of tris[2,4-di-tert-butylphenyl]phosphite
0.033% of pentaerythrityl tetrakis[3-(3,5-di-tert-butyl-4-hydroxyphenyl)propionate]
0.050% of Ca stearate
All components are powder blended prior to compounding, then, injection molded into plaques.

| Additive according to the present invention | Compound | Flexural Modulus [MPa] | Haze [%] | Concentration [% by weight] | Thickness [mm] |
|---|---|---|---|---|---|
| None | — | 409 | 71.4 | — | 1.0 |
| 1,3,5-Tris[2,2-dimethylpropionylamino]benzene | I-2 (Example B) | 427 | 62.6 | 0.15 | 1.0 |

The invention claimed is:
1. A composition containing
a) polyolefin and
b) 0.0001 to 5%, relative to the weight of component a), of one or more compounds of the formula (I), (II) or (III)

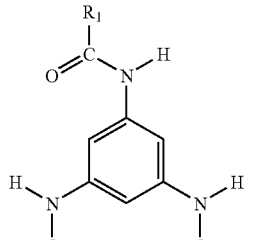

(I)

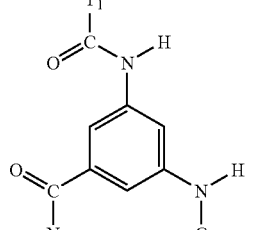

(II)

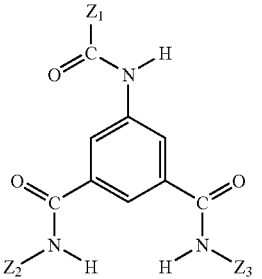

(III)

wherein
$R_1$, $R_2$ and $R_3$, or $Y_1$, $Y_2$ and $Y_3$, or $Z_1$, $Z_2$ and $Z_3$ independently of one another are branched $C_3$-$C_{10}$alkyl.

2. A composition according to claim 1 comprising the compound of formula (I) which compound is selected from the group consisting of
1,3,5-tris[2,2-dimethylpropionylamino]benzene,
1,3,5-tris[2-methylpropionylamino]benzene,
1,3,5-tris[3,3-dimethylbutyrylamino]benzene,
1,3,5-tris[2-ethylbutyrylamino]benzene,
1,3,5-tris[2,2-dimethylbutyrylamino]benzene,
1-isobutyrylamino-3,5-bis[pivaloylamino]benzene,
2,2-dimethylbutyrylamino-3,5-bis[pivaloylamino]benzene,
3,3-dimethylbutyrylamino-3,5-bis[pivaloylamino]benzene,
1,3-bis[isobutyrylamino]-5-pivaloylaminobenzene,
1,3-bis[isobutyrylamino]-5-(2,2-dimethyl-butyryl)aminobenzene,
1,3-bis[isobutyrylamino]-5-(3,3-dimethyl-butyryl)aminobenzene,
1,3-bis[2,2-dimethylbutyrylamino]-5-pivaloylaminobenzene,
1,3-bis[2,2-dimethylbutyrylamino]-5-isobutyrylaminobenzene,
1,3-bis[2,2-dimethylbutyrylamino]-5-(3,3-dimethylbutyryl)-aminobenzene,
1,3-bis[3,3-dimethylbutyrylamino]-5-pivaloylamino-benzene,
1,3-bis[3,3-dimethylbutyrylamino]-5-isobutyryl-aminobenzene, and
1,3-bis[3,3-dimethylbutyrylamino)-5-(2,2-dimethyl-butyrylamino)aminobenzene.

3. A composition according to claim 1 comprising the compound of formula (II) which compound is selected from the group consisting of
N-t-butyl-3,5-bis-(3-methylbutyrylamino)-benzamide,
N-t-butyl-3,5-bis-(pivaloylamino)-benzamide,
N-t-octyl-3,5-bis-(pivaloylamino)-benzamide,
N-(1,1-dimethyl-propyl)-3,5-bis-(pivaloylamino)-benzamide,
N-(t-octyl)-3,5-bis-(isobutyrylamino)-benzamide,
N-(t-butyl)-3,5-bis-(pivaloylamino)-benzamide,
N-(3-methylbutyl)-3,5-bis-(3-methylbutyrylamino)-benzamide,
N-(3-methylbutyl)-3,5-bis-(pivaloylamino)-benzamide,
N-(3-methylbutyl)-3,5-bis-(4-methylpentanoylamino)-benzamide,
N-isopropyl-3,5-bis-(pivaloylamino)-benzamide,
N-isopropyl-3,5-bis-(isobutyrylamino)-benzamide,
N-t-butyl-3,5-bis-(2,2-dimethylbutyrylamino)-benzamide, and
N-t-octyl-3,5-bis-(2,2-dimethylbutyrylamino)-benzamide.

4. A composition according to claim 1 comprising the compound of the formula (III) which compound is selected from the group consisting of 5-pivaloylamino-isophthalic acid N,N'-di-t-butyldiamide,
5-pivaloylamino-isophthalic acid N,N'-di-t-octyldiamide,
5-(2,2-dimethylbutyrylamino)-isophthalic acid N,N'-di-t-butyldiamide, and
5-(2,2-dimethylbutyrylamino)-isophthalic acid N,N'-di-t-octyldiamide.

5. A composition according to claim 1 wherein $R_1$, $R_2$ and $R_3$, or $Y_1$, $Y_2$ and $Y_3$, or $Z_1$, $Z_2$ and $Z_3$ independently of one another are 1-methylethyl, 2-methylpropyl, 1-methylpropyl, tert-butyl, 1-methylbutyl, 2-methylbutyl, 3-methylbutyl, 1,1-dimethylpropyl, 1-ethylpropyl, tert-butylmethyl.

6. A composition according to claim 1 wherein $R_1$, $R_2$ and $R_3$, or $Y_1$, $Y_2$ and $Y_3$, or $Z_1$, $Z_2$ and $Z_3$ are identical.

7. A composition according to claim 1 wherein $R_1$, $R_2$ and $R_3$, or $Y_1$, $Y_2$ and $Y_3$, or $Z_1$, $Z_2$ and $Z_3$ are identical and are 1-methylethyl, 1-methylpropyl, 2-methylpropyl, tert-butyl, 1,1-dimethylpropyl or tert-butylmethyl.

8. A composition according to claim 1 wherein component b) is a compound of the formula (I) wherein $R_1$, $R_2$ and $R_3$ are tert-butyl.

9. A composition according to claim 1 wherein
$R_1$, $R_2$ and $R_3$, or $Y_1$ and $Y_3$, or $Z_1$ independently of one another are isopropyl, sec-butyl, tert-butyl, 1-methylbutyl, 1-methylpentyl, 1-ethylpentyl, 1,1-dimethylpropyl, 2,2-dimethylpropyl, 1,1-dimethylbutyl, 1,1-dimethylhexyl, 1-ethylpropyl, 1-propylbutyl.

10. A composition according to claim 1 wherein
$Y_2$, or $Z_2$ and $Z_3$ independently of one another are isopropyl, sec-butyl, tert-butyl, 1,1-dimethylpropyl, 1,2-dimethylpropyl, 2,2-dimethylpropyl or tert-octyl.

11. A composition according to claim 1 wherein the radicals $R_1$, $R_2$ and $R_3$, or $Y_1$, $Y_2$ and $Y_3$, or $Z_1$, $Z_2$ and $Z_3$ are tert-butyl.

12. A composition according to claim 1 containing as additional component c-1) one or more conventional nucleating agents.

13. A composition according to claim 1 containing as additional component c-2) one or more sterically hindered amine compounds.

14. A composition according to claim 1 containing as additional component c-3) one or more lubricants.

15. A composition according to claim 1, characterized in that the composition has a haze value which is smaller than 62%; the haze value being measured at a plate of 1.0-1.2 mm thickness.

16. A method for providing polyolefin with a haze value which is smaller than 62%; the haze value being measured at a plate of 1.0-1.2 mm thickness, which comprises incorporating into the polyolefin one or more compounds of the formula (I), (II) or (III) of claim 1.

17. A method for increasing the crystallization temperature of a polyolefin, which comprises incorporating into the polyolefin one or more compounds of the formula (I), (II) or (III) of claim 1.

18. A shaped article obtainable from a composition of claim 1.

19. A monoaxially-oriented film or a biaxially-oriented film obtained from a composition of claim 1.

20. A compound of the formula (IA), (IIA) or (IIIA)

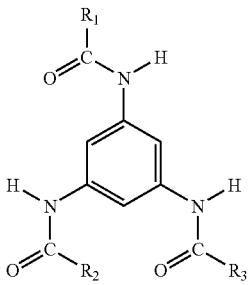
(IA)

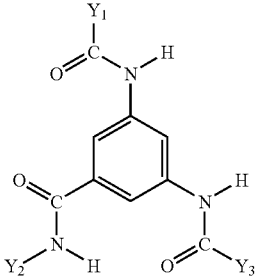
(IIA)

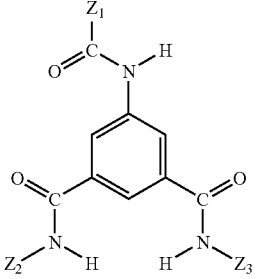
(IIIA)

wherein $R_1$, $R_2$ and $R_3$, or $Y_1$, $Y_2$ and $Y_3$, or $Z_1$, $Z_2$ and $Z_3$ independently of one another are branched $C_3$-$C_{10}$alkyl and the compound N-t-butyl-3,5-bis-(pivaloylamino)-benzamide is disclaimed.

21. A compound or mixture of compounds of the formula (IA), (IIA) or (IIIA) according to claim 20, which comprises compounds selected from the group consisting of
1,3,5-tris[2,2-dimethylpropionylamino]benzene,
1,3,5-tris[2-methylpropionylamino]benzene,
1,3,5-tris[3,3-dimethylbutyrylamino]benzene,
1,3,5-tris[2-ethylbutyrylamino]benzene,
1,3,5-tris[2,2-dimethylbutyrylamino]benzene,
1-isobutyrylamino-3,5-bis[pivaloylamino]benzene,
2,2-dimethylbutyrylamino-3,5-bis[pivaloylamino]benzene,
3,3-dimethylbutyrylamino-3,5-bis[pivaloylamino]benzene,
1,3-bis[isobutyrylamino]-5-pivaloylaminobenzene,
1,3-bis[isobutyrylamino]-5-(2,2-dimethyl-butyryl)aminobenzene,
1,3-bis[isobutyrylamino]-5-(3,3-dimethyl-butyryl)aminobenzene,
1,3-bis[2,2-dimethylbutyrylamino]-5-pivaloylaminobenzene,
1,3-bis[2,2-dimethylbutyrylamino]-5-isobutyrylaminobenzene,
1,3-bis[2,2-dimethylbutyrylamino]-5-(3,3-dimethylbutyryl)-aminobenzene, 1,3-bis[3,3-dimethylbutyrylamino]-5-pivaloylamino-benzene, 1,3-bis[3,3-dimethylbutyrylamino]-5-isobutyryl-aminobenzene, 1,3-bis[3,3-dimethylbutyrylamino)-5-(2,2-dimethyl-butyrylamino)aminobenzene, N-t-butyl-3,5-bis-(3-methylbutyrylamino)-benzamide, N-t-octyl-3,5-bis-(pivaloylamino)-benzamide, N-(1,1-dimethyl-propyl)-3,5-bis-(pivaloylamino)-benzamide, N-(t-octyl)-3,5-bis-(isobutyrylamino)-benzamide, N-(t-butyl)-3,5-bis-(pivaloylamino)-benzamide, N-(3-methylbutyl)-3,5-bis-(3-methylbutyrylamino)-benzamide, N-(3-methylbutyl)-3,5-bis-(pivaloylamino)-benzamide, N-(3-methylbutyl)-3,5-bis-(4-methylpentanoylamino)-benzamide, N-isopropyl-3,5-bis-(pivaloylamino)-benzamide, N-isopropyl-3,5-bis-(isobutyrylamino)-benzamide, N-t-butyl-3,5-bis-(2,2-dimethylbutyrylamino)-benzamide, N-t-octyl-3,5-bis-(2,2-dimethylbutyrylamino)-benzamide, 5- pivaloylamino-isophthalic acid N,N'-di-t-butyldiamide, 5-pivaloylamino-isophthalic acid N,N'-di-t-octyldiamide, 5-(2,2-dimethylbutyrylamino)-isophthalic acid N,N'-di-t-butyldiamide, and 5-(2,2-dimethylbutyrylamino)-isophthalic acid N,N'-di-t-octyldiamide.

22. A mixture containing a compound of the formula (IA), (IIA) or (IIIA) as defined in claim 20; and a sterically hindered amine compound or a lubricant.

23. The composition according to claim 1, wherein the composition further contains an hydroxylamine.

24. The composition according to claim 2, wherein the composition further comprises a phosphite, a phosphonite, an hydroxylamine, a nitrone, an ester of β-(3,5-di-tert-butyl-4-hydroxyphenyl) propionic acid, an alkylidenebisphenol, an alkylated monophenol, a 2-(2'-hydroxyphenyl)benzotriazole or a 2-(2-hydroxyphenyl)-1,3,5-traizine.

25. The composition according to claim 1, wherein the composition further comprises a phosphite, a phosphonite, an hydroxylamine, an ester of β-(3,5-di-tert-butyl-4-hydroxyphenyl)propionic acid, an alkylidenebisphenol, an alkylated monophenol, a nitrone, a 2-(2'-hydroxyphenyl)benzotriazole or a 2-(2-hydroxyphenyl)-1,3,5-traizine.

26. The composition according to claim 24, wherein the hydroxylamine is selected from the group consisting of N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

\* \* \* \* \*